(12) United States Patent
Ishino et al.

(10) Patent No.: US 9,334,934 B2
(45) Date of Patent: May 10, 2016

(54) BELT TYPE CONTINUOUSLY VARIABLE TRANSMISSION

(75) Inventors: Fumitoshi Ishino, Osaka (JP); Takeshi Ouchida, Osaka (JP); Terunobu Yoshioka, Osaka (JP); Koji Iwaki, Hyogo (JP)

(73) Assignee: YANMAR CO., LTD. (JP)

( * ) Notice: Subject to any disclaimer, the term of this patent is extended or adjusted under 35 U.S.C. 154(b) by 373 days.

(21) Appl. No.: 13/884,137

(22) PCT Filed: Jul. 8, 2011

(86) PCT No.: PCT/JP2011/065731
§ 371 (c)(1),
(2), (4) Date: Aug. 5, 2013

(87) PCT Pub. No.: WO2012/063522
PCT Pub. Date: May 18, 2012

(65) Prior Publication Data
US 2014/0378251 A1 Dec. 25, 2014

(30) Foreign Application Priority Data

| Nov. 8, 2010 | (JP) | 2010-250342 |
| Nov. 8, 2010 | (JP) | 2010-250343 |
| Nov. 8, 2010 | (JP) | 2010-250344 |
| Nov. 8, 2010 | (JP) | 2010-250345 |
| Nov. 8, 2010 | (JP) | 2010-250346 |
| Jun. 15, 2011 | (JP) | 2011-133554 |
| Jun. 23, 2011 | (JP) | 2011-139948 |

(51) Int. Cl.
*F16H 9/16* (2006.01)
*F16H 61/02* (2006.01)
(Continued)

(52) U.S. Cl.
CPC ............... *F16H 9/16* (2013.01); *F16H 37/022* (2013.01); *F16H 61/0265* (2013.01); *F16H 61/66263* (2013.01); *F16H 63/065* (2013.01); *F16H 9/18* (2013.01)

(58) Field of Classification Search
CPC .... F16H 9/16; F16H 37/022; F16H 61/66272
USPC ........................................ 474/28; 137/596.17
See application file for complete search history.

(56) References Cited

U.S. PATENT DOCUMENTS

| 4,735,113 A | 4/1988 | Yamamuro et al. |
| 7,179,183 B2 | 2/2007 | Borghi |

(Continued)

FOREIGN PATENT DOCUMENTS

| JP | S5026430 U | 3/1975 |
| JP | S57146945 A | 9/1982 |

(Continued)

OTHER PUBLICATIONS

Japanese Notice of Reasons for Refusal corresponding to Application No. 2011-139948; Shipping Date: Sep. 16, 2014, with English translation.

(Continued)

*Primary Examiner* — William E Dondero
*Assistant Examiner* — Mark K Buse
(74) *Attorney, Agent, or Firm* — Cantor Colburn LLP

(57) ABSTRACT

An input pulley, an output pulley, a belt wound across the pulleys, a hydraulic cylinder provided to the input pulley, and a hydraulic servo mechanism that controls an operation of the hydraulic cylinder are provided. The hydraulic servo mechanism includes: a valve chest facing an input side movable sheave; a servo spool slidably inserted in the valve chest, and switches an oil passage in communication with a hydraulic chamber of the hydraulic cylinder; and a feedback spool disposed in such a manner that one end comes into contact with the input side movable sheave a bearing disposed in between, and configured to switch the oil passage to maintain a slid position of the input side movable sheave at a position corresponding to a slid position of the servo spool.

14 Claims, 36 Drawing Sheets

(51) Int. Cl.
*F16H 37/02* (2006.01)
*F16H 61/662* (2006.01)
*F16H 63/06* (2006.01)
*F16H 9/18* (2006.01)

(56) References Cited

U.S. PATENT DOCUMENTS

| | | | |
|---|---|---|---|
| 2002/0065157 | A1 | 5/2002 | Heinrich et al. |
| 2010/0099525 | A1 | 4/2010 | Tsukuda et al. |

FOREIGN PATENT DOCUMENTS

| | | |
|---|---|---|
| JP | S0623356 U | 2/1985 |
| JP | S61105351 A | 5/1986 |
| JP | 6230053 U | 2/1987 |
| JP | S62131146 U | 8/1987 |
| JP | 64-15563 A | 1/1989 |
| JP | 64087962 A | 4/1989 |
| JP | H0291245 U | 7/1990 |
| JP | 514714 U | 2/1993 |
| JP | H0540354 Y2 | 10/1993 |
| JP | 2548259 B2 | 10/1996 |
| JP | 11304025 A | 11/1999 |
| JP | 2002206606 A | 7/2002 |
| JP | 2002227949 A | 8/2002 |
| JP | 2005265007 A | 9/2005 |
| JP | 2005-337459 A | 12/2005 |
| JP | 2006-105217 A | 4/2006 |
| JP | 2008101756 A | 5/2008 |
| JP | 2008-164099 A | 7/2008 |
| JP | 2008-309232 A | 12/2008 |
| JP | 2009-204093 A | 9/2009 |
| JP | 2010052734 A | 3/2010 |
| JP | 2010096338 A | 4/2010 |
| JP | 2011-58543 A | 3/2011 |
| JP | 2012-511677 A | 5/2012 |

OTHER PUBLICATIONS

Decision of Refusal for Japanese Application No. 2010-250346; Shipping date: Mar. 3, 2015, with English translation.
Notice of Reasons for Refusal for Japanese Application No. 2010-250344; Shipping date: Mar. 3, 2015, with English translation.
Notice of Reasons for Refusal for Japanese Application No. 2010-250345; Shipping date: Mar. 31, 2015, with English translation.
International Search Report for International Application No. PCT/JP2011/065731, mailed Oct. 11, 2011, with English translation.
Notice of Reasons for Refusal for Japanese Application No. 2010-250342 mailed Aug. 5, 2014 with English translation.
Notice of Reasons for Refusal for Japanese Application No. 2010-250343 mailed Aug. 5, 2014 with English translation.
Notice of Reasons for Refusal for Japanese Application No. 2010-250344 mailed Aug. 5, 2014 with English translation.
Notice of Reasons for Refusal for Japanese Application No. 2010-250345 mailed Aug. 5, 2014 with English translation.
Notice of Reasons for Refusal for Japanese Application No. 2010-250346 mailed Jul. 22, 2014 with English translation.

(a)

(b)

(a)

(b)

US 9,334,934 B2

BELT TYPE CONTINUOUSLY VARIABLE TRANSMISSION

CROSS REFERENCE TO RELATED APPLICATIONS

This is the U.S. national stage of application No. PCT/JP2011/065731, filed on 8 Jul. 2011. Priority under 35 U.S.C. §119(a) and 35 U.S.C. §365(b) is claimed from Japanese Application Nos. 2010-250346, dated 8 Nov. 2010; 2010-250345, dated 8 Nov. 2010; 2010-250344, dated 8 Nov. 2010; 2010-250343, dated 8 Nov. 2010; 2010-250342, dated 8 Nov. 2010; 2011-133554, dated 15 Jun. 2011; and 2011-139948, dated 23 Jun. 2011, the disclosures of which are also incorporated herein by reference.

TECHNICAL FIELD

The present invention relates to a technique of a belt type continuously variable transmission, and more particularly relates to a technique of a hydraulic servo mechanism for changing a transmission ratio in the belt type continuously variable transmission.

BACKGROUND ART

A technique described in Patent Document 1 has been known as a conventional technique of a belt type continuously variable transmission in which a driving force is transmitted with a belt being wound across a pair of pulleys having a variable groove width.

The belt type continuously variable transmission described in Patent Document 1 electrically controls an operation of a hydraulic cylinder for changing the groove width of the pulley on the basis of signals from various sensors such as a vehicle speed sensor and an accelerator pedal position sensor so that the transmission ratio in the belt type continuously variable transmission is changed as desired.

Unfortunately, the belt type continuously variable transmission described in Patent Document 1 has a disadvantage that a complicated configuration is required for electrically controlling the hydraulic cylinder.

RELATED ART DOCUMENT

Patent Document

[Patent document 1] Japanese Unexamined Patent Application Publication No. 2010-96338.

DISCLOSURE OF THE INVENTION

Problems to be Solved by the Invention

The present invention is made in view of the above circumstance, and provides a belt type continuously variable transmission that can execute a transmission with a simple configuration and without a complicated electrical control.

Means of Solving the Problems

The object to be achieved by the present invention is as described above. Now, means of achieving the object is described.

Specifically, in the present invention, in a belt type continuously variable transmission in which two shafts disposed in parallel to each other are each provided with one pulley, and a driving force is transmitted from one of the pulleys to the other one of the pulleys through a belt wound across the two pulleys, the pulleys each include a fixed sheave and a movable sheave slidable in directions toward and away from the fixed sheave. The belt type continuously variable transmission includes: a hydraulic cylinder provided to one of the movable sheaves of the two pulleys; and a hydraulic servo mechanism configured to control an operation of the hydraulic cylinder. A transmission is achievable through changing a distance between the fixed sheave and the movable sheave. The hydraulic servo mechanism includes: a valve chest disposed at a position facing the one of the movable sheaves; a servo spool slidably contained in the valve chest, coupled to a transmission controller, and configured to switch an oil passage in communication with a hydraulic chamber of the hydraulic cylinder by sliding in accordance with an operation on the transmission controller; and a feedback spool slidably contained in the servo spool, disposed in such a manner that one end comes into contact with the one of the movable sheaves, and configured to switch the oil passage in such a manner as to maintain a slid position of the movable sheave at a position corresponding to a slid position of the servo spool.

In the present invention, the feedback spool may be slidable in a direction that is the same as a sliding direction of the one of the movable sheaves, and may be biased in a direction to be in contact with the one of the movable sheaves.

In the present invention, a friction reducing member configured to reduce a friction between the feedback spool and the movable sheave may be disposed between the feedback spool and the movable sheave.

In the present invention, the belt type continuously variable transmission may further include a planetary gear mechanism configured to combine and output a driving force changed in a stepless manner by the two pulleys and the belt and a driving force transmitted without being changed by the two pulleys and the belt. The planetary gear mechanism may include: a sun gear; a ring gear coaxially disposed with the sun gear; a plurality of planetary gears that mesh with the sun gear and the ring gear; and a carrier gear coaxially disposed with the sun gear. The planetary gears may be respectively rotatably supported by a plurality of planetary shafts each having one end rotatably supported by the carrier gear.

In the present invention, an end of each of the plurality of planetary shafts on an opposite side of the carrier gear with respect to the planetary gear may be supported by a supporting member coaxially disposed with the sun gear.

In the present invention, an oil passage through which a lubricant to be supplied to the planetary shafts flows may be formed in the supporting member.

In the present invention, the carrier gear may be rotatably supported by the sun gear.

In the present invention, each of the fixed sheaves of the two pulleys may be fixed to a corresponding one of the shafts in such a manner as to be not relatively rotatable by fitting a through hole formed in the fixed sheave with the shaft. An axial direction position on the shaft may be determined by bringing a small diameter portion formed in the through hole of the fixed sheave in contact with a large diameter portion formed in the corresponding one of the shafts.

In the present invention, the fixed sheaves of the two pulleys may be made of the same material.

In the present invention, the movable sheaves of the two pulleys may be made of the same material.

In the present invention, the belt type continuously variable transmission may further include a coupling member disposed in grooves formed in the one of the movable sheaves to which the hydraulic cylinder is provided and in one of the shafts to which the one of the movable sheaves is provided, and configured to couple the one of the movable sheaves to the one of the shafts in such a manner as to be not relatively rotatable. Contact surfaces among the coupling member, the one of the movable sheaves, and the one of the shafts, and between the one of the movable sheaves and the belt may be lubricated by leakage of a hydraulic oil to be sent to the hydraulic chamber of the hydraulic cylinder through an oil passage formed in the one of the shafts.

In the present invention, an oil passage through which the hydraulic oil is supplied to a contact surface between the fixed sheave corresponding to the one of the movable sheaves and the belt may be formed in the one of the shafts.

In the present invention, the belt type continuously variable transmission may further include an output member coaxially disposed with the other one of the shafts; a cam mechanism disposed between the other one of the movable sheaves provided to the other one of the shafts and the output member and configured to allow a torque to be transmitted between the other one of the movable sheaves and the output member and to apply a pressing force in an axial direction in accordance with the torque to the other one of the movable sheaves; and a biasing member configured to bias the other one of the movable sheaves toward the fixed sheave corresponding to the other one of the movable sheaves. The biasing member may include a plurality of disc springs disposed between the other one of the movable sheaves and the output member and arranged in an axial direction of the other one of the shafts.

In the present invention, the belt type continuously variable transmission may further include a guide member configured to prevent misalignment of axes of the plurality of disc springs.

In the present invention, the guide member may include: a cylindrical outer guide member formed in the output member and configured to guide the plurality of disc springs from an outer side of the plurality of disc springs; and an inner guide member including a spring bearing disposed between one of the plurality of disc springs disposed closest to the other one of the movable sheaves and the other one of the movable sheaves, and a cylinder member configured to guide the plurality of disc springs from an inner side of the plurality of disc springs.

In the present invention, a spring chamber configured to contain the plurality of disc springs may be formed. An orifice in communication with an outside of the spring chamber may be formed in the spring chamber. The lubricant may be contained in the spring chamber.

In the present invention, the servo spool may be biased to return to an intermediate position. The hydraulic cylinder may include a movable side cylinder casing configured to be integrally slidable with the one of the movable sheaves. The feedback spool may be disposed to be in contact with the one of the movable sheaves with the movable side cylinder casing provided in between, and to slide along with the movable side cylinder casing. A spool position maintaining mechanism may be disposed between the hydraulic cylinder and the feedback spool, the spool position maintaining mechanism including a contact member that comes into contact with the feedback spool, and allowing the contact member to be slidable with respect to the movable side cylinder casing when a pressure in the hydraulic cylinder is lower than a predetermined value.

In the present invention, the spool position maintaining mechanism may include: a communication hole including a portion having a longitudinal direction as a sliding direction of the movable side cylinder casing, and formed in the movable side cylinder casing to communicate between inside and outside of the hydraulic cylinder; a sliding member slidably inserted in the communication hole in such a manner that an end protruding to the outside of the hydraulic cylinder comes into contact with a surface of the contact member on the opposite side of a surface of the contact member that comes into contact with the feedback spool; and an inhibiting member configured to inhibit the sliding movement of the contact member towards the feedback spool, at a predetermined position.

In the present invention, the belt type continuously variable transmission may further include an interlocking member configured to inhibit the sliding of the feedback spool in the direction to be in contact with the one of the movable sheaves, at a predetermined position.

In the present invention, an oil groove forming an oil passage leading to the hydraulic cylinder may be formed in the interlocking member.

Effects of the Invention

As effects of the present invention, the following effects are provided.

The present invention allows a transmission to be performed in a belt type continuously variable transmission with a simple configuration and without a complicated electrical control. Moreover a hydraulic servo mechanism can be made compact.

The present invention allows the transmission to be performed in the belt type continuously variable transmission with the simple configuration and without the complicated electrical control.

The present invention can prevent a movable sheave and a feedback spool from wearing by a friction.

In the present invention, a carrier for supporting a planetary gear is not used, and the planetary gear is supported by a carrier gear for inputting or outputting a driving force. Thus, planetary gear mechanism can be made compact and a cost can be reduced.

The present invention can surely support the planetary gear while making the planetary gear mechanism compact, and can further prevent an axis of the planetary gear from inclining.

In the present invention, the planetary gear can be supported and an oil passage for supplying a lubricant to a planetary shaft can be formed with a single member (supporting member), and thus the cost can be reduced.

The present invention can make the planetary gear mechanism compact.

The present invention can reduce a manufacturing cost and easily and surely position a fixed sheave on a shaft.

In the present invention, two fixed sheaves are common members, and thus a component cost can be reduced.

In the present invention, the two movable sheaves are common members, and thus the component cost can be reduced.

The present invention can appropriately lubricate contact surfaces among a coupling member, the movable sheave, and the shaft, and between the movable sheave and a belt, regardless of a slid position of the movable sheave.

The present invention can appropriately lubricate a contact surface between a fixed sheave fixed to the shaft and the belt.

In the present invention, a biasing member for biasing the movable sheave can have a short axial direction length, and thus can be made compact, and thus, the belt type continuously variable transmission can be made compact. Moreover, by changing any of a plurality of disc springs to a disc spring having a different spring constant, pressing force characteristic in the axial direction can be easily changed without changing a contained mode and a shape of the spring.

The present invention can make the biasing member compact, prevent misalignment of axes of the plurality of disc springs, and can stably bias the movable sheave.

The present invention can make the biasing member compact, prevent misalignment of axes of the plurality of disc springs, and can stably bias the movable sheave.

The present invention can obtain a damper effect.

In the present invention, when the pressure in the hydraulic cylinder drops because a driving source such as an engine stops or due to other reasons, the movable sheave might be slid by the tensile force of the belt, but the servo spool can be prevented from sliding along with the sliding of the movable sheave. Thus, a transmission controller coupled to the servo spool can be prevented from moving.

Furthermore, the servo spool is constantly biased to an intermediate position, and thus the servo spool can be maintained at the intermediate position even when the pressure in the hydraulic cylinder drops as described above, and thus the transmission controller can also be maintained at the intermediate position.

The present invention can prevent the feedback spool from excessively sliding relative to the servo spool to close an oil passage leading to the hydraulic cylinder. Thus, operability and operation feeling can be improved.

The present invention can secure a large area for an oil passage leading to the hydraulic cylinder.

DESCRIPTION OF THE REFERENCE NUMERAL

Figure 1:
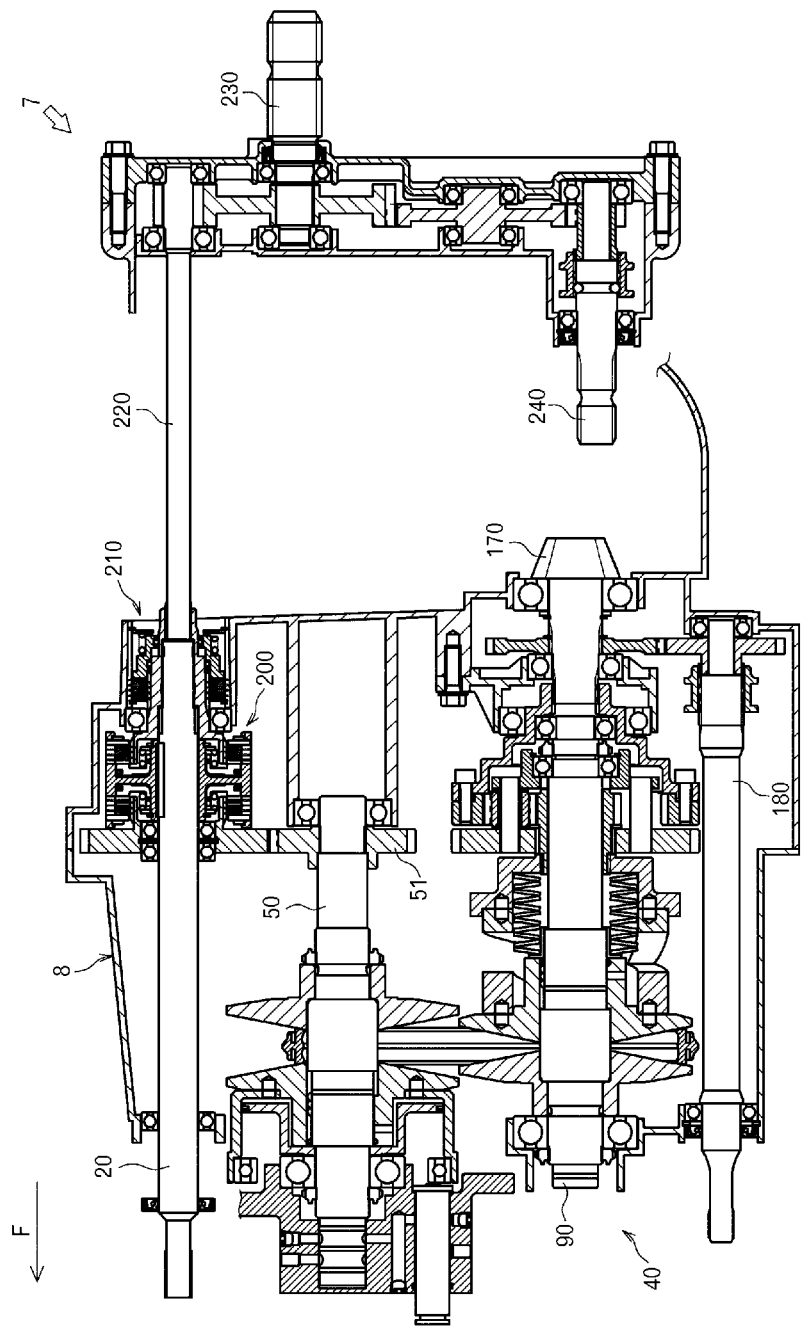
FIG. 1 is a side cross-sectional view showing an overall configuration of a transmission including a belt-type continuously variable transmission according to a first embodiment of the present invention.

40 Belt type continuously variable transmission
60 Input pulley
61 Input side fixed sheave
63 Input side movable sheave
70 Hydraulic cylinder
72 Bearing
76 Hydraulic chamber
80 Hydraulic servo mechanism
81a Valve chest
83 Servo spool
84 Feedback spool
100 Output pulley
101 Output side fixed sheave
103 Output side movable sheave
140 Belt

Modes for Carrying Out the Invention

A transmission 7 as a transmission in a work vehicle is described below with reference to FIG. 1. The transmission 7 according to this embodiment is described as that mounted in a tractor as an agricultural vehicle. However, the present invention is not limited to this, and may be widely applied to vehicles in general including other agricultural vehicles, construction vehicles, industrial vehicles, and the like. The description is given below with the direction indicated by an arrow F in the drawings defined as a forward direction.

The transmission 7 changes a driving force from an engine (not illustrated) as a driving source and then outputs the driving force. The transmission 7 includes a mission input shaft 20, a clutch mechanism 200, a belt type continuously variable transmission 40, an output shaft 170, a front wheel driving force transmission shaft 180, a PTO brake 210, a PTO input shaft 220, a rear PTO shaft 230, a mid-PTO shaft 240, and the like.

The driving force from the engine is transmitted to the mission input shaft 20 and then is transmitted to the belt type continuously variable transmission 40 and the PTO input shaft 220 through the clutch mechanism 200.

The driving force transmitted to the belt type continuously variable transmission 40 is changed in a stepless manner in the belt type continuously variable transmission 40 and then is transmitted to the output shaft 170 and the forward wheel driving force transmission shaft 180.

The driving force transmitted to the output shaft 170 is transmitted to rear wheels (not illustrated) of the tractor through a final speed reducer (not illustrated), and the like.

The driving force transmitted to the front wheel driving force transmission shaft 180 is transmitted to front wheels (not illustrated) of the tractor through a front axle (not illustrated) and the like.

The driving force transmitted to the PTO input shaft 220 is transmitted to the rear PTO shaft 230 and the mid-PTO shaft 240 through a gear and the like.

The speed of the tractor can be adjusted as desired through changing the transmission ratio in the belt type continuously variable transmission 40 in the transmission 7 having the configuration described above.

An implement (a rototiller and the like for example) coupled to the rear PTO shaft 230 and an implement (a mid-mower and the like for example) coupled to the mid-PTO shaft 240 can be driven by driving forces respectively transmitted to the rear PTO shaft 230 and the mid-PTO shaft 240.

When the transmission of the driving force from the engine to the PTO input shaft 220 is cutoff by the clutch mechanism 200, the PTO brake 210 controls the rotation of the PTO input shaft 220.

The belt type continuously variable transmission 40 can be applied to transmissions other than the transmission 7 according to this embodiment, and can be widely applied to transmissions that changes and then outputs the driving force from the driving source.

Components of the belt type continuously variable transmission 40 according to a first embodiment will be described in detail below with reference to FIG. 1 to FIG. 14. The belt type continuously variable transmission 40 includes a transmission input shaft 50, an input pulley 60, a hydraulic cylinder 70, a hydraulic servo mechanism 80, a transmission shaft 90, an output pulley 100, an output member 110, a cam mechanism 120, a biasing member 130, a belt 140, a planetary gear mechanism 150, and the like.

Figure 2:
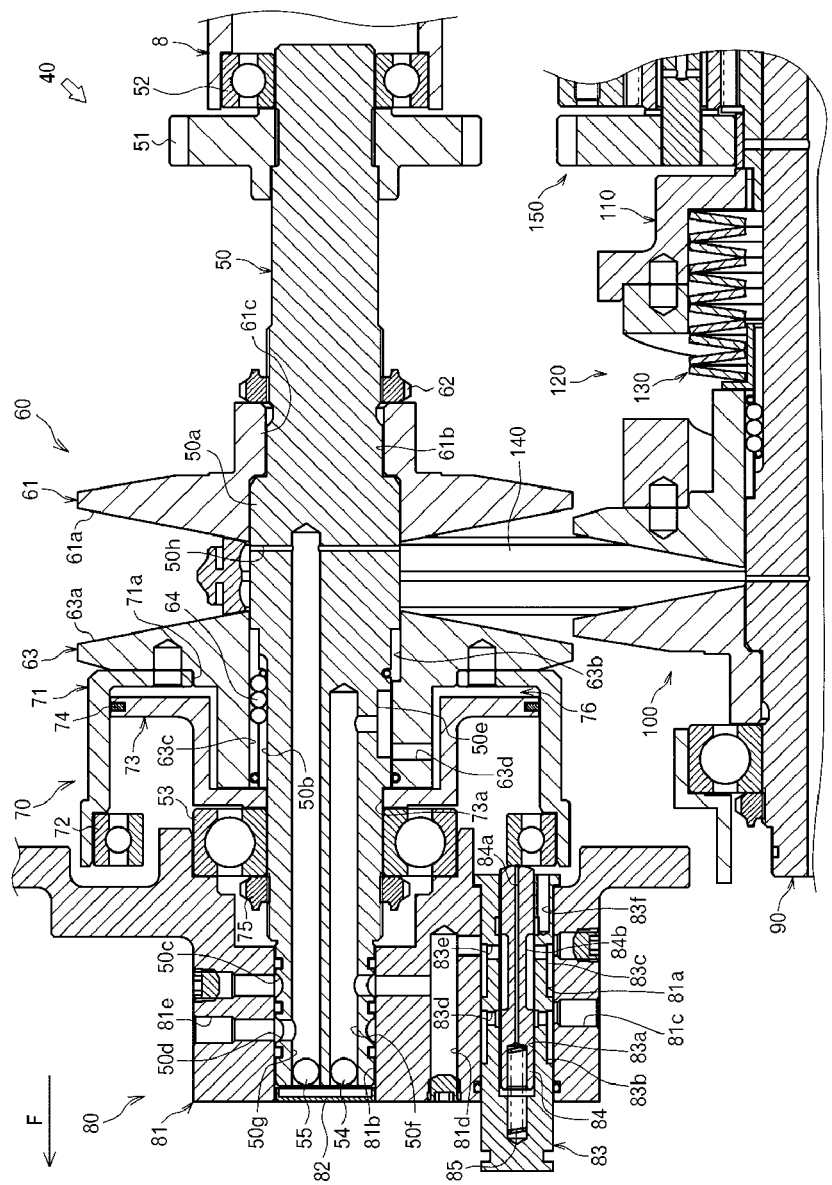
FIG. 2 is a side cross-sectional view showing a transmission input shaft and the like of the belt-type continuously variable transmission.

The transmission input shaft 50 shown in FIG. 1 and FIG. 2 is coupled to the mission input shaft 20, and transmits the driving force from the mission input shaft 20. The transmission input shaft 50 has an approximately column shape and is disposed with an axial direction thereof being a front-rear direction.

At an intermediate part of the transmission input shaft 50 in the front-rear direction, a large diameter portion 50a having a larger diameter than the other portion is formed.

A transmission input gear 51 is coupled to a portion of the transmission input shaft 50 around the rear end through spline fitting in such a manner as to be not relatively rotatable with respect to the transmission input shaft 50. The transmission input gear 51 meshes with a gear of the clutch mechanism 200 (see FIG. 1), and thus the driving force from the mission input gear 20 is transmittable to the transmission input gear 51 through the clutch mechanism 200. A method of coupling the transmission input gear 51 to the transmission input shaft 50 is not limited to the spline fitting, and the transmission input gear 51 and the transmission input shaft 50 can be integrally formed, for example.

A bearing 52 fits the transmission input shaft 50 at a portion right behind the transmission input gear 51. A bearing 53 fits the transmission input shaft 50 at a portion more on the front side than the larger diameter portion 50a. The bearings 52 and 53 are respectively supported by a mission casing 8 accommodating the transmission 7 and a front casing 81 to be described later, and thus the transmission input shaft 50 is rotatably supported by the mission casing 8.

Figure 3:
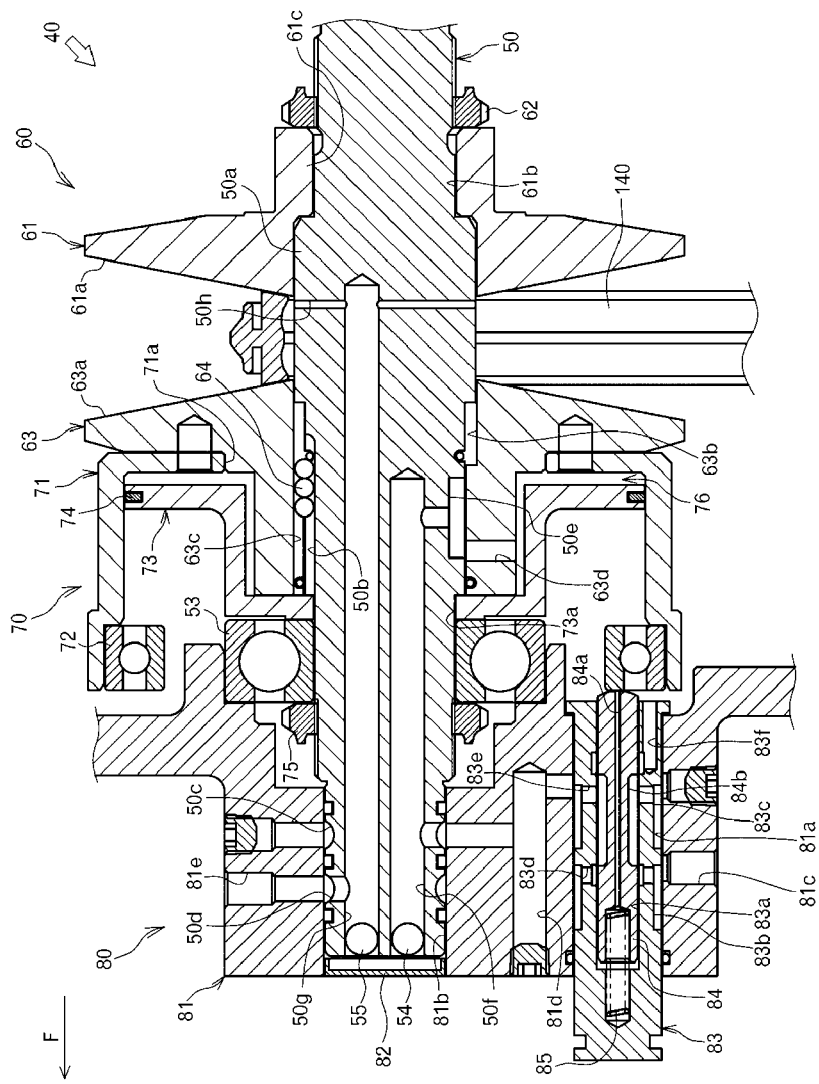
FIG. 3 is a side cross-sectional view showing an input pulley, a hydraulic cylinder, a hydraulic servo mechanism, and the like of the same.

The input pulley 60 shown in FIG. 3 is disposed on the transmission input shaft 50, and includes a pair of sheaves. The input pulley 60 includes an input side fixed sheave 61, an input side movable sheave 63, and the like.

The input side fixed sheave 61 includes an approximately cylindrical shaft portion, and an annular sheave portion integrally formed at the front end of the shaft portion and having an approximately frustum shape in a side cross sectional view. The input side fixed sheave 61 fits on the outer side of the transmission input shaft 50 with the sheave portion disposed more on the front side than the shaft portion. A front surface 61a of the sheave portion of the input side fixed sheave 61 is formed as an inclined surface so that a diameter increases from the front side to the rear side.

A through hole 61b formed through the input side fixed sheave 61 in the front-rear direction is formed on the axis of the input side fixed sheave 61. A small diameter portion 61c at which the diameter of the through hole 61b is smaller than the other portion is formed at the rear end portion of the through hole 61b (specifically, a portion corresponding to the shaft portion of the input side fixed sheave 61 in the axial direction). The transmission input shaft 50 is inserted in the through hole 61b of the input side fixed sheave 61 from the front side. The transmission input shaft 50 is pressed in until the front surface of the small diameter portion 61c of the through hole 61b comes into contact with the rear surface of the large diameter portion 50a of the transmission input shaft 50. With a portion right behind the large diameter portion 50a of the transmission input shaft 50 being press fit to the small diameter portion 61c of the input side fixed sheave 61, the input side fixed sheave 61 is fixed to the transmission input shaft 50 so as to be not relatively rotatable nor slidable.

With the input side fixed sheave 61 being thus fixed to the transmission input shaft 50 by press fitting, a manufacturing cost can be reduced compared with a case where a spline and a serration are used for the fixing. Moreover, insufficient fitting between the input side fixed sheave 61 and the transmission input shaft 50 can prevented. Thus, the transmission ratio of the belt type continuously variable transmission 40 can be prevented from changing, and the degradation of the durability of the contact surface between the belt 140 and the input side fixed sheave 61 can be prevented.

Furthermore, the input side fixed sheave 61 can be positioned with respect to the transmission input shaft 50 only by the press fitting completed when the small diameter portion 61c of the through hole 61b comes into contact with the large diameter portion 50a of the transmission input shaft 50. Thus, the input side fixed sheave 61 can be positioned easier and more accurately than in a case where the input side fixed sheave 61 is fixed to the transmission input shaft 50 with a taper.

In this embodiment, the transmission input shaft 50 and the input side fixed sheave 61 are press fit (fit) with each other. Alternatively, any fitting method utilizing the configuration that the transmission input shaft 50 has a larger diameter than the through hole 61b, such as "shrink fitting" and "expansion fitting" may be used.

In this embodiment, the portion right behind the larger diameter portion 50a of the transmission input shaft 50 and the small diameter portion 61c of the input side fixed sheave 61 are press fit with each other. However, the present invention is not limited to this. Specifically, the larger diameter portion 50a of the transmission input shaft 50 and a portion right in front of the small diameter portion 61c of the input side fixed sheave 61 may be press fit with each other. In this press fitting, the small diameter portion 61c of the input side fixed sheave 61 may slide on the transmission input shaft 50 to serve as a guide in the press fitting.

Furthermore, in this embodiment, the input side fixed sheave 61 has the sheave portion formed at the front end of the shaft portion. This should not be construed as a limiting sense, and the sheave portion may be formed at the rear end of the shaft portion.

A locknut 62 is fastened to the transmission input shaft 50 at a portion right behind the input side fixed sheave 61. Thus, the input side fixed sheave 61 can be prevented from sliding rearward on the transmission input shaft 50, and the input side fixed sheave 61 can be surely fixed to the transmission input shaft 50.

The input side movable sheave 63a includes an approximately cylindrical shaft portion, and an annular sheave portion integrally formed at the rear end of the shaft portion, and having an approximately frustum shape in a side cross sectional view. The input side movable sheave 63 fits on the outer side of the transmission input shaft 50 and is disposed more on the front side than the input side fixed sheave 61 with the sheave portion disposed more on the rear side than the shaft portion. A rear surface 63a of the sheave portion of the input side movable sheave 63 is formed as an inclined surface so that a diameter increases from the rear side to the front side.

A through hole 63b formed through the input side movable sheave 63 in the front-rear direction is formed on the axis of the input side movable sheave 63. The transmission input shaft 50 is inserted in the through hole 63b of the input side movable sheave 63 from the rear side.

The front surface 61a of the input side fixed sheave 61 and the rear surface 63a of the input side movable sheave 63 face each other on the transmission input shaft 50. Thus, a groove of the input pulley 60 is defined by the front surface 61a and the rear surface 63a.

Sheave side grooves 63c and shaft side grooves 50b along the axial direction of the transmission input shaft 50 are respectively formed on an inner peripheral surface of the through hole 63b and an outer peripheral surface of the transmission input shaft 50. The sheave side grooves 63c are each formed at least from the front end (front end of the shaft portion) of the input side movable sheave 63 to an intermediate portion of the input side movable sheave 63 in the front-rear direction. The sheave side grooves 63c are formed at three portions in the inner peripheral surface of the through hole 63b at an equal interval in the peripheral direction, and the shaft side grooves 50b are formed at three portions in the outer peripheral surface of the transmission input shaft 50 at an equal interval in the peripheral direction. Steel balls 64, 64, . . . are disposed in a pair of grooves facing each other. Thus, the input side movable sheave 63 is supported by the transmission input shaft 50 in such a manner as to be slidable in the axial direction and not to be relatively rotatable.

Intervals between the sheave side grooves 63c and the shaft side grooves 50b are not limited to equal intervals, and the numbers of the sheave side grooves 63c and the shaft side grooves 50b are not limited to those described above.

A through hole 63d communicating between the outer peripheral surface of the shaft portion and the inner surface of the through hole 63b is formed in the input side movable sheave 63. The through hole 63d is formed at a position that does not overlap the sheave side grooves 63c formed in the inner peripheral surface of the through hole 63b.

The hydraulic cylinder 70 makes the input side movable sheave 63 slide on the transmission input shaft 50 along the axial direction of the transmission input shaft 50. The hydraulic cylinder 70 includes a movable side cylinder casing 71, a fixed side cylinder casing 73, and the like.

The movable side cylinder casing 71 is a box shaped member opened at the front portion. At the center of the rear surface of the movable side cylinder casing 71, a through hole 71a is formed along the axial direction. The shaft portion of the input side movable sheave 63 is inserted in the through hole 71a.

The movable side cylinder casing 71 is fixedly disposed on the input side movable sheave 63 by means of a fastening member such as a bolt, by welding, or by other means, with the front surface of the sheave portion of the input side movable sheave 63 being in contact with the rear surface of the movable side cylinder casing 71.

The movable side cylinder casing 71 and the input side movable sheave 63 may be integrally formed by forging and the like.

The fixed side cylinder casing 73 includes a box shaped portion opened at a rear portion and an annular flange integrally formed at the rear end of the box shaped portion. A through hole 73a is formed at the center of the front surface of the fixed side cylinder casing 73. The transmission input shaft 50 is inserted in the through hole 73a. The rear portion (flange) of the fixed side cylinder casing 73 is inserted in the movable side cylinder casing 71 from the opened side (front side) of the movable side cylinder casing 71. A seal member 74 is disposed between the fixed side cylinder casing 73 and the movable side cylinder casing 71.

After the fixed side cylinder casing 73 is inserted in the movable side cylinder casing 71, a bearing 72 fits on the inner side of an opened (front) side end of the movable side cylinder casing 71.

The transmission input shaft 50 is inserted in the bearing 53 at a portion right in front of the fixed side cylinder casing 73, and is rotatably supported by the mission casing 8 through the bearing 53.

A locknut 75 is fastened to the transmission input shaft 50 at a portion right in front of the bearing 53. Thus, the bearing 53 can be prevented from sliding forward, and thus the fixed side cylinder casing 73 can be prevented from sliding forward through the bearing 53. The bearing 53, the fixed side cylinder casing 73, the movable side cylinder casing 71, the input side movable sheave 63, the belt 140, and the input side fixed sheave 61 are disposed between the locknut 62 and the locknut 75. Thus, the torque applied to the members can be confined between the locknut 62 and the locknut 75.

As described above, the hydraulic cylinder 70 is disposed on the input side movable sheave 63 of the input pulley 60. In the hydraulic cylinder 70 having the configuration described above, a hydraulic chamber 76 is formed in a space defined by the input side movable sheave 63, the movable side cylinder casing 71, the fixed side cylinder casing 73, and the transmission input shaft 50.

The hydraulic servo mechanism 80 controls the operation of the input side movable sheave 63 through the hydraulic cylinder 70. The hydraulic servo mechanism 80 includes the front casing 81, a serve spool 83, a feedback spool 84, a spool spring 85, and the like.

The front casing 81 includes an approximately rectangular main body and a disk shaped flange formed integrally at the rear end of the main body. In the front casing 81, a valve chest 81a, a bearing hole 81b, a hydraulic oil port 81c, a communication oil passage 81d, a lubricant port 81, and the like are formed.

The valve chest 81a is a through hole having a circular cross-sectional shape and formed to communicate between the front surface and the rear surface of the front casing 81. The valve chest 81a is formed with the axial direction thereof being the front-rear direction. The valve chest 81a is formed at a position overlapping the input side movable sheave 63 of the input pulley 60 in the front view, that is, the position facing the input side movable sheave 63.

The bearing hole 81b is a through hole having a circular cross-sectional shape and formed to communicate between the front surface and the rear surface of the front casing 81. The bearing hole 81b is formed with the axial direction thereof being the front-rear direction. The front end portion of the transmission input shaft 50 is inserted in the bearing hole 81b from the rear side. The front end portion of the bearing hole 81b is closed by a plug 82.

The hydraulic oil port 81c is a through hole communicating between the side surface of the main body of the front casing 81 and the valve chest 81a. More specifically, the hydraulic oil port 81c communicates between the side surface of the main body of the front casing 81 and an approximately center portion of the valve chest 81a in the axial direction. The hydraulic oil port 81c is coupled to an unillustrated hydraulic oil pump through a pipe and the like.

The hydraulic oil port 81c may have any shape and size as long as the port communicates between the outside of the front casing 81 and the valve chest 81a.

The communication oil passage 81d is formed to communicate between the valve chest 81a and the bearing hole 81d, more specifically between a portion of the valve chest 81a around the rear end and a portion of the bearing hole 81b around the rear end.

The lubricant port 81e is a through hole formed to communicate between the side surface of the main body of the front casing 81 and the bearing hole 81b. More specifically, the lubricant port 81e communicates between the side surface of the main body of the front casing 81 and an approximately center portion of the bearing hole 81b in the axial direction. The lubricant port 81e is coupled to an unillustrated lubricant pump through a pipe and the like.

Figure 4:
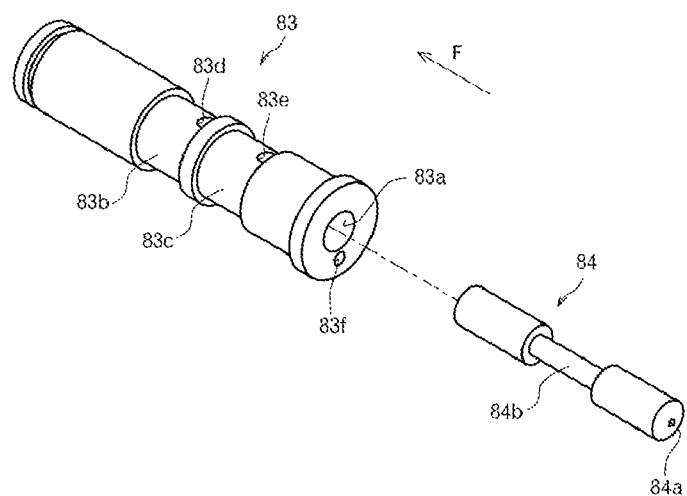
FIG. 4 is a diagram showing a servo spool and a feedback spool, in which (a) is a perspective and (b) is a side cross-sectional view.
Figure 4:
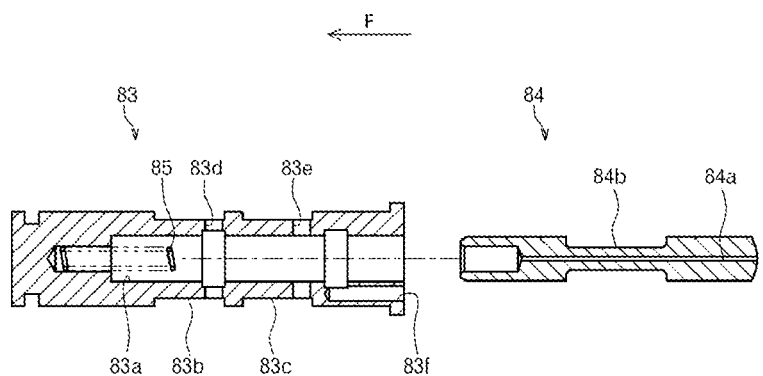

The servo spool 83 shown in FIG. 3 and FIG. 4 switches an oil passage in the hydraulic servo mechanism 80. The servo spool 83 has an approximately column shape with a disk shaped flange integrally formed at the rear end. The servo spool 83 is disposed with the axial direction thereof being the front-rear direction. In the servo spool 83, a sliding hole 83a, a first groove 83b, a second groove 83c, a first through hole 83d, a second through hole 83e, a discharge oil passage 83f, and the like are formed.

The sliding hole 83a is hole having a circular cross-sectional shape and formed from the rear end to a portion around the front end of the servo spool 83 on the axis of the servo spool 83.

The first groove 83b is formed along the outer peripheral surface of the servo spool 83 at an approximately center portion of the servo spool 83 in the axial direction. As will be described later, the first groove 83b is formed to be long in the axial direction of the servo spool 83 so that, even in a case where the servo spool 83 slides along the axial direction relative to the valve chest 81a of the front casing 81, the first groove 83b always faces the hydraulic oil port 81c regardless of the slid position of the servo spool 83.

The second groove 83c is formed at a portion more on the rear side than the first groove 83b of the servo spool 83 along the outer periphery of the servo spool 83. As will be described later, the second groove 83c is formed to be long in the axial direction of the servo spool 83 so that, even in a case where the servo spool 83 slides along the axial direction relative to the valve chest 81a of the front casing 81, the second groove 83c always faces the communication oil passage 81d regardless of the slid position of the servo spool 83.

The first through hole 83d has an axial direction orthogonal to the axis of the servo spool 83 and is formed to communicate between the first groove 83b and the sliding hole 83a.

The second through hole 83e has an axial direction orthogonal to the axis of the servo spool 83 and is formed to communicate between the second groove 83c and the sliding hole 83a.

The discharge oil passage 83f is formed to communicate between the rear end of the servo spool 83 and the sliding hole 83a. More specifically, the discharge oil passage 83f communicates between the rear end of the servo spool 83 and a portion of the sliding hole 83a more on the rear side than the portion facing the second groove 83c.

The outer diameter of the servo spool 83 is set to be approximately the same with the inner diameter of the valve chest 81a of the front casing 81. The servo spool 83 is slidably inserted in the valve chest 81a of the front casing 81 from the rear side. The diameter of the flange of the servo spool 83 is set to be larger than the diameter of the valve chest 81a of the front casing 81. When the flange comes into contact with the front casing 81, sliding of the servo spool 83 forward is inhibited at a predetermined position. The front end portion of the servo spool 83 is coupled to an unillustrated transmission controller such as a gearshift and a change pedal. The servo spool 83 can be slid in the forward-rear direction through an operation on the transmission controller.

The feedback spool 84 switches an oil passage in the hydraulic servo mechanism 80. The feedback spool 84 has an approximately column shape. The feedback spool 84 is disposed with the axial direction being the front-rear direction. In the feedback spool 84, a discharge oil passage 84a, a communication groove 84b, and the like are formed.

The discharge oil passage 84a is formed on the axis of the feedback spool 84 to communicate between the front and rear ends of the feedback spool 84.

The communication groove 84b is formed along the outer peripheral surface of the feedback spool 84 at an approximately center portion of the feedback spool 84 in the axial direction.

The outer diameter of the feedback spool 84 is set to be approximately the same with the inner diameter of the sliding hole 83a of the servo spool 83. The feedback spool 84 is slidably inserted in the sliding hole 83a of the servo spool 83. Thus, the feedback spool 84 is slidable in the front-rear direction relative to the servo spool 83.

The spool spring 85 biases the feedback spool 84 toward the rear side. The spool spring 85 is formed of a compression coil spring. The spool spring 85 is disposed in the sliding hole 83a of the servo spool 83 and constantly biases the feedback spool 84 toward the rear side (toward the input side movable sheave 63).

The biasing member is not limited to the compressed coil spring (spool spring 85) and any configuration may be employed as long as the feedback spool 84 can be biased toward the rear side.

With the feedback spool 84 being constantly biased toward the rear side by the spool spring 85, the rear end of the feedback spool 84 is constantly in contact with the bearing 72 (more specifically, an inner ring of the bearing 72) of the movable side cylinder casing 71 fixedly disposed to the input side movable sheave 63.

Thus, the feedback spool 84 contacts the movable side cylinder casing 71 not directly but with the bearing 72 disposed in between. Accordingly, the feedback spool 84 and the movable side cylinder casing 71 can be prevented from wearing by the friction. Specifically, the outer ring of the bearing 53 contacts the movable side cylinder casing 71, and the inner ring of the bearing 53 contacts the feedback spool 84. Thus, the bearing 72 reduces the friction between the feedback spool 84 and the movable side cylinder casing 71.

In this embodiment, the feedback spool 84 contacts the movable side cylinder casing 71 with the bearing 72 disposed in between. The present invention is not limited to this. Specifically, the feedback spool 84 may contact the input side movable sheave 63 with the bearing 72 disposed in between, or directly contact the input side movable sheave 63 without the bearing 72 disposed in between.

A member disposed between the feedback spool 84 and the movable side cylinder casing 71 is not limited to the bearing 72, and may be any member that can reduce the friction between the feedback spool 84 and the movable side cylinder casing 71 (a member having the friction reduced by surface finishing, for example).

In the transmission input shaft 50 shown in FIG. 3, a first groove 50c, a second groove 50d, an operation groove 50e, a hydraulic oil passage 50f, a lubricant passage 50g, and a distribution oil passage 50h are formed.

The first groove 50c is formed along the outer periphery of the transmission input shaft 50 at a portion of the transmission input shaft 50 around the front end portion in the axial direction. More specifically, the first groove 50c is formed at an axial direction position facing the communication oil passage 81d formed in the front casing 81 when the transmission input shaft 50 is inserted in the bearing hole 81b of the front casing 81.

The second groove 50d is formed along the outer periphery of the transmission input shaft 50 at a portion around the front end of the transmission input shaft 50 in the axial direction and more on the front side than the first groove 50c. More specifically, the second groove 50d is formed at an axial direction position facing the lubricant port 81e formed in the front casing 81 when the transmission input shaft 50 is inserted in the bearing hole 81b of the front casing 81.

The operation groove 50e is formed in a part of the outer peripheral surface of the transmission input shaft 50 at an intermediate portion of the transmission input shaft 50 in the axial direction. More specifically, the operation groove 50e is formed at an axial direction position facing the through hole 63d formed in the input side movable sheave 63 when the input side movable sheave 63 is supported by the transmission input shaft 50. The operation groove 50e is formed to be long in the axial direction of the transmission shaft 50 so that, even in a case where the input side movable sheave 63 slides along the axial direction relative to the transmission shaft 50, the operation groove 50e always faces the through hole 63d regardless of the slid position of the movable sheave.

The hydraulic oil passage 50f is a hole formed from the front end of the transmission input shaft 50 to approximately the same position as the operation shaft 50e in the axial direction. The front end portion of the hydraulic oil passage 50f is closed by a plug 54. The hydraulic oil passage 50f communicates with the first groove 50c at a portion around the front end portion and with the operation groove 50e at a portion around the rear end portion.

The lubricant passage 50g is a hole formed from the front end of the transmission input shaft 50 to approximately the same position as the rear end portion of the large diameter portion 50a in the axial direction. The front end portion of the lubricant passage 50g is closed by a plug 55. The lubricant passage 50g communicates with the second groove 50d at a portion around the front end portion.

The distribution oil passage 50h is a through hole having an axial direction orthogonal to the axis of the transmission input shaft 50, and formed to communicate between the outer peripheral surface of the transmission input shaft 50 and the lubricant passage 50g. More specifically, the distribution oil passage 50h communicates between the a portion of the outer peripheral surface of the large diameter portion 50a of the transmission shaft 50 around the front surface 61a of the sheave portion of the input side fixed sheave 61 fixed to the transmission input shaft 50 and the lubricant passage 50g.

How an operation of the hydraulic cylinder 70 is controlled with the hydraulic cylinder mechanism 80 having the configuration described above and the input side movable sheave 63 is slid will be described below.

First of all, a case where the servo spool 83 has slid forward to the maximum extent relative to the valve chest 81a as shown in FIG. 3 will be described.

Here, the input side movable sheave 63 and the movable side cylinder casing 71 fixedly disposed to the input side movable sheave 63 have slid forward to a position at which the front end of the shaft portion of the input side movable sheave 63 contacts the fixed side cylinder casing 73. The feedback spool 84 that contacts the bearing 72 fixed to the movable side cylinder casing 71 from the front side is maintained at a state of being pressed to a predetermined position relative to the sliding hole 83a of the servo spool 83 against the biasing force of the spool spring 85.

Here, the "predetermined position" of the feedback spool 84 is a relative position to the servo spool 83. More specifically, the predetermined position is a position at which the outer peripheral surface of the feedback spool 84 (more specifically, a portion of the outer peripheral surface more on the front side than the communication groove 84b) closes the first through hole 83d of the servo spool 83, and the outer peripheral surface of the feedback spool 84 (more specifically, a portion of the outer peripheral surface more on the rear side than the communication groove 84b) closes the discharge oil passage 83f of the servo spool 83.

The hydraulic oil pumped from the hydraulic oil pump is supplied to the first groove 83b of the servo spool 83 through the hydraulic oil port 81c of the front casing 81. Here, the first through hole 83d communicating between the first groove 83b and the sliding hole 83a is closed by the outer peripheral surface of the feedback spool 84. Thus, the hydraulic oil supplied from the hydraulic oil pump is blocked by the feedback spool 84, and thus is not supplied to the hydraulic chamber 76 of the hydraulic cylinder 70.

The input side movable sheave 63 is biased toward the front side by a tensile force of the belt 140 to be described later wound around the input pulley 60. The input side movable sheave 63 and the movable side cylinder casing 71 are maintained at the state after sliding forward.

Figure 5:
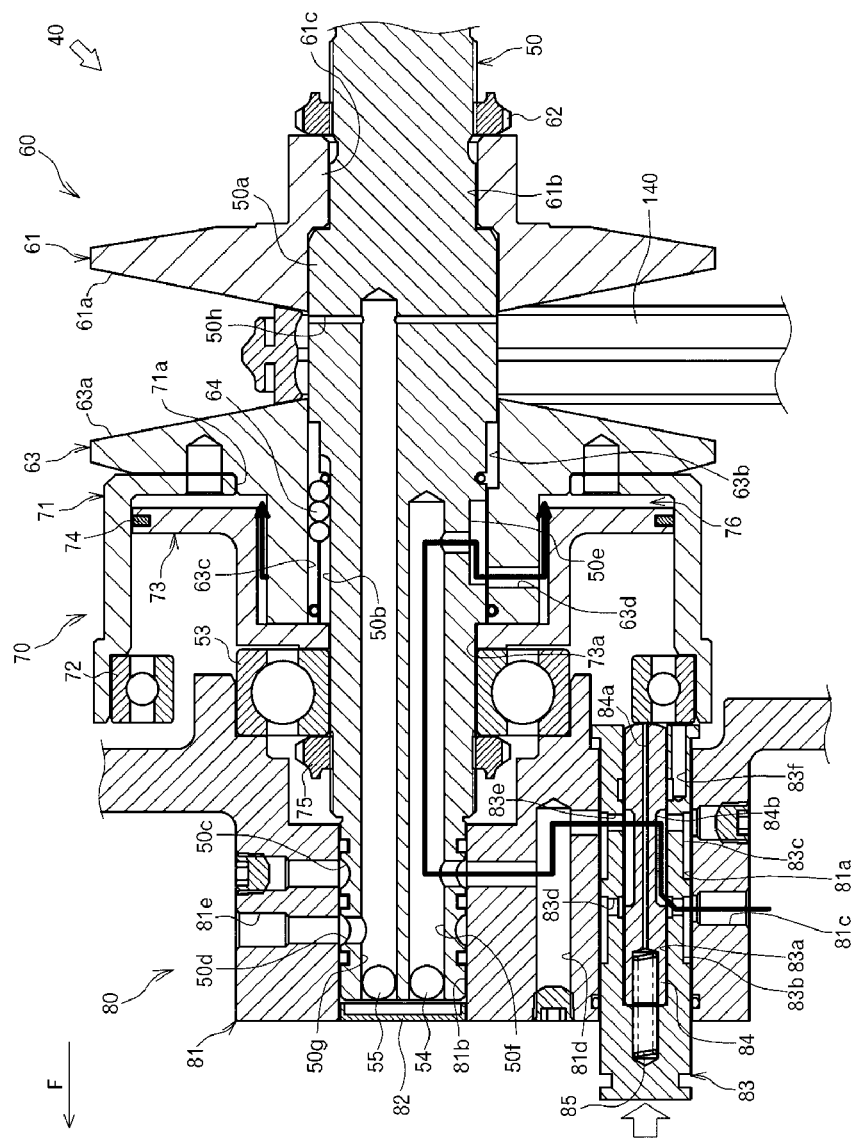
FIG. 5 is a side cross-sectional view showing a case where the servo spool of the belt-type continuously variable transmission has slid rearward.

Next, a case where the servo spool 83 has slid rearward through an operation on the transmission controller as shown in FIG. 5 will be described.

Here, while the servo spool slides 83 rearward, the feedback spool 84 is in contact with the bearing 72 and thus cannot slide rearward. Thus, the feedback spool 84 slides forward relative to the servo spool 83. As a result, the communication hole 84b of the feedback spool 84 faces the first through hole 83d and the second through hole 83e of the servo spool 83. Thus, the hydraulic oil supplied to the hydraulic oil port 81c from the hydraulic oil pump is supplied to the communication oil passage 81d through the first groove 83b, the first through hole 83d, the communication groove 84b, the second groove 83c, and the second through hole 83e.

The hydraulic oil supplied to the communication oil passage 81d is further supplied to the hydraulic chamber 76 through the first groove 50c, the hydraulic oil passage 50f, and the operation groove 50e of the transmission input shaft 50, and the through hole 63d of the input side movable sheave 63. When the hydraulic oil is supplied to the hydraulic chamber 76, the pressure in the hydraulic chamber 76 rises, and the input side movable sheave 63 and the cylinder casing 71 are biased toward the rear side by the pressure. The input side movable sheave 63 and the cylinder casing 71 thus biased toward the rear side by the pressure of the hydraulic oil slide rearward against the biasing force toward the front side produced by the tensile force of the belt 140 (see FIG. 6).

Figure 6:
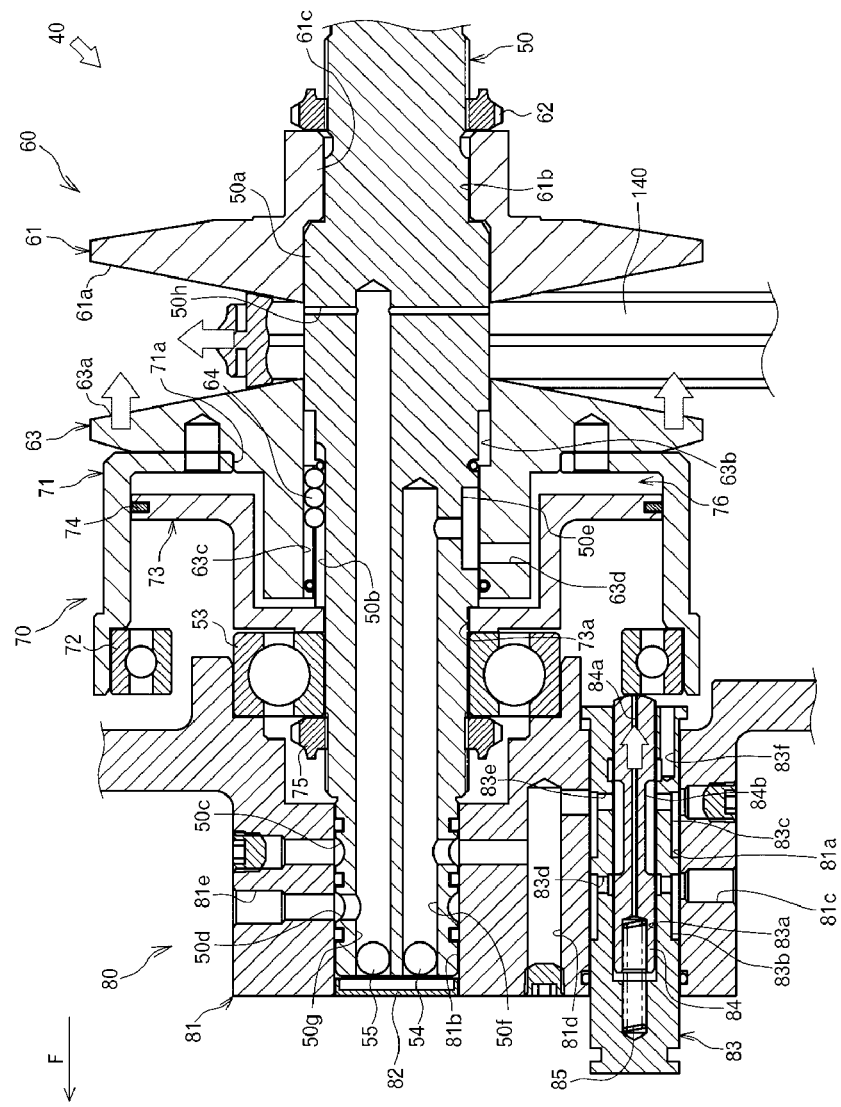
FIG. 6 is a side cross-sectional view showing a case where an input side movable sheave of the same has slid rearward.

Next, a case where the input side movable sheave 63 and the cylinder casing 71 have slid rearward as shown in FIG. 6 will be described.

When the input side movable sheave 63 and the movable side cylinder casing 71 slide rearward, the feedback spool 84 in contact with the bearing 72 fixed to the movable side cylinder casing 71 while being biased from the front side, also slides rearward. Thus, the feedback spool 84 slides rearward relative to the servo spool 83.

When the feedback spool 84 slides to the predetermined position, and thus the first through hole 83d of the servo spool 83 is again closed by the outer peripheral surface of the feedback spool 84, the supply of the hydraulic oil to the oil chamber 76 of the hydraulic cylinder 70 is terminated. Thus, the input side movable sheave 63 and the movable side cylinder casing 71 are maintained at positions at the point where the supplying of the hydraulic oil to the hydraulic chamber 76 is terminated.

Figure 7:
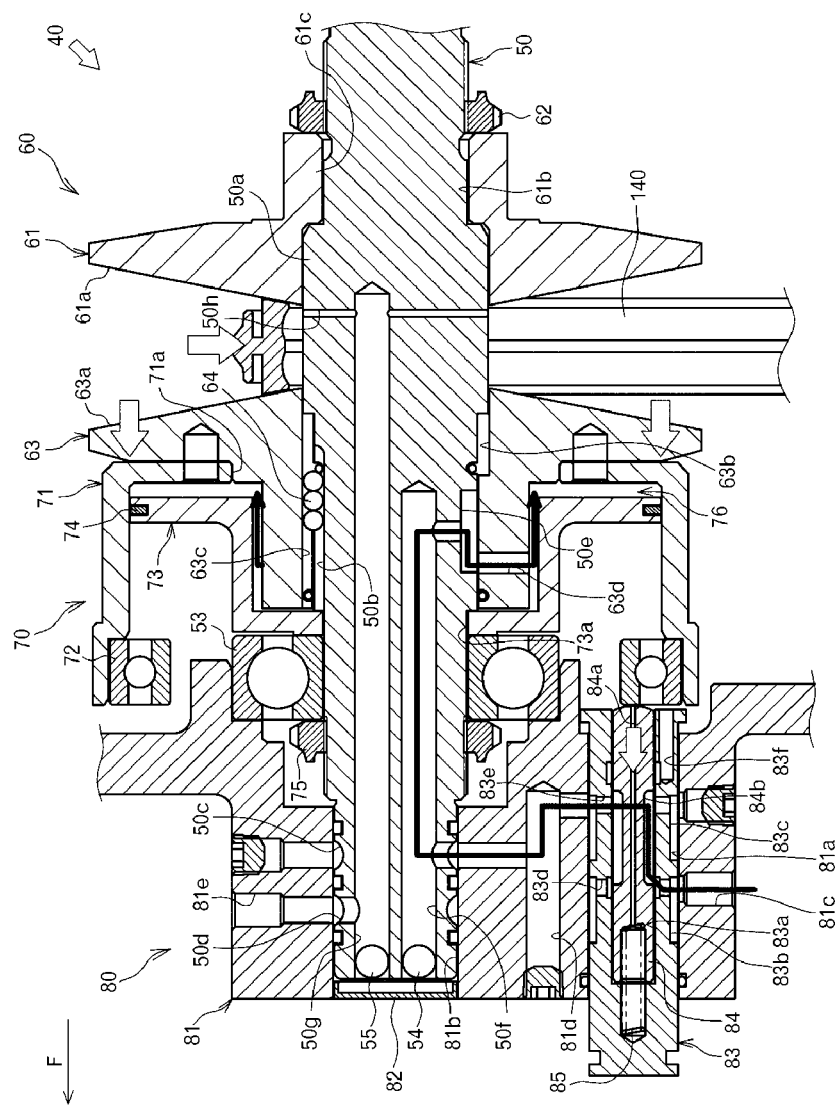
FIG. 7 is a side cross-sectional view showing a case where pressure in a hydraulic chamber of the hydraulic cylinder of the same has dropped.

Next, a case where the pressure in the hydraulic chamber 76 has dropped due to the leakage of the hydraulic oil from the hydraulic chamber 76 of the hydraulic cylinder 70 as shown in FIG. 7 will be described.

When the supplying of the hydraulic oil to the hydraulic chamber 76 is terminated in the state where the input side movable sheave 63 and the movable side cylinder casing 71 have slid rearward, the input side movable sheave 63 and the movable side cylinder casing 71 are maintained at positions at the point where the supplying of the hydraulic oil to the hydraulic chamber 76 is terminated. However, as the hydraulic oil in the hydraulic chamber 76 gradually leaks out through a gap between the movable side cylinder casing 71 and the fixed side cylinder casing 73, a gap between the input side movable sheave 63 and the transmission input shaft 50, and the like, the pressure in the hydraulic chamber 76 drops, and the tensile force of the belt 140 makes the input side movable sheave 63 and the movable side cylinder casing 71 gradually slide forward.

When the input side movable sheave 63 and the movable side cylinder casing 71 slide forward, the feedback spool 84 in contact with the bearing 72 fixed to the movable side cylinder casing 71 while being biased from the front side also slides forward. Thus, the feedback spool 84 slides forward relative to the servo spool 83.

When the feedback spool 84 slides forward, and the communication hole 84b of the feedback spool 84 again faces the first through hole 83d and the second through hole 83e of the servo spool 83, the hydraulic oil is again supplied to the hydraulic chamber 76 of the hydraulic cylinder 70. Thus, the input side movable sheave 63 and the movable side cylinder casing 71 slide rearward (see FIG. 6).

When the feedback spool 84 slides together with the input side movable sheave 63 and the movable side cylinder casing 71 to the predetermined position, and thus the first through hole 83d of the servo spool 83 is again closed by the outer peripheral surface of the feedback spool 84, the supplying of the hydraulic oil to the oil chamber 76 of the hydraulic cylinder 70 is terminated.

As described above, the feedback spool 84 slides along with the input side movable sheave 63 and the movable side cylinder casing 71 so that the oil passage in communication with the hydraulic chamber 76 is switched, and thus the input side movable sheave 63 and the movable side cylinder casing 71 can be maintained at positions corresponding to the slid position of the servo spool 83.

Figure 8:
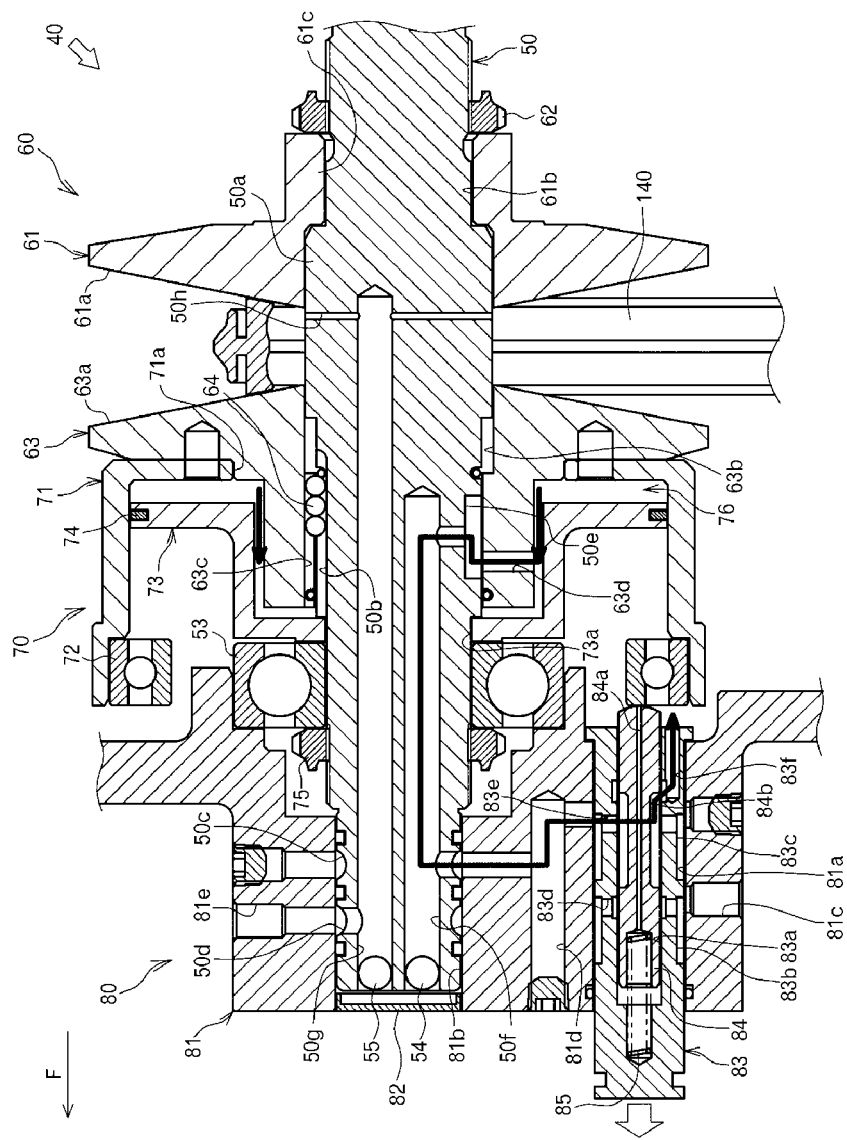
FIG. 8 is a side cross-sectional view showing a case where the servo spool of the same has slid forward.

Next, a state where the servo spool 83 has slid forward through an operation on the transmission controller as shown in FIG. 8 will be described.

Here, while the servo spool 83 slides forward, the feedback spool 84 maintained at a state of being in contact with the bearing 72, because the feedback spool 84 is biased towards the bearing 72 by the spool spring 85. Thus, the feedback spool 84 slides rearward relative to the servo spool 83. Thus, the communication groove 84b of the feedback spool 84 faces the discharge oil passage 83f of the servo spool 83, and thus the hydraulic oil can flow to the discharge oil passage 83f through the second groove 83c and the second through hole 83e.

The tensile force of the belt 140 biases the input side movable sheave 63 and the movable side cylinder casing 71 toward the front side. Thus, the hydraulic oil in the hydraulic chamber 76 of the hydraulic cylinder 70 is pushed out by the input side movable sheave 63 and the movable side cylinder casing 71. Thus, the hydraulic oil passes through the through hole 63*d* of the input side movable sheave 63, the operation groove 50*e*, the hydraulic oil passage 50*f*, and the first groove 50*c* of the transmission input shaft 50, the communication oil passage 81*d*, the second groove 83*c*, and the second through hole 83*e* of the servo spool 83, the communication groove 84*b* of the feedback spool 84, and the discharge oil passage 83*f* of the servo spool 83, to be discharged to the rear side from the rear end of the servo spool 83. The bearing 72 fixed to the movable cylinder casing 71 can be lubricated by the hydraulic oil discharged from the rear end of the servo spool 83. When the hydraulic oil in the hydraulic chamber 76 is discharged, the input side movable sheave 63 and the movable side cylinder casing 71 slide forward by the biasing force from the belt 140 (see FIG. 3).

Here, the first through hole 83*d* of the servo spool 83 is still closed by the outer periphery surface of the feedback spool 84. Thus, the hydraulic oil from the hydraulic oil pump is not supplied to the hydraulic chamber 76 of the hydraulic cylinder 70.

Next, a case where the input side movable sheave 63 and the movable side cylinder casing 71 have slid forward as shown in FIG. 3 will be described.

When the input side movable sheave 63 and the movable side cylinder casing 71 slide forward, the feedback spool 84 in contact with the bearing 72 fixed to the movable side cylinder casing 71 while being biased from the front side slides forward. Thus, the feedback spool 84 slides forward relative to the servo spool 83.

When the feedback spool 84 slides to the predetermined position so that the discharge oil passage 83*f* of the servo spool 83 is closed by the outer peripheral surface of the feedback spool 84, the discharge of the hydraulic oil from the hydraulic chamber 76 of the hydraulic cylinder 70 is terminated. Thus, the input side movable sheave 63 and the movable side cylinder casing 71 are maintained at positions at the point where the discharge of the hydraulic oil from the hydraulic chamber 76 of the hydraulic cylinder 70 is terminated.

As described above, by sliding the servo spool 83 to an appropriate position, the input side movable sheave 63 can be slid to a desired position. Moreover, the feedback spool 84 that slides along with the input side movable sheave 63 can maintain the input side movable sheave 63 at the desired slid position.

In this embodiment, sliding of the input side movable sheave 63 is caused by the hydraulic servo mechanism 80. However, the present invention is not limited to this. A configuration in which the sliding of an output side movable sheave 103 of the output pulley 100 described later is caused by the hydraulic servo mechanism 80 can be employed.

Figure 9:
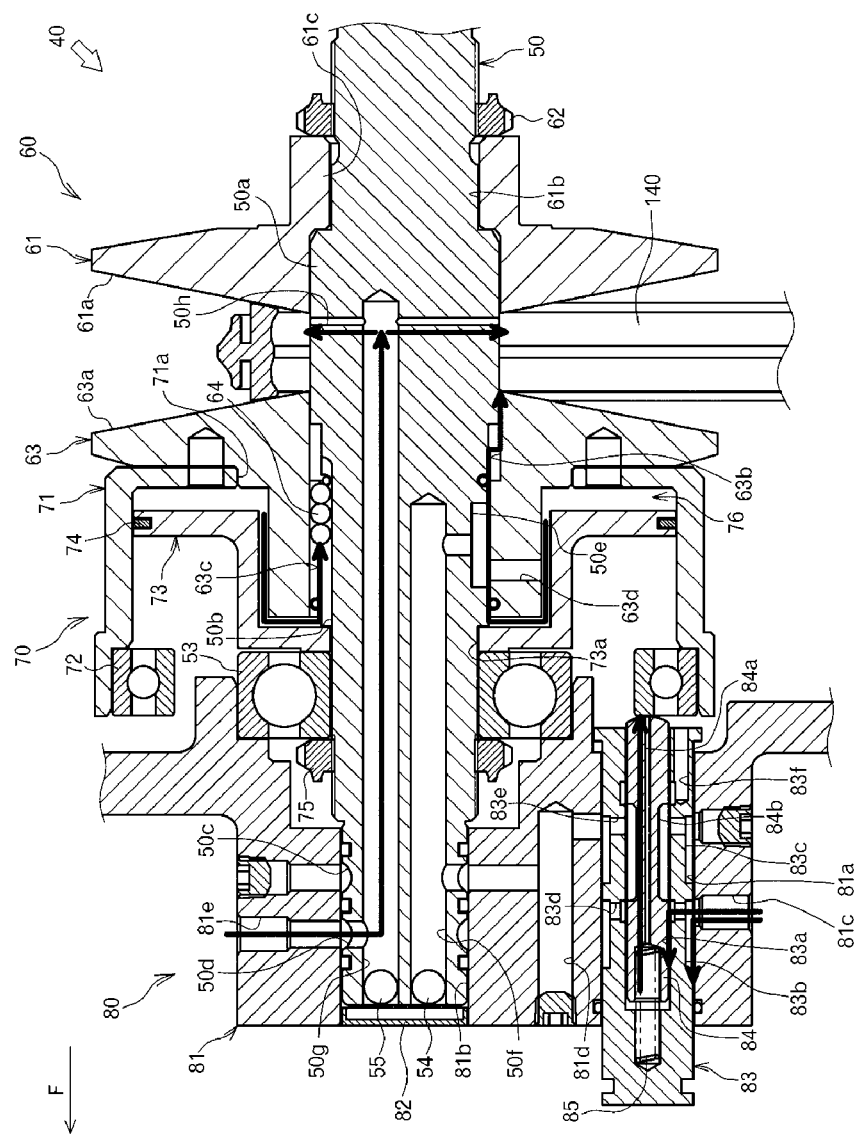
FIG. 9 is a side cross-sectional view showing how the transmission input shaft, the input pulley, the hydraulic cylinder, and the like are lubricated.

How the transmission input shaft 50, the input pulley 60, the hydraulic cylinder 70, and the like are lubricated in the configuration described above will be described below with reference to arrows shown in FIG. 9.

The hydraulic oil supplied to the hydraulic chamber 76 of the hydraulic cylinder 70 as described above leaks into the shaft side grooves 50*b* of the transmission input shaft 50 and the sheave side grooves 63*c* of the input side movable sheave 63 through a gap between the front end of the shaft portion of the input side movable sheave 63 and the fixed side cylinder casing 73. The steel balls 64, 64, . . . disposed in the shaft side grooves 50*b* and the sheave side grooves 63*c* are lubricated by the hydraulic oil.

The hydraulic oil supplied to the hydraulic chamber 76 of the hydraulic cylinder 70 leaks to the rear side of the sheave side groove 63*c* through a gap between the front end of the shaft portion of the input side movable sheave 63 and the fixed side cylinder casing 73, and the gap between the input side movable sheave 63 and the transmission input shaft 50. The contact surface (sliding surface) between the input side movable sheave 63 and the transmission input shaft 50 is lubricated by the hydraulic oil.

As described above, a fixed oil passage is not provided in the transmission input shaft 50, and the hydraulic oil is supplied through the gap between the input side movable sheave 63 and the transmission input shaft 50. Thus, the input side movable sheave 63 can be appropriately lubricated regardless of the slid position of the input side movable sheave 63.

The rear surface 63*a* of the sheave portion of the input side movable sheave 63 and the contact surface of belt 140 to be described later are lubricated by the he hydraulic oil leaked to the rear side of the input side movable sheave 63 as described above.

Contact surfaces (sliding surfaces) between the valve chest 81*a* of the front casing 81 and the servo spool 83 and between the sliding hole 83*a* of the servo spool 83 and the feedback spool 84 are lubricated by the hydraulic oil flowing to be supplied from the hydraulic oil pump to the hydraulic chamber 76 of the hydraulic cylinder 70.

Moreover, the hydraulic oil leaked to the sliding hole 83*a* of the servo spool 83 through a gap between the servo spool 83 and the feedback spool 84 is discharged from the rear end of the feedback spool 84 through the discharge oil passage 84*a* of the feedback spool 84. The contact surface between the feedback spool 84 and the bearing 72 is lubricated by the hydraulic oil thus discharged.

The hydraulic oil pumped from the lubricant pump to be supplied to the lubricant port 81*e* of the front casing 81 is supplied to the outer peripheral surface of the transmission input shaft 50 (around the front surface 61*a* of the sheave portion of the input side fixed sheave 61) through the second groove 50*d*, the lubricant passage 50*g*, and the distribution oil passage 50*h* of the transmission input shaft 50. The contact surface between the front surface 61*a* of the sheave portion of the input side fixed sheave 61 and the belt 140 to be described later are lubricated by the hydraulic oil thus supplied.

As described above, the oil passage (the lubricant port 81*e*, the second groove 50*d*, as well as the lubricant passage 50*g*, and the distribution oil passage 50*h* of the transmission input shaft 50, and the like) for supplying the hydraulic oil for lubricating the front surface 61*a* of the input side fixed sheave 61 is formed for the input side fixed sheave 61 that does not slide relative to the transmission input shaft 50. Thus, the input side fixed sheave 61 can be appropriately lubricated.

Figure 10:
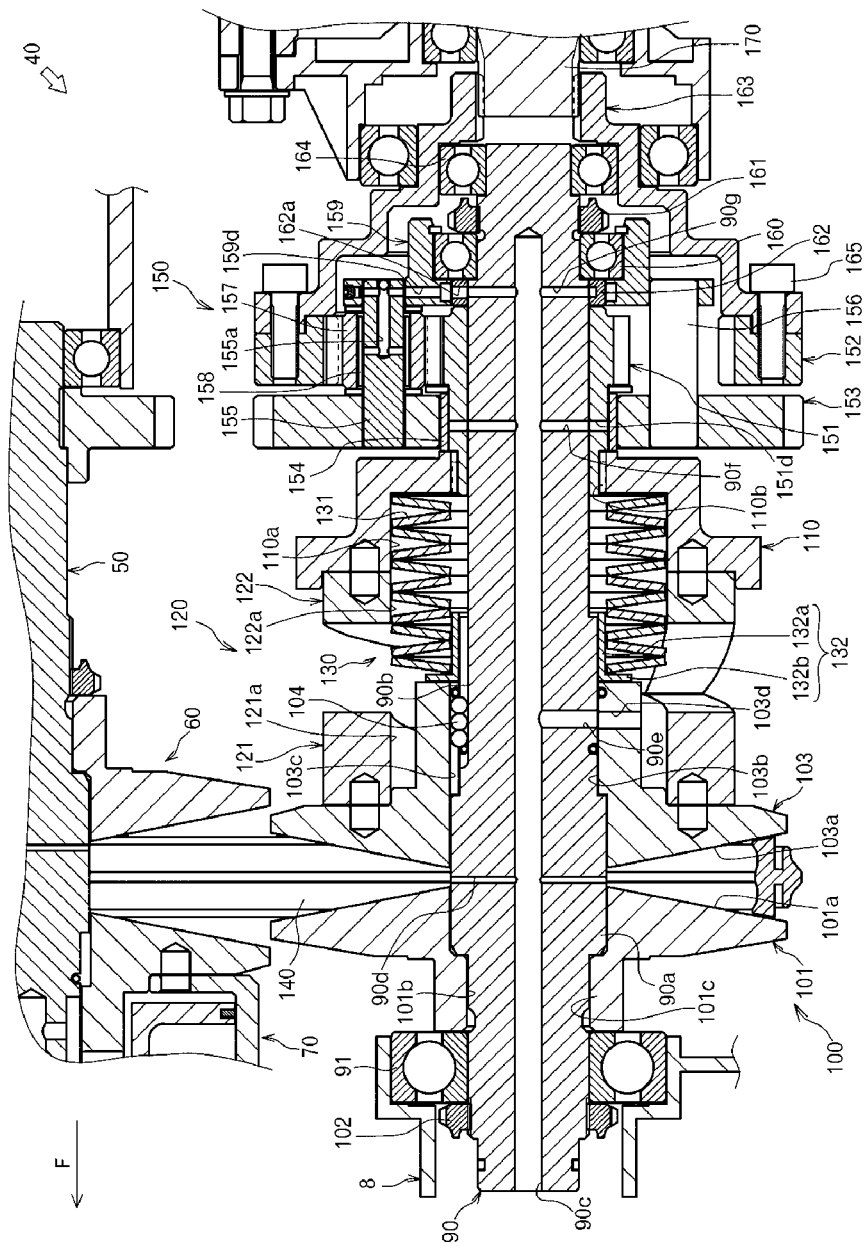
FIG. 10 is a side cross-sectional view showing a transmission shaft and the like of the belt-type continuously variable transmission.

The transmission shaft 90 shown in FIG. 1 and FIG. 10 transmits the driving force from the transmission input shaft 50. The transmission shaft 90 has an approximately column shape and is disposed with its axial direction being the front-rear direction.

In the transmission input shaft 50, a large diameter portion 90*a* having a larger diameter than the other portion is formed around the front end.

A bearing 91 fits the transmission shaft 90 at a portion more on the front side than the large diameter portion 90*a*. With the bearing 91 supported by the mission casing 8, the transmission shaft 90 is rotatably supported by the mission casing 8.

Figure 11:
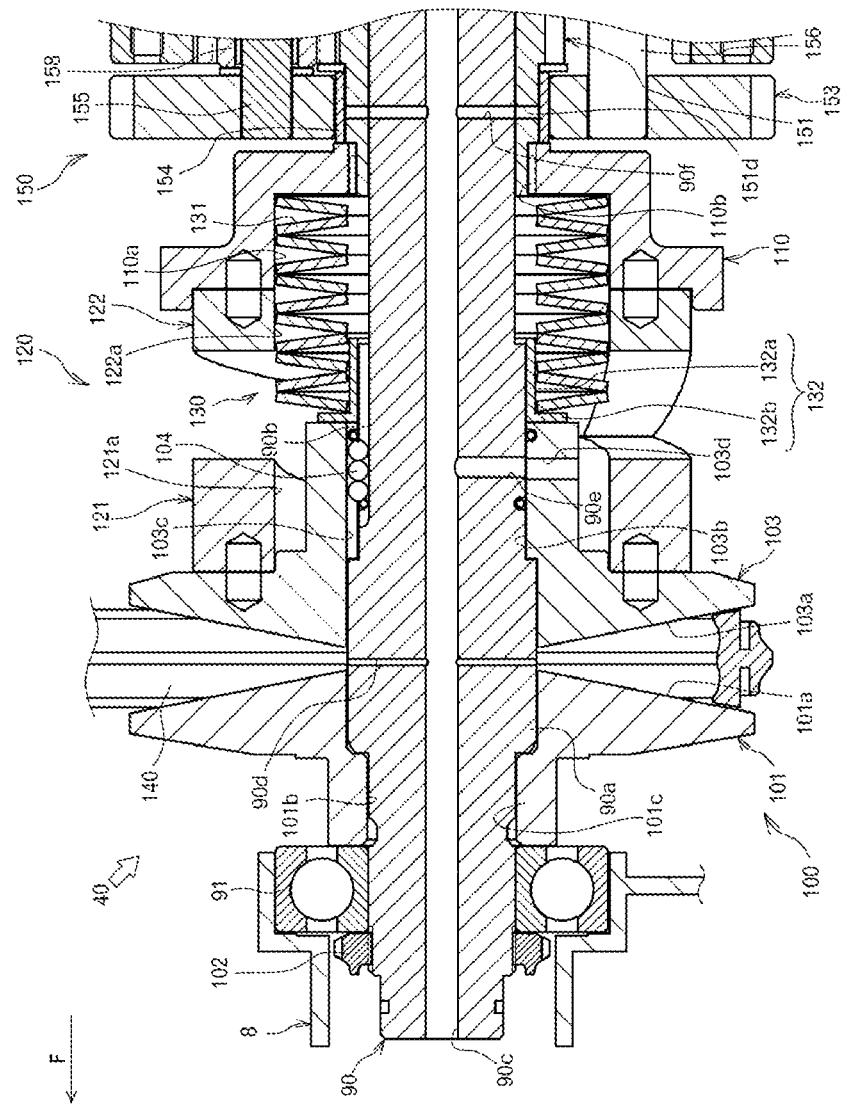
FIG. 11 is a side cross-sectional view showing an output pulley, a cam mechanism, a biasing member, and the like of the same.

The output pulley 100 shown in FIG. 11 is disposed on the transmission shaft 90 and includes a pair of sheaves. The output pulley 100 includes an output side fixed sheave 101, an output side movable sheave 103, and the like.

The output side fixed sheave 101 and the input side fixed sheave 61 are formed by the same material and have the same shape. Specifically, the input side fixed sheave 101 includes an approximately cylindrical shaft portion, and an annular sheave portion integrally formed at the rear end of the shaft portion and having an approximately frustum shape in a side cross sectional view. The input side fixed sheave 101 is fit on the outer side of the transmission shaft 90 with the sheave portion disposed more on the front side than the shaft portion. A rear surface 101a of the sheave portion of the output side fixed sheave 101 is formed as an inclined surface so that a diameter increases from the rear side to the front side.

A through hole 101b formed through the input side fixed sheave 101 in the front-rear direction is formed on the axis of the output side fixed sheave 101. A small diameter portion 101c at which the diameter of the through hole 101b is smaller than the other portion is formed at the front end portion of the through hole 101b (specifically, a portion corresponding to the shaft portion of the output side fixed sheave 101 in the axial direction). The transmission shaft 90 is inserted in the through hole 101b of the output side fixed sheave 101 from the rear side. The transmission shaft 90 is pressed in until the rear surface of the small diameter portion 101c of the through hole 101b comes into contact with the front surface of the large diameter portion 90a of the transmission shaft 90. With a portion right in front of the large diameter portion 90a of the transmission shaft 90 being press fit to the small diameter portion 101c of the output side fixed sheave 101, the output side fixed sheave 101 is fixed to the transmission shaft 90 so as to be not relatively rotatable nor slidable.

With the output side fixed sheave 101 being thus fixed to the transmission shaft 90 by press fitting, a manufacturing cost can be reduced compared with a case where a spline and a serration are used for the fixing. Moreover, insufficient fitting between the output side fixed sheave 101 and the transmission shaft 90 can be prevented. Thus, the transmission ratio of the belt type continuously variable transmission 40 can be prevented from changing, and the degradation of the durability of the contact surface between the belt 140 and the output side fixed sheave 101 can be prevented.

Furthermore, the output side fixed sheave 101 can be positioned with respect to the transmission shaft 90 only by the press fitting completed when the small diameter portion 101c of the through hole 101b comes into contact with the large diameter portion 90a of the transmission shaft 90. Thus, the output side fixed sheave 101 can be positioned easier and more accurately than in a case where the output side fixed sheave 101 is fixed to the transmission shaft 90 with a taper.

In this embodiment, the transmission shaft 90 and the output side fixed sheave 101 are press fit (fit) with each other. Alternatively, any fitting method utilizing the configuration that the transmission shaft 90 has a larger diameter than the through hole 101b of the output side fixed sheave 101, such as "shrink fitting" and "expansion fitting" may be used.

In this embodiment, the portion right in front of the larger diameter portion 90a of the transmission shaft 90 and the small diameter portion 101c of the output side fixed sheave 101 are press fit with each other. However, the present invention is not limited to this. Specifically, the larger diameter portion 90a of the transmission shaft 90 and a portion right behind the small diameter portion 101c of the output side fixed sheave 101 may be press fit with each other. In this press fitting, the small diameter portion 101c of the output side fixed sheave 101 may slide on the transmission shaft 90 to serve as a guide in the press fitting.

The transmission shaft 90 is inserted in the bearing 91 described above at a portion right in front of the output side fixed sheave 101, and is rotatably supported by the mission casing 8 through the bearing 91.

A locknut 102 is fastened to the transmission shaft 90 at a portion right in front of the bearing 91. Thus, the bearing 91 is prevented from sliding forward so that the output side fixed sheave 101 is prevented from sliding forward through the bearing 91, and the output side fixed sheave 101 can be surely fixed to the transmission shaft 90.

The output side movable sheave 103 and the input side movable sheave 63 are formed of the same material and have the same shape. Specifically, the output side movable sheave 103a includes an approximately cylindrical shaft portion and an annular sheave portion integrally formed at the front end of the shaft portion, and having an approximately frustum shape in a side cross sectional view. The output side movable sheave 103 is fit on the outer side of the transmission shaft 90 and disposed more on the rear side than the output side fixed sheave 101 with the sheave portion disposed more on the front side than the shaft portion. A front surface 103a of the sheave portion of the output side fixed sheave 103 is formed as an inclined surface so that a diameter increases from the front side to the rear side.

A through hole 103b formed through the output side movable sheave 103 in the front-rear direction is formed on the axis of the output side movable sheave 103. The transmission shaft 90 is inserted in the through hole 103b of the output side movable sheave 103 from the front side.

The rear surface 101a of the output side fixed sheave 101 and the front surface 103a of the output side movable sheave 103 face each other on the transmission shaft 90. Thus, a groove of the output pulley 100 is defined by the rear surface 101a and the front surface 103a.

Sheave side grooves 103c and shaft side grooves 90b along the axial direction of the transmission shaft 90 are respectively formed on an inner peripheral surface of the through hole 103b and an outer peripheral surface of the transmission shaft 90. The sheave side grooves 103c are each formed at least from the rear end (rear end of the shaft portion) of the output side movable sheave 103 to an intermediate portion in the front-rear direction of the output side movable sheave 103. The sheave side grooves 103c are formed at three portions in the inner peripheral surface of the through hole 103b at an equal interval in the peripheral direction, and the shaft side grooves 90b are formed at three portions in the outer peripheral surface of the transmission shaft 90 at an equal interval in the peripheral direction. Steel balls 104, 104, . . . are disposed in a pair of grooves facing each other. Thus, the output side movable sheave 103 is supported by the transmission shaft 90 in such a manner as to be slidable in the axial direction and not to be relatively rotatable.

Intervals between the sheave side grooves 103c and the shaft side grooves 90b are not limited to equal intervals, and the numbers of the sheave side grooves 103c and the shaft side grooves 90b are not limited to those described above.

The through hole 103d communicating between the outer peripheral surface of the shaft portion and the inner peripheral surface of the through hole 103b is formed in the output side movable sheave 103. The through hole 103d is formed at a position that does not overlap the sheave side grooves 103c formed in the inner peripheral surface of the through hole 103b.

As described above, the same members are commonly used for the input side fixed sheave 61 of the input pulley 60 and the output side fixed sheave 101 of the output pulley 100, and for the input side movable sheave 63 of the input pulley 60 and the output side movable sheave 103 of the output pulley 100. Thus, the number of component types can be reduced and thus, the component cost can be reduced.

The output member 110 transmits the driving force from the cam mechanism 120 to the planetary gear mechanism 150. The output member 110 includes a shaft portion having an approximately cylindrical shape and an annular flange integrally formed at the front end of the shaft portion. On the front end side of the output member 110, a cylindrical outer guide portion 110a is formed. The outer guide portion 110a is disposed with the axial direction thereof extending in the front-rear direction, and has a bottomed tubular shape with a front side opened. At the center of the rear surface of the output member 110, a through hole is formed in the axial direction. A spline portion 110b is formed on an inner peripheral surface of the through hole. The output member 110 is disposed at a portion more on the rear side than the output pulley 100 with the transmission shaft 90 inserted in the through hole of the output member 110.

The cam mechanism 120 allows the transmission of a torque between the output pulley 100 and the output member 110. The cam mechanism 120 includes a first cam 121, a second cam 122, and the like.

The first cam 121 has an approximately cylindrical shape. The first cam 121 is disposed with its axial direction extending in the front-rear direction, and its axis matching the axis of the transmission shaft 90. A through hole 121a having a predetermined inner diameter is formed on an axis of the first cam 121. The inner diameter of the through hole 121a of the first cam 121 is set to be approximately the same as the inner diameter of the outer guide member 110a of the output member 110. On the front surface of the first cam 121, a flat surface orthogonal to the axial direction is formed, and on the rear surface of the first cam 121, a plurality of surfaces inclined by a predetermined angle with respect to the surface orthogonal to the axial direction and the like are formed.

The shaft portion of the output side movable sheave 103 is inserted in the through hole 121a of the first cam 121 from the front side. The first cam 121 is fixedly disposed on the output side movable sheave 103 by means of a fastening member such as a bolt, by welding, or by other means, with the rear surface of the output side movable sheave 103 being in contact with the front surface of the first cam 121.

The first cam 121 and the output side movable sheave 103 may be integrally formed by forging and the like.

The second cam 122 and the first cam 121 are formed by the same material and have the same shape. Specifically, the second cam 122 is disposed with its axial direction extending in the front-rear direction, and with its axis matching the axis of the transmission shaft 90. A through hole 122a having a predetermined inner diameter is formed on the axis of the second cam 122. The inner diameter of the through hole 122a of the second cam 122 is set to be approximately the same as the inner diameter of the outer guide member 110a of the output member 110. On the rear surface of the second cam 122, a flat surface orthogonal to the axial direction is formed, and on the front surface of the second cam 122, a plurality of surfaces inclined by a predetermined angle with respect to the surface orthogonal to the axial direction and the like are formed.

The transmission shaft 90 is inserted in the through hole 122a of the second cam 122 from the front side. The second cam 122 is fixedly disposed on the output member 110 by means of a fastening member such as a bolt, by welding, or by other means, with the front surface of the output member 110 being in contact with the rear surface of the second cam 122. As a result, the rear surface of the first cam 121 and the front surface of the second cam 122 face each other.

The second cam 122 and the output member 110 may be integrally formed by forging and the like.

The biasing member 130 biases the output side movable sheave 103 toward the front side. The biasing member 130 is disposed in the outer guide member 110a of the output member 110 and includes a plurality of disc springs 131, 131, . . . arranged in the axial direction. The rear end of the biasing member 130 (the rearmost disc spring 131) comes into contact with the output member 110, while the front end of the biasing member 130 (the forward-most disc spring 131) comes into contact with the rear end of the output side movable sheave 103 with an inner guide member 132 disposed in between.

The inner guide member 132 includes an approximately cylindrical cylinder portion 132a and an annular spring bearing 132b integrally formed at the front end of the cylinder portion 132a. The inner diameter of the cylinder portion 132a is set to be approximately the same with the outer diameter of the transmission shaft 90, and the axial direction length of the cylinder portion 132a is set to a predetermined length. The spring bearing 132b is formed to be orthogonal to the axial direction.

The output side movable sheave 103 is biased toward the front side, that is, in the direction toward the output side fixed sheave 101, by the biasing force of the biasing member 130.

Here, the inner diameter of the guide member 110a of the output member 110 is set to be approximately the same as the inner diameter of the biasing member 130 (disc springs 131, 131, . . . ). The outer diameter of the cylinder portion 132a of the inner guide member 132 is set to be approximately the same as the inner diameter of the biasing member 130 (disc springs 131, 131, . . . ). Thus, ones of the disc springs 131 of the biasing member 130 disposed on the rear side are guided without having their axes misaligned, by the outer guide member 110a of the output member 110 (more specifically, by the inner peripheral surfaces of the outer guide member 110a of the output member 110 and the second cam 122), and ones of the disc springs 131 of the biasing member 130 disposed on the front side are guided without having their axes misaligned, by the cylinder portion 132a of the inner guide member 132. The misalignment of the axes of the plurality of disc springs 131, 131, . . . is thus prevented. Accordingly, the output side movable sheave 103 can be stably biased.

In a state where the output side movable sheave 103 has slid forward to the maximum extent, the cylinder portion 132a of the inner guide member 132 extends rearward in the axial direction to a position overlapping the inner peripheral surface of the second cam 122. With such a configuration, even when the output side movable sheave 103 slides forward to the maximum extent, all the disc springs 131, 131, . . . constituting the biasing member 130 can be guided by the outer guide member 110a of the output member 110 and the inner peripheral surface of the second cam 122 or the cylinder portion 132a of the inner guide member 132.

With the biasing member 130 being formed of the plurality of disc springs 131, 131, . . . as in this embodiment, the biasing member 130 can have a shorter length in the axial direction and thus can be more compact than in a case where a coil spring is used as the biasing member.

The belt 140 shown in FIG. 2 and FIG. 10 is wound around the grooves of the input pulley 60 and the output pulley 100. The belt 140 transmits the driving force from the input pulley 60 to the output pulley 100. The belt 140 is a metal belt including a band formed of stacked metallic thin plates and a metallic element. The present invention is not limited to this, and a rubber, chain, or resin belt may be used as the belt 140.

The belt 140 wound around the groove of the input pulley 60 is clamped by the input pulley 60 with the input side movable sheave 63 pressed toward the input side fixed sheave 61 with a predetermined strength by the hydraulic cylinder 70. The belt 140 wound around the groove of the output pulley 100 is clamped by the output pulley 100 with the output side movable sheave 103 pressed toward the output side fixed sheave 101 with a predetermined strength by the biasing force of the biasing member 130 and the like.

Figure 12:
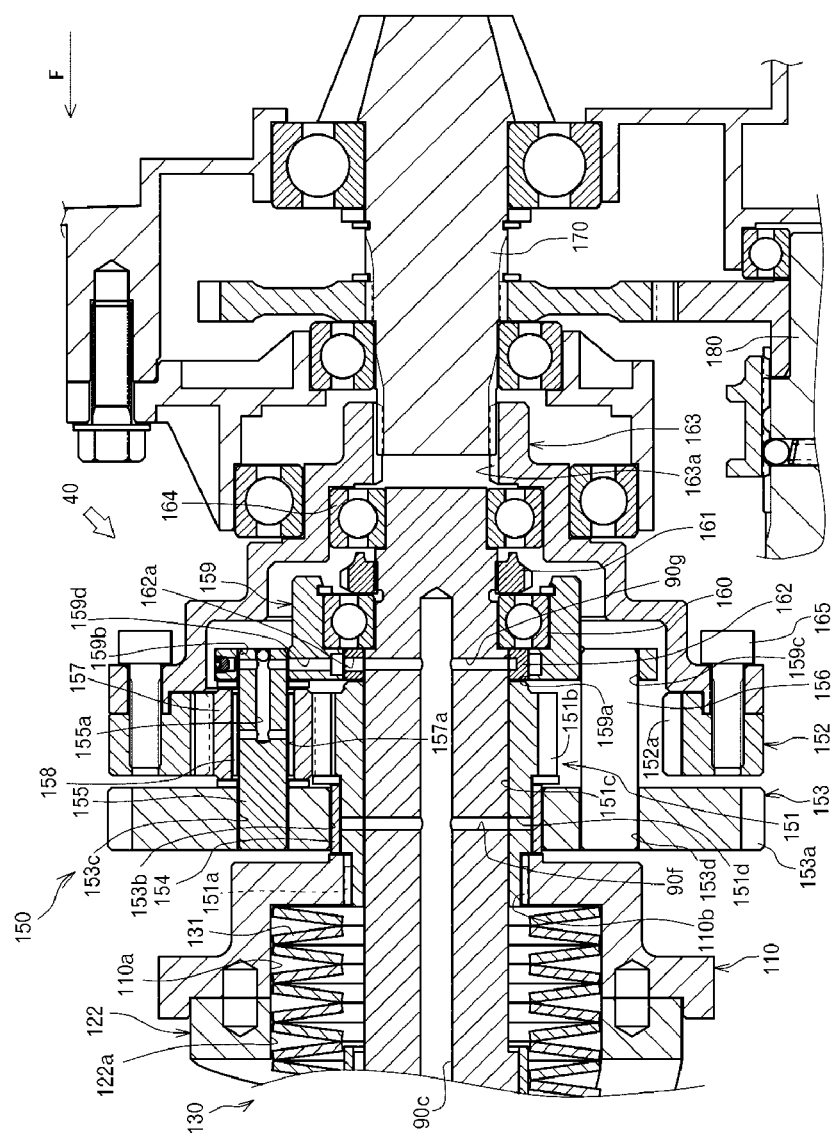
FIG. 12 is a side cross-sectional view showing a planetary gear mechanism, an output shaft, and the like of the same.
Figure 13:
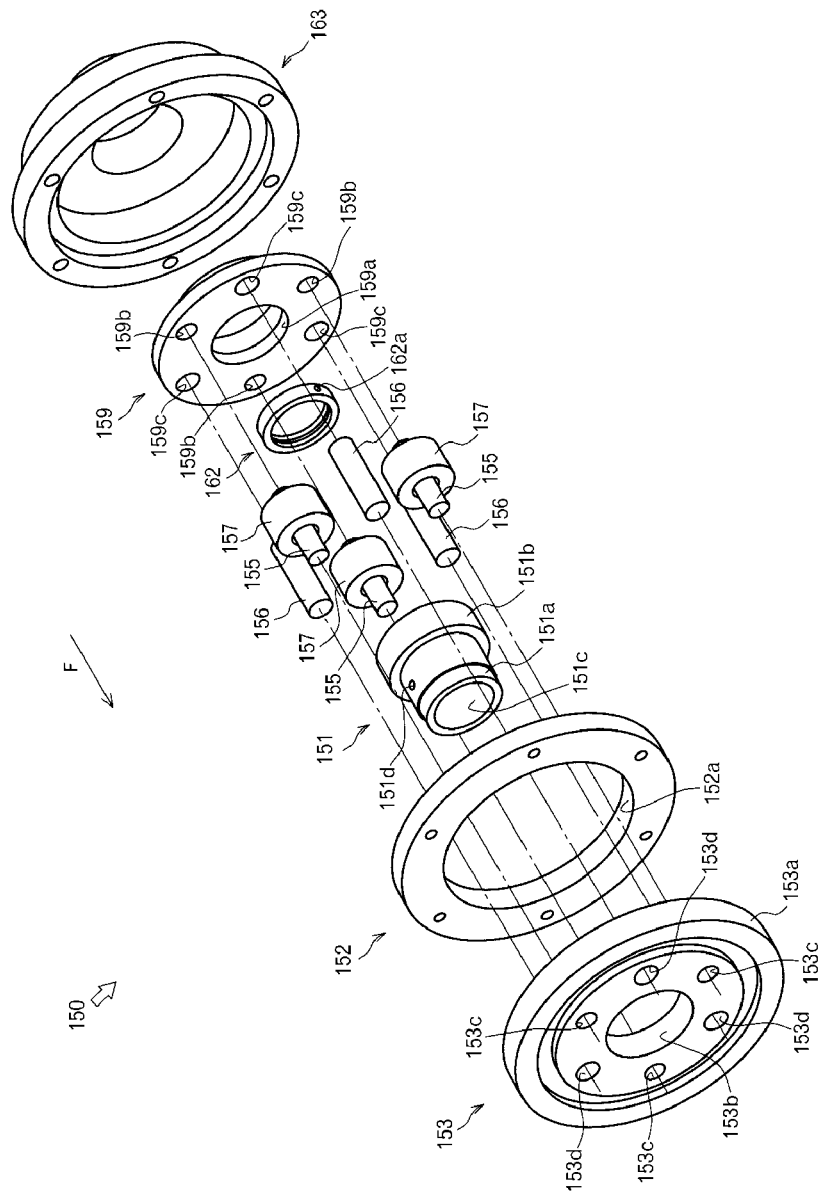
FIG. 13 is an exploded perspective view showing the planetary gear mechanism.

The planetary gear mechanism 150 shown in FIG. 12 and FIG. 13 combines and outputs two driving forces. The planetary gear mechanism includes a sun gear 151, a ring gear 152, a carrier gear 153, planetary shafts 155, 155, . . . , coupling shafts 156, 156, . . . , planetary gears 157, 157, . . . , a supporting member 159, a planetary output member 163, and the like.

In FIG. 13, detail shapes of teeth and splines formed in the gears are omitted.

The sun gear 151 is a gear having a spline portion 151*a* formed on an outer periphery of the front end of the approximately cylindrical shaft portion, and teeth 151*b* formed on an outer periphery of the rear end portion of the cylindrical shaft portion that is separated from the spline portion 151*a* by a predetermined distance. On the axis of the sun gear 151, a through hole 151*c* is formed through the sun gear 151 in the front-rear direction. The transmission shaft 90 is inserted in the through hole 151*c* of the sun gear 151 from the front side, and the sun gear 151 is relatively rotatably supported by the transmission shaft 90.

The spline portion 151*a* of the sun gear 151 meshes with the spline portion 110*b* of the output member 110, and the sun gear 151 integrally rotates with the output member 110.

The ring gear 152 is a gear having teeth 152*a* formed on an inner peripheral surface of an annular member. The transmission shaft 90 is inserted in the ring gear 152 from the front side and the teeth 152*a* of the ring gear 152 are disposed at a position facing the teeth 151*b* of the sun gear 151.

The carrier gear 153 is a gear having teeth 153*a* formed on an outer peripheral surface of an approximately disk shaped member. On the axis of the carrier gear 153, a through hole 153*b* is formed through the carrier gear 153 in the front-rear direction.

On a single periphery around the axis of the carrier gear 153, three through holes 153*c*, 153*c*, . . . each having a predetermined inner diameter are formed through the carrier gear 153 in the front-rear direction at an equal interval. Similarly, on the single periphery around the axis of the carrier gear 153, three through holes 153*d*, 153*d*, . . . each having a predetermined inner diameter are formed through the carrier gear 153 in the front-rear direction at an equal interval. The through holes 153*c*, 153*c*, . . . and the through holes 153*d*, 153*d*, . . . are alternately arranged on the single periphery.

The sun gear 151 supported by the transmission shaft 90 is inserted in the through hole 153*b* of the carrier gear 153. The carrier gear 153 is relatively rotatably supported at a cylinder portion (intermediate portion in the front-rear direction) of the sun gear 151 with a needle bearing 154 provided in between.

The teeth 153*a* of the carrier gear 153 mesh with the gear of the clutch mechanism 200 disposed on the mission input shaft 20. Thus, the driving force from the mission input shaft 20 can be transmitted through the clutch mechanism 200.

The planetary shafts 155, 155, . . . have an approximately column shape. The planetary shafts 155, 155, . . . have one ends (front end) fit in the respective through holes 153*c*, 153*c*, . . . of the carrier gear 153, and thus are fixed to the carrier gear 153. The other ends (rear ends) of the planetary shafts 155, 155, . . . extend rearward.

The coupling shafts 156, 156, . . . have an approximately column shape. The coupling shafts 156, 156, . . . have one ends (front end) fit in the respective through holes 153*d*, 153*d*, . . . of the carrier gear 153, and thus are fixed to the carrier gear 153. The other ends (rear ends) of the coupling shafts 156, 156, . . . extend rearward.

The planetary gears 157, 157, . . . are three gears that mesh with the teeth 151*b* of the sun gear 151 and the teeth 152*a* of the ring gear 152. On the axis of the planetary gear 157, a through hole 157*a* is formed through the planetary gear 157 in the front-rear direction. The planetary shafts 155, 155, . . . fixed to the carrier gear 153 are respectively inserted into the through holes 157*a*, 157*a*, . . . of the planetary gears 157, 157, . . . . The planetary gears 157, 157, . . . are relatively rotatably supported by the planetary shafts 155, 155, . . . with needle bearings 158, 158, . . . , provided in between.

The supporting member 159 includes an approximately cylindrical shaft portion and an annular flange integrally formed at the front end of the cylinder portion. On the axis of the supporting member 159, a through hole 159*a* is formed through the supporting member 159 in the front-rear direction.

On a single periphery around the axis of the supporting member 159, three through holes 159*b*, 159*b*, . . . each having a predetermined inner diameter are formed through the flange of the supporting member 159 in the front-rear direction at an equal interval. Similarly, on the single periphery around the axis of the supporting member 159, three through holes 159*c*, 159*c*, . . . each having a predetermined inner diameter are formed through the flange of the supporting member 159 in the front-rear direction at an equal interval. The through holes 159*b*, 159*b*, . . . and the through holes 159*c*, 159*c*, . . . are alternately arranged on the single periphery.

The transmission shaft 90 is inserted in the through hole 159*a* of the supporting member 159. The supporting member 159 is relatively rotatably supported by the transmission shaft 90 with a bearing 160 provided in between at a portion behind the planetary gears 157, 157, . . . . At a portion right behind the bearing 160, a locknut 161 is fastened to the transmission shaft 90. Thus, the bearing 160 can be prevented from sliding rearward.

The other ends of the planetary shafts 155, 155, . . . are respectively fit in the through holes 159*b*, 159*b*, . . . of the supporting member 159. The other ends of the coupling shafts 156, 156, . . . are respectively fit in the through holes 159*c*, 159*c*, . . . of the supporting member 159. Thus, the supporting member 159 is coupled to the carrier gear 153 in an integrally rotatable manner through the planetary shafts 155, 155, . . . and the coupling shafts 156, 156, . . . .

A communication member 162 having an annular shape is disposed between the through hole 159*a* of the supporting member 159 (more specifically, a portion corresponding to the flange of the supporting member 159) and the transmission shaft 90.

The planetary output member 163 is a box shaped member opened at the front portion. A through hole is formed at the center of the rear surface of the planetary output member 163, and a spline portion 163*a* is formed in the through hole. The planetary output member 163 is disposed to cover the rear end portion of the transmission shaft 90 and the supporting member 159 from the rear side of the transmission shaft 90. A portion around the center of the planetary output member 163 in the front-rear direction is relatively rotatably supported to the transmission shaft 90 with a bearing 164 provided in between. The front end of the planetary output member 163 is fastened to the ring gear with bolts 165, 165, . . . and is integrally rotatably coupled to the ring gear 152.

The planetary output member 163 and the ring gear 152 may be integrally formed by forging and the like.

An output shaft 170 is spline fit to the spline portion 163*a* of the planetary output member 163. The driving force from the planetary output member 163 is transmittable to rear wheels (not shown) and the front wheel driving force transmission shaft 180 of the tractor through the output shaft 170.

A configuration related to lubrication of the transmission shaft 90, the output pulley 100, and the planetary shaft mechanism 150 will be described below with reference to FIG. 11 and FIG. 12.

In the transmission shaft 90, a lubricant passage 90*c*, a distribution oil passage 90*d*, a cam portion oil passage 90*e*, a carrier distribution oil passage 90*f*, and a planetary distribution oil passage 90*g* are formed.

The lubricant passage 90*c* is a hole formed from the front end to a portion around the rear end in the transmission shaft 90. The lubricant passage 90*c* is coupled to an unillustrated lubricant pump through a pipe and the like.

The distribution oil passage 90*d* is a through hole having an axial direction in a direction orthogonal to the axis of the transmission shaft 90, and formed to communicate between the outer peripheral surface of the transmission shaft 90 and the lubricant passage 90*c*. More specifically, the distribution oil passage 90*d* communicates between a portion of the outer peripheral surface of the large diameter portion 90*a* of the transmission shaft 90 around the rear surface 101*a* of the sheave portion of the output side fixed sheave 101 fixed to the transmission shaft 90 and the lubricant passage 90.

The cam portion oil passage 90*e* is a through hole that communicates between a portion of the outer peripheral surface of the transmission shaft 90 facing the through hole 103*d* formed in the output side movable sheave 103 and the lubricant passage 90*c*.

The carrier distribution oil passage 90*f* is a through hole having an axial direction in a direction orthogonal to the axis of the transmission shaft 90, and formed to communicate between the outer peripheral surface of the transmission shaft 90 and the lubricant passage 90*c*. More specifically, the carrier distribution oil passage 90*f* communicates between a portion of the outer peripheral surface of the transmission shaft 90 facing the shaft portion (intermediate portion in the front-rear direction) of the sun gear 151 and the lubricant passage 90*c*.

The planetary distribution oil passage 90*g* is a through hole having an axial direction in a direction orthogonal to the axis of the transmission shaft 90, and formed to communicate between the outer peripheral surface of the transmission shaft 90 and the lubricant passage 90*c*. More specifically, the planetary distribution oil passage 90*g* communicates between a portion of the outer peripheral surface of the transmission shaft 90 facing the communication member 162 and the lubricant passage 90*c*.

A distribution oil passage 151*d* is formed in the sun gear 151.

The distribution oil passage 151*d* is a through hole having an axial direction in a direction orthogonal to the axis of the transmission shaft 90, and formed to communicate between the outer peripheral surface of the sun gear 151 and the through hole 151*c*. More specifically, the distribution oil passage 151*d* communicates between the outer peripheral surface of the shaft portion (intermediate portion in the front-rear direction) of the sun gear 151 and a portion of the transmission shaft 90 at the same position as the carrier distribution oil passage 90*f* in the axial direction.

A distribution oil passage 162*a* is formed in the communication member 162.

The distribution oil passage 162*a* is an oil passage defined by a groove formed in the inner peripheral surface of the communication member 162 and a through hole having an axial direction in a direction orthogonal to the axis of the communication member 162 and formed to communicate between the groove and the outer peripheral surface of the communication member 162.

A distribution oil passage 159*d* is formed in the supporting member 159.

The distribution oil passage 159*d* communicates between the through hole 159*a* and the through holes 159*b*, 159*b*, . . . of the supporting member 159. More specifically, the distribution oil passage 159*d* is formed of a groove formed at a portion of the inner peripheral surface of the through hole 159*a* of the supporting member 159 corresponding to the flange of the supporting member 159 and a through hole formed to communicate between the groove and the through holes 159*b*, 159*b*, . . . .

A lubricant passage 155*a* is formed in the planetary shaft 155.

The lubricant passage 155*a* communicates between a portion of the outer peripheral surface of the planetary shaft 155 facing the distribution oil passage 159*d* of the supporting member 159 and a portion of the outer peripheral surface of the planetary shaft 155 facing the needle bearing 158.

Figure 14:
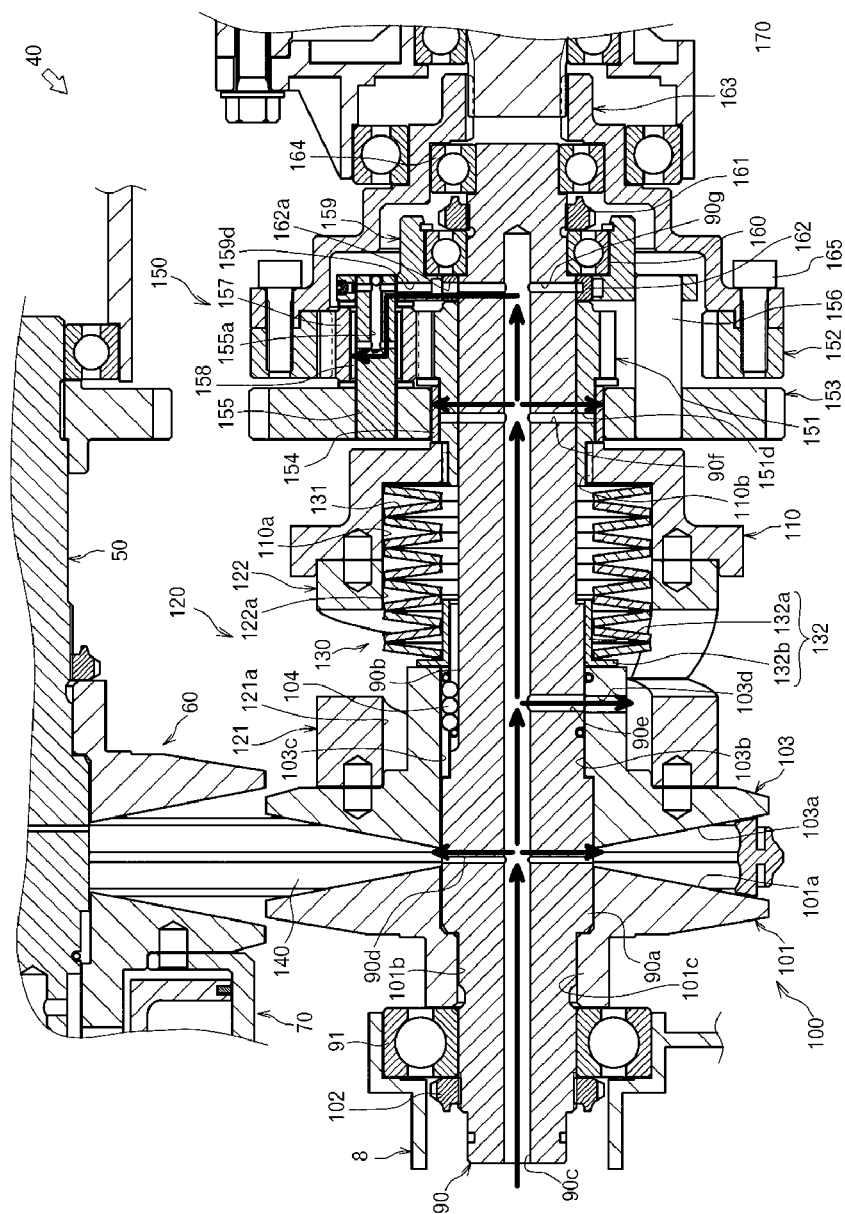
FIG. 14 is a side cross-sectional view showing how the output pulley, the planetary gear mechanism, and the like are lubricated.

How the transmission shaft 90, the output pulley 100, the planetary gear mechanism 150, and the like in the above described configuration are lubricated is described with reference to arrows shown in FIG. 14.

The hydraulic oil pumped from the lubricant pump to be supplied to the lubricant passage 90*c* of the transmission shaft 90 is supplied to the outer peripheral surface of the transmission shaft 90 (around the rear surface 101*a* of the sheave portion of the output side fixed sheave 101) through the distribution oil passage 90*d*. The contact surface between the rear surface 101*a* of the sheave portion of the output side fixed sheave 101 and the belt 140 is lubricated by the hydraulic oil thus supplied.

As described above, the oil passage (lubricant passage 90*c*, the distribution oil passage 90*d*, and the like) that is used for supplying the hydraulic oil by which the rear surface 101*a* of the sheave portion of the output side fixed sheave 101 is lubricated is formed for the output side fixed sheave 101 that does not slide relative to the transmission shaft 90. Thus, the output side fixed sheave 101 can be appropriately lubricated.

The hydraulic oil pumped from the lubricant pump to be supplied to the lubricant passage 90*c* of the transmission shaft 90 is supplied to the outer peripheral surface the shaft portion of the output side movable sheave 103 through the cam portion oil passage 90*e* and the through hole 103*d* of the output side movable sheave 103. The contact surface between the first cam 121 fixedly disposed to the output side movable sheave 103 and the second cam 122 that contacts the first cam 121 is lubricated by the hydraulic oil thus supplied.

The hydraulic oil pumped from the lubricant pump to be supplied to the lubricant passage 90*c* of the transmission shaft 90 is supplied to the outer peripheral surface of the cylinder portion of the sun gear 151 through the carrier distribution oil passage 90*f* and the distribution oil passage 151*d* of the sun gear 151. The needle bearing 154 fit on the outer side of the cylinder portion of the sun gear 151 is lubricated by the hydraulic oil thus supplied.

The hydraulic oil pumped from the lubricant pump to be supplied to the lubricant passage 90c of the transmission shaft 90 is supplied to the outer peripheral surfaces of the planetary shafts 155, 155, . . . through the planetary distribution oil passage 90g, the distribution oil passage 162a of the communication member 162, the distribution oil passage 159d of the supporting member 159, and the lubricant passages 155a, 155a, . . . of the planetary shafts 155, 155, . . . . The needle bearings 158, 158, . . . fit on the outer side of the respective planetary shafts 155, 155, . . . are lubricated by the hydraulic oil thus supplied.

An overview of the driving force transmission and the transmission in the belt type continuously variable transmission 40 having the above described configuration will be described below.

When the driving force from the engine is transmitted to transmission input shaft 50 through the mission input shaft 20 and the clutch mechanism 200, the input pulley 60 rotates together with the transmission input shaft 50. When the input pulley 60 rotates, the output pulley 100 is rotated through the belt 140. When the output pulley 100 rotates, the first cam 121 fixedly disposed to the output pulley 100 rotates. When the first cam 121 rotates, the rear surface (inclined surface) of the first cam 121 comes into contact with the front surface (inclined surface) of the second cam 122, and the second cam 122 rotates along with the rotation of the first cam 121. When the second cam 122 rotates, the sun gear 151 of the planetary gear mechanism 150 is rotated through the output member 110. When the sun gear 151 rotates, the planetary gears 157, 157, . . . in mesh with the sun gear 151 rotate around the planetary shafts 155, 155, . . . (rotation).

When the driving force from the engine is transmitted to the carrier gear 153 of the planetary gear mechanism 150 through the mission input shaft 20 and the clutch mechanism 200 (that is, without being changed by the input pulley 60, the output pulley 100, and the belt 140), the planetary gears 157, 157, . . . supported by the carrier gear 153 rotates along with the carrier gear 153 around the transmission shaft 90 (revolution).

The driving force transmitted to the planetary gear mechanism 150 from the mission input shaft 20 through the belt 140 and the driving force transmitted to the planetary gear mechanism 150 from the mission input shaft 20 without passing through the belt 140 are combined by the planetary gears 157, 157, . . . of the planetary gear mechanism 150. The combined driving force is transmitted to the output shaft 170 through the ring gear 152 in mesh with the planetary gears 157, 157, . . . and the planetary output member 163.

The cam mechanism 120 can apply biasing force to the output side movable sheave 103 toward the front side in accordance with the torque transmitted to the second cam 122 from the first cam 121. More specifically, a torsion is produced between the first cam 121 and the second cam 122 based on the torque transmitted by the cam mechanism 120. Here, since the rear surface (inclined surface) of the first cam 121 and the front surface (inclined surface) of the second cam 122 are in contact with each other, the force in directions to separate the first cam 121 and the second cam 122 works in accordance with the contacted surfaces. The force makes the first cam 121 and the second cam 122 move in the directions to be separated from one another, and thus the output side movable sheave 103 is biased toward the output side fixed sheave 101. The belt 140 can be clamped by the output pulley 100 with an appropriate strength by the biasing force of the biasing member 130.

When an operation of the hydraulic cylinder is controlled so that the input side movable sheave 63 slides rearward, the distance between the rear surface 63a of the input side movable sheave 63 and the front surface 61a of the input side fixed sheave 61 (groove width of the input pulley 60) is shortened. When the groove width of the input pulley 60 is decreased, the diameter of the belt 140 wound around the input pulley 60 increases. Since the total length of the belt 140 is constant, the increase in the diameter of the belt 140 wound around the input pulley 60 makes the output side movable sheave 103 of the output pulley 100 slide rearward against the biasing force by the biasing member 130. Thus, the groove width of the output pulley 100 increases and the diameter of the belt 140 wound around the output pulley 100 decreases. With the diameter of the belt 140 wound around the input pulley 60 increased and the belt 140 wound around the output pulley 100 reduced as described above, the driving force to be transmitted to the planetary gear mechanism 150 through the belt 140 can be changed to the acceleration side.

When an operation of the hydraulic cylinder 70 is controlled so that a state where the hydraulic oil in the hydraulic chamber 76 can be discharged is achieved, the divided force of the tensile force of the belt 140 wound around the input pulley 60 toward the front side makes the input side movable sheave 63 slide forward, thereby increasing the groove width of the input pulley 60. The increase in the groove width of the input pulley 60 reduces the diameter of the belt 140 wound around the input pulley 60. Since the total length of the belt 140 is constant, the reduction in the diameter of the belt 140 wound around the input pulley 60 makes the output side movable sheave 103 of the output pulley 100 slide forward by the biasing force of the biasing member 130. Thus, the groove width of the output pulley 100 decreases and the diameter of the belt 140 wound around the output pulley 100 increases. With the diameter of the belt 140 wound around the input pulley 60 reduced and the belt 140 wound around the output pulley 100 increased as described above, the driving force to be transmitted to the planetary gear mechanism 150 through the belt 140 can be changed to the deceleration side.

As described above, the driving force transmitted to the planetary gear mechanism 150 from the mission input shaft 20 and the belt 140 is changed. Thus, the driving force transmitted to the output shaft 170 through the planetary gear mechanism 150 can be changed from the normal rotation to the reverse rotation (i.e., from forward travel to backward travel).

As described above, the belt type continuously variable transmission 40 according to this embodiment includes:

the input pulley 60 including the input side fixed sheave 61 and the input side movable sheave 63 slidable in directions toward and away from the input side fixed sheave 61, as well as the output pulley 100 including the output side fixed sheave 101 and the output side movable sheave 103 slidable in directions toward and away from the output side fixed sheave 101;

the belt 140 wound across the two pulleys, and configured to transmit a driving force to one of the pulleys to the other one of the pulleys;

the hydraulic cylinder 70 provided to the input side movable sheave 63 of the input pulley 60; and the hydraulic servo mechanism 80 configured to control an operation of the hydraulic cylinder 70.

The belt type continuously variable transmission 40 can perform the transmission by changing the distance between the input side fixed sheave 61 and the input side movable sheave 63.

The hydraulic servo mechanism 80 includes:

the valve chest 81a disposed at a position facing the input side movable sheave 63;

the servo spool 83 slidably contained in the valve chest 81*a*, coupled to the unillustrated transmission controller, and configured to switch an oil passage leading to the hydraulic chamber 76 of the hydraulic cylinder 70 by sliding in accordance with an operation on the transmission controller; and the feedback spool 84 slidably contained in the servo spool 283 in such a manner that one end comes into contact with the input side movable sheave 63 with the bearing 72 and the like disposed in between, and configured to switch the oil passage to maintain a slid position of the input side movable sheave 63 at a position corresponding to a slid position of the servo spool 83.

With such a configuration, the transmission can be performed in the belt type continuously variable transmission 40 with a simple configuration and without complicated electrical control. The hydraulic servo mechanism 80 can be made compact.

The feedback spool 84 is slidable in a direction that is the same as a sliding direction of the input side movable sheave 63, and is biased in a direction to be in contact with the input side movable sheave 63.

In the belt type continuously variable transmission 40, the bearing 72 configured to reduce a friction between the feedback spool 84 and the input side movable sheave 63 is disposed between the feedback spool 84 and the input side movable sheave 63.

With such a configuration, the input side movable sheave 63 and feedback spool 84 can be prevented from wearing by a friction As described above, the belt type continuously variable transmission 40 according to this embodiment includes the planetary gear mechanism 150 configured to combine and output a driving force changed in a stepless manner by a pair of pulleys (the input pulley 60 and the output pulley 100) and the belt 140 wound across the pair of pulleys and a driving force transmitted without having being changed by the pair of pulleys and the belt 140.

The planetary gear mechanism 150 includes:
the sun gear disposed on the axis of the transmission shaft 90;
the ring gear 152 coaxially disposed with the sun gear 151;
the plurality of planetary gears 157, 157, . . . that mesh with the sun gear 151 and the ring gear 152; and
the carrier gear 153 coaxially disposed with the sun gear 151.

The planetary gears 157, 157, . . . are respectively rotatably supported by the plurality of planetary shafts 155, 155, . . . each having one end rotatably supported by the carrier gear 153;

With such a configuration, a carrier for supporting the planetary gears 157, 157, . . . is not used, and the planetary gears 157, 157, . . . are supported by the carrier gear 153 for inputting the driving force. Thus, the planetary gear mechanism 150 can be made compact and a cost can be reduced.

In the belt type continuously variable transmission 40, an end of each of the plurality of planetary shafts 155 on an opposite side of the carrier gear 153 with respect to the planetary gears 157, 157, . . . is supported by the supporting member 159 rotatably supported on the transmission shaft 90.

With such a configuration, the planetary gear mechanism 150 can be made compact, the planetary gears 157, 157, . . . can be surely supported, and the axes of the planetary gears 157, 157, . . . can be prevented from inclining.

In the supporting member 159, the distribution oil passage 159*d* through which the lubricant supplied to the planetary shafts 155, 155, . . . flows is formed.

With such a configuration, the planetary gears 157, 157, . . . can be supported and the distribution oil passage 159*d* for supplying the lubricant to the planetary shafts 155, 155, . . . can be formed with a single member (the supporting member 159), and thus the cost can be reduced.

The carrier gear 153 is rotatably supported by the sun gear 151.

With such a configuration, the planetary gear mechanism 150 can be made compact.

As described above, the belt type continuously variable transmission 40 according to this embodiment includes:
two shafts (the transmission input shaft 50 and the transmission shaft 90) disposed in parallel to each other;
the input pulley 60 including the input side fixed sheave 61 fixed to the transmission input shaft 50 and the input side movable sheave 63 supported by the transmission input shaft 50 in such a manner as to be slidable in the axial direction and not relatively rotatable;
the output pulley 100 including the output side fixed sheave 101 fixed to the transmission shaft 90 and the output side movable sheave 103 supported by the transmission shaft 90 in such a manner as to be slidable in the axial direction and not relatively rotatable; and
the belt 140 wound across the two belts.

Each of the fixed sheaves is fixed to a corresponding one of the shafts in such a manner as to be not relatively rotatable by fitting a through hole (the through hole 61*b* and the through hole 101*b*) formed in the fixed sheave with the shaft.

An axial direction position of the fixed sheave on the shaft is determined by bringing a small diameter portion (the small diameter portion 61*c* and the small diameter portion 101*c*) formed in the through hole of the fixed sheave into contact with a large diameter portion (the large diameter portion 50*a* and the large diameter portion 90*a*) formed in the corresponding one of the shafts.

With such a configuration, the manufacturing cost can be reduced and the fixed sheaves (the input side fixed sheave 61 and the output side fixed sheave 101) can be easily and surely positioned on the shafts (the transmission input shaft 50 and the transmission shaft 90).

The input side fixed sheave 61 and the output side fixed sheave 101 are made of the same material.

With such a configuration, the two fixed sheaves are common members, and thus a component cost can be reduced.

The input side movable sheave 63 and the output side movable sheave 103 are made of the same material.

With such a configuration, the two movable sheaves are common members, and thus the component cost can be reduced.

As described above, the belt type continuously variable transmission 40 according to this embodiment includes:
the output pulley 100 including the output side fixed sheave 101 fixed to the transmission shaft 90 and the transmission side movable sheave 103 supported by the transmission shaft 90 in such a manner as to be slidable in the axial direction and not relatively rotatable;
the output member 110 coaxially disposed with the transmission shaft 90;
the cam mechanism 120 disposed between the output side movable sheave 103 and the output member 110, and configured to allow a torque to be transmitted between the output side movable sheave 103 and the output member 110, and to apply a pressing force in the axial direction in accordance with the torque to the output side movable sheave 103; and
the biasing member 130 configured to bias the output side movable sheave 103 toward the output side fixed sheave 101.

The biasing member 130 includes the plurality of disc springs 131, 131, ... disposed between the output side movable sheave 103 and the output member 110 and arranged in the axial direction of the transmission shaft 90.

With such a configuration, the biasing member 130 for biasing the output side movable sheave 103 can have a short axial direction length, and thus can be made compact. Moreover, by replacing any of the plurality of disc springs 131, 131, ... with a disc spring having a different spring constant, pressing force characteristic in the axial direction can be easily changed without changing a contained mode and a shape of the spring.

The belt type continuously variable transmission 40 further includes the guide member configured to prevent misalignment of the axes of the plurality of disc springs 131, 131, . . . .

The guide member includes the cylindrical outer guide member 110a formed in the output member 110 and configured to guide the plurality of the disc springs 131, 131, ... from the outer side of the plurality of the disc springs 131, 131, ... ; and the inner guide member 132 including the spring bearing 132b disposed between one of the plurality of the disc springs 131, 131, ... disposed closest to the output side movable sheave 103 and the output side movable sheave 103 and the cylinder portion 132a configured to guide the plurality of the disc springs 131, 131, ... from the inner side.

With such a configuration, the biasing member 130 can be made compact, the misalignment of the axes of the plurality of disc springs can be prevented, and the output side movable sheave 103 can be stably biased.

As described above, the belt type continuously variable transmission 40 according to this embodiment includes:

the input pulley 60 including the input side fixed sheave 61 fixed to the transmission input shaft 50 and the input side movable sheave 63 supported by the transmission input shaft 50 in such a manner as to be slidable in the axial direction;

the steel balls 64, 64, ... disposed in grooves (the sheave side grooves 63c and the shaft side grooves 50b) formed in the input side movable sheave 63 and the transmission input shaft 50, and configured to couple the input side movable sheave 63 to the transmission input shaft 50 in such a manner as to be not relatively rotatable;

the hydraulic cylinder 70 disposed in the input side movable sheave 63 to change the slid position of the input side movable sheave 63; and the belt 140 wound around the input pulley 60.

Contact surfaces among the steel balls 64, 64, ..., the input side movable sheave 63, and the transmission input shaft 50, and between the input side movable sheave 6 and the belt 140 are lubricated by the leakage of the hydraulic oil sent to the hydraulic chamber 76 of the hydraulic cylinder 70 through an oil passage (the operation groove 50e and the hydraulic oil passage 50f) formed in the transmission input shaft 50

With such a configuration, the contact surfaces among the steel balls 64, 64, ..., the input side movable sheave 63, and the transmission input shaft 50, and between the input side movable sheave 63 and the belt 140 can be appropriately lubricated regardless of the slid position of the input side movable sheave 63.

In the transmission input shaft 50, an oil passage (the lubricant passage 50g and the distribution oil passage 50h) through which the hydraulic oil is supplied to the contact surface between the input side fixed sheave 61 and the belt 140 is formed.

With such a configuration, the contact surface between the input side fixed sheave 61 fixed to the transmission input shaft 50 and the belt 140 can be appropriately lubricated.

In the above description, the configuration where the outer guide member 110a of the output member 110 and the inner guide member 132 are used as the guide member for preventing the misalignment of the axes of the plurality of disc springs 131, 131, ... is described. Alternatively, the following configurations can be employed.

Figure 15:
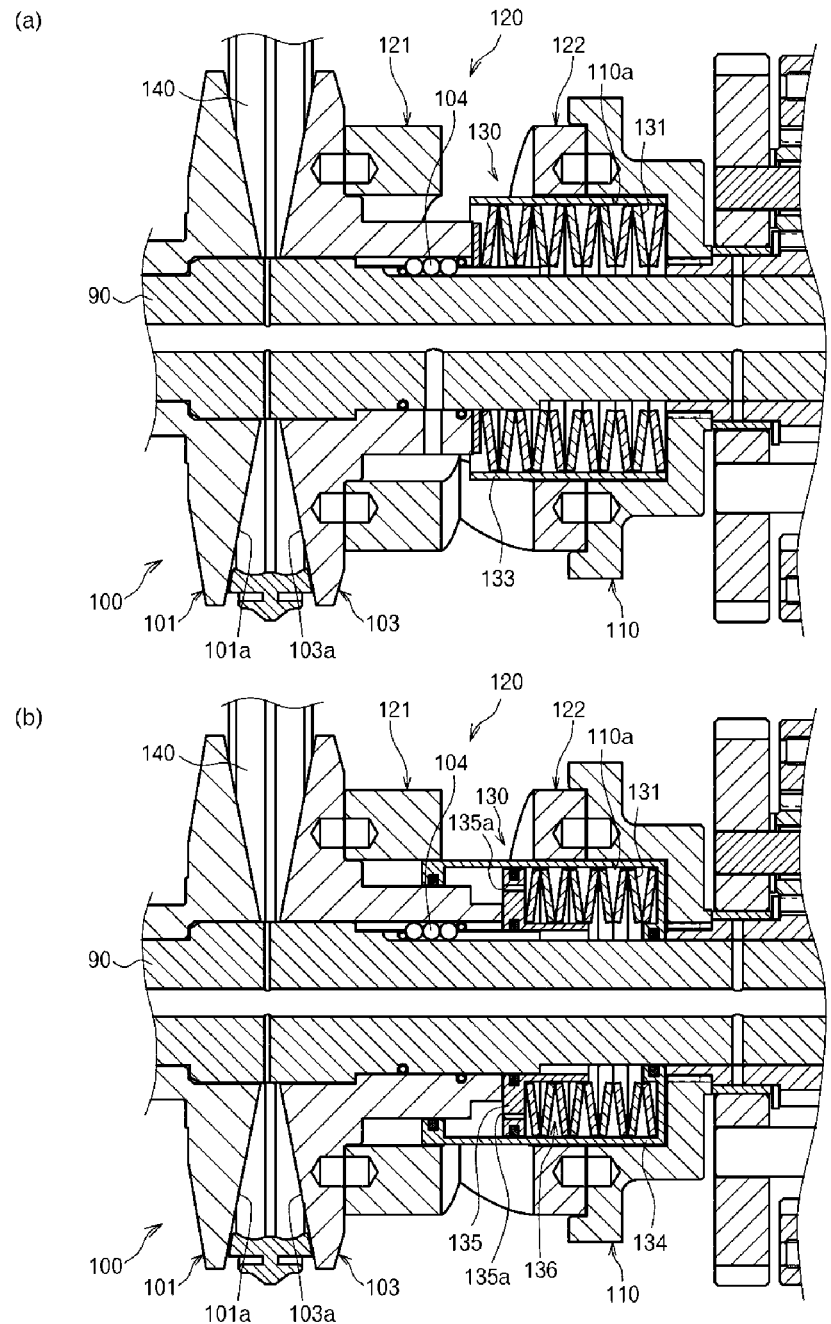
FIG. 15 is a diagram showing other embodiments of a guide member, in which (a) is a side cross-sectional view showing a cylindrical guide member and (b) is a side cross-sectional view showing a cylinder member and a piston member.

Specifically, as shown in FIG. 15(a), the misalignment of the axes of the plurality of disc springs 131, 131, ... can be prevented with an approximately cylindrical guide member 133. The inner diameter of the guide member 133 is set to be approximately the same as the outer diameter of the disc spring 131. The longitudinal length of the guide member 133 is set to be long enough to cover all of the plurality of disc springs 131, 131, ... from the outer side. The misalignment of the axes can be prevented with the guide member 133 having the configuration described above guiding the disc springs 131, 131, ... from the outer side.

Furthermore, as shown in FIG. 15(b), a so-called hydraulic damper may be formed with the biasing member 130.

A cylinder member 134 is fit on the outer side of the cylinder portions of the transmission shaft 90 and the output side movable sheave 103. A piston member 135 is disposed in the cylinder member 134 in such a manner as to divide the inner space of the cylinder member 134 into front and rear sides. A seal member is disposed on the sliding surfaces of the cylinder member 134 and the piston member 135 as appropriate to prevent the leakage of the hydraulic oil.

The biasing member 130 (the disc springs 131, 131, ... ) is disposed in the inner space of the cylinder member 134 disposed more on the rear side than the piston member 135 (a spring chamber 136). Orifices 135a, 135a, ... that are small through holes formed through the piston member 135 in the front-rear direction are formed in the piston member 135. The inner space of the cylinder member 134 is filled with a hydraulic oil.

The output side movable sheave 103 is in contact with the piston member 135 from the front side. The biasing member 130 biases the piston member 135 toward the front side. Thus, the so-called hydraulic damper can be formed with the cylinder member 134, the piston member 135, and the biasing member 130.

A belt type continuously variable transmission 40 according to a second embodiment will be described below.

In the technique (belt type continuously variable transmission 40) according to the first embodiment, when the pressure in the hydraulic cylinder drops because a driving source such as an engine stops or due to other reasons, the movable sheave might slide by the tensile force of the belt, and the servo spool might slide along with the sliding of the movable sheave. In other words, there is a disadvantage that when the driving source stops, the servo spool slides against an operator's will, giving an uncomfortable feeling to the operator.

Thus, the present invention provides a belt type continuously variable transmission that can prevent the servo spool from sliding even in a case where the pressure in the hydraulic cylinder drops and thus the movable sheave slides.

Figure 16:
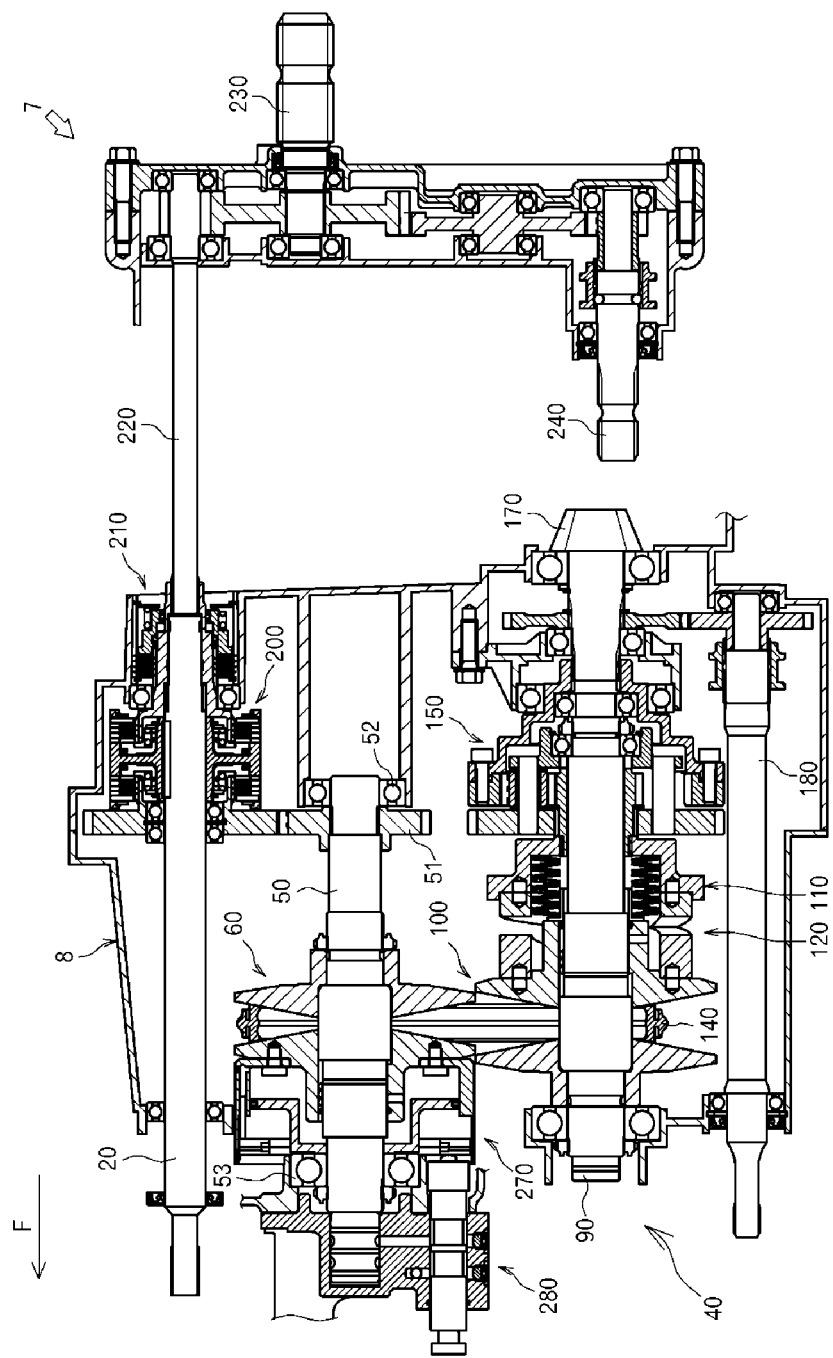
FIG. 16 is a side cross-sectional view showing an overall configuration of a transmission including a belt type continuously variable transmission according to a second embodiment of the present invention.

FIG. 16 shows a transmission 7 including the belt type continuously variable transmission 40 according to the second embodiment. The configuration of the transmission 7 is approximately the same as that of the transmission 7 (see FIG. 1) including the belt type continuously variable transmission 40 according to the first embodiment, and thus the description thereof is omitted.

Components of the belt type continuously variable transmission 40 according to the second embodiment will be described in detail with reference to FIG. 16 to FIG. 30. The belt type continuously variable transmission 40 includes: the transmission input shaft 50, the input pulley 60, a hydraulic cylinder 270, a hydraulic servo mechanism 280, the transmission shaft 90, the output pulley 100, the output member 110, the cam mechanism 120, the biasing member 130, the belt 140, the planetary gear mechanism 150, and the like.

The configuration of the belt type continuously variable transmission 40 according to the second embodiment is mainly different from the configuration of the belt type continuously variable transmission 40 according to the first embodiment (see FIG. 1 to FIG. 14) in that the hydraulic cylinder 270 and the hydraulic servo mechanism 280 are provided instead of the hydraulic cylinder 70 and the hydraulic servo mechanism 80. Thus, the difference in the configuration of the belt type continuously variable transmission 40 according to the second embodiment will be described below. In the configuration of the belt type continuously variable transmission 40 according to the second embodiment, members that are approximately the same as those in the belt type continuously variable transmission 40 according to the first embodiment are denoted with the same reference numerals and the description thereof will be omitted.

Figure 17:
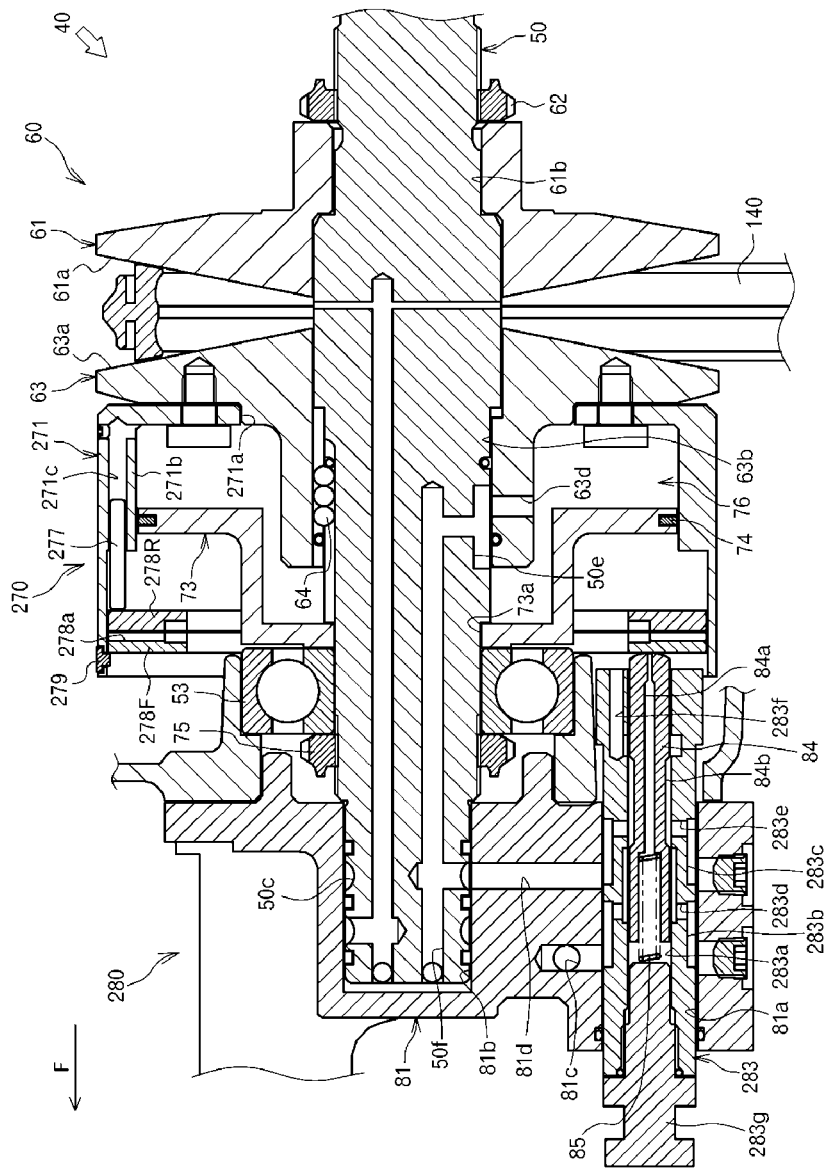
FIG. 17 is a side-cross sectional view showing an input pulley, a hydraulic cylinder, a hydraulic servo mechanism, and the like of the belt type continuously variable transmission.

The hydraulic cylinder 270 shown in FIG. 17 is formed in the input side movable sheave 63 and makes the input side movable sheave 63 slide on the transmission input shaft 50 in the axial direction. The hydraulic cylinder 270 includes a movable side cylinder casing 271, the fixed side cylinder casing 73, and the like.

The movable side cylinder casing 271 is a cylindrical member having a bottom surface (rear surface) and opened at the front portion. A through hole 271$a$ is formed along the axial direction at the center of the rear surface of the movable side cylinder casing 271. The shaft portion of the input side movable sheave 63 is inserted in the through hole 271$a$.

A thick portion 271$b$ is formed from an approximately center to the rear end portion of the cylinder portion of the movable side cylinder casing 271. The outer peripheral surface is thicker in the thick portion 271$b$ than in the other portion (front end side). The outer peripheral surface of the cylinder portion of the movable side cylinder casing 271 is uniform, and the inner peripheral surface of the thick portion 271$b$ protrudes more to the inner side of the movable side cylinder casing 271 than an inner peripheral surface of the other portion.

Communication holes 271$c$, 271$c$, . . . are formed in the thick portion 271$b$ of the movable side cylinder casing 271. The communication holes 271$c$ include a lateral hole formed in the front-rear direction from the front end surface (a portion positioned at an inner side of the movable side cylinder casing 271) to a portion around the rear surface of the movable side cylinder casing 271 and having a circular cross sectional shape, and a vertical hole communicating between the lateral hole and the inner side of the movable side cylinder casing 271 at a portion around the rear surface of the movable side cylinder casing 271. The communication holes 271$c$ are formed at three positions of the thick portion 271$b$ at an equal interval in the peripheral direction.

An interval between the communication holes 271$c$ is not limited to equal interval, and the number of the communication holes 271$c$ is not limited to that described above A sliding member 277 is slidably inserted in the lateral hole of the communication hole 271$c$. The sliding member 277 has an approximately column shape. The outer diameter of the sliding member 277 is set to be approximately the same with the inner diameter of the communication hole 271$c$ (more specifically, slightly smaller than the inner diameter of the communication hole 271$c$ so as to secure slidability). A length of the sliding member 277 in the longitudinal direction (front-rear direction) is set to be approximately the same as the longitudinal length of the lateral hole of the communication hole 271$c$.

Through holes 271$d$, 271$d$, . . . are formed in the portion around the front end of the movable side cylinder casing 271. The through holes 271$d$, 271$d$, . . . are formed through the outer peripheral surface and the inner peripheral surface of the movable side cylinder casing 271. The through holes 271$d$ are formed at three positions of the movable side cylinder casing 271 at an equal interval in the peripheral direction.

An interval between the through holes 271$d$ is not limited to equal interval, and the number of the through holes 271$d$ is not limited to that described above As shown in FIG. 17, the movable side cylinder casing 271 is fixedly disposed on the input side movable sheave 63 by means of a fastening member such as a bolt with the front surface of the sheave portion of the input side movable sheave 63 being in contact with the rear surface of the movable side cylinder casing 271.

The movable side cylinder casing 271 and the input side movable sheave 63 may be integrally formed by forging and the like.

The fixed side cylinder casing 73 is a box shaped member opened at a rear portion, and has an annular flange integrally formed at the rear end of the box shaped portion. The through hole 73$a$ is formed at the center of the front surface of the fixed side cylinder casing 73. The transmission input shaft 50 is inserted in the through hole 73$a$. The rear portion (flange) of the fixed side cylinder casing is inserted in the movable side cylinder casing 271 from the opened side (front side) of the movable side cylinder casing 271. More specifically, the rear portion (flange) of the fixed side cylinder casing 73 is inserted in the thick portion 271$b$ of the movable side cylinder casing 271. The seal member 74 is disposed between the fixed side cylinder casing 73 and the thick portion 271$b$ of the movable side cylinder casing 271.

After the fixed side cylinder casing 73 is inserted in the movable side cylinder casing 271, a contact member 278F and a contact member 278R are inserted to the inner side of a portion around the opened (front) side end of the movable side cylinder casing 271. The contact member 278F and the contact member 278R shown in FIG. 17 and FIG. 19 have a shape in which a hole is formed in the center of a disc shaped member (annular shape). The outer diameters of the contact member 278F and the contact member 278R are set to be approximately the same as the inner diameter of the cylinder portion of the movable side cylinder casing 271 (specifically, the portion on the front side of the cylinder portion (portion other than the thick portion 271$b$)) (more specifically, slightly smaller than the inner diameter of the cylinder portion of the movable side cylinder casing 271 so as to secure slidability). On the rear surface of the contact member 278F, oil grooves 278$a$ are formed to communicate between the inner peripheral surface and the outer peripheral surface of the contact member 278F. Similarly, on the front surface of the contact member 278R, oil grooves 278$b$ are formed to communicate between the inner peripheral surface and the outer peripheral surface of the contact member 278R. The contact member 278F and the contact member 278R are inserted in the movable side cylinder casing 271 with the rear surface of the contact member 278F being in contact with the front surface of the contact member 278R.

Figure 18:
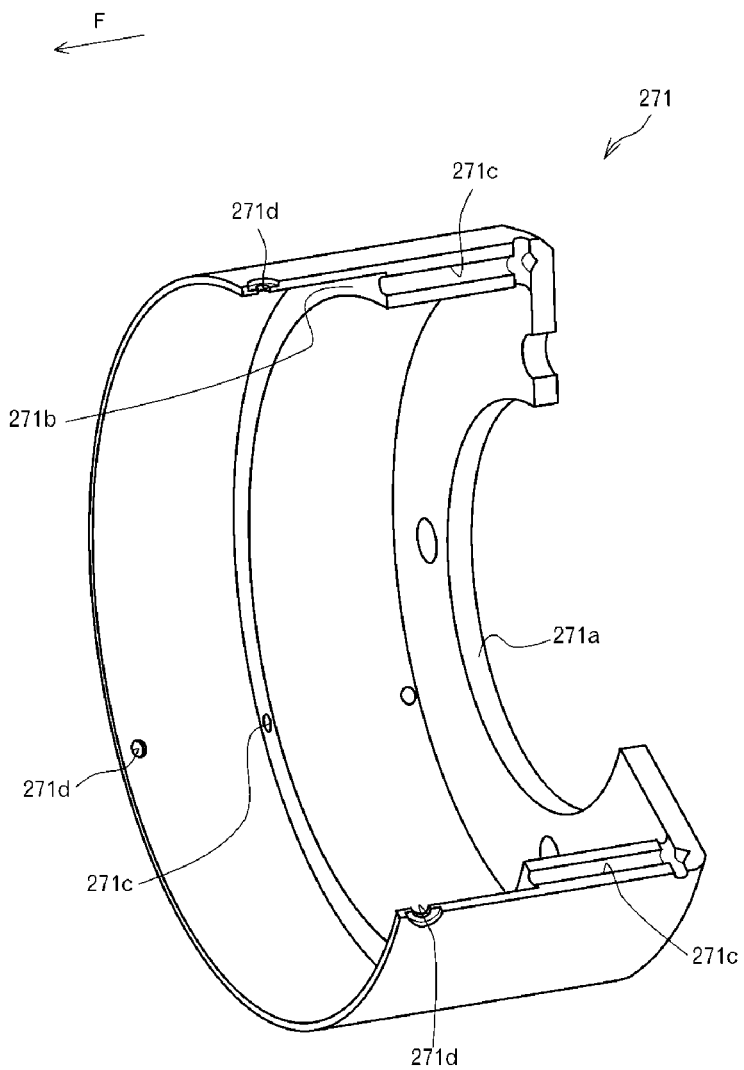
FIG. 18 is a perspective view showing a movable side cylinder casing.
Figure 19:
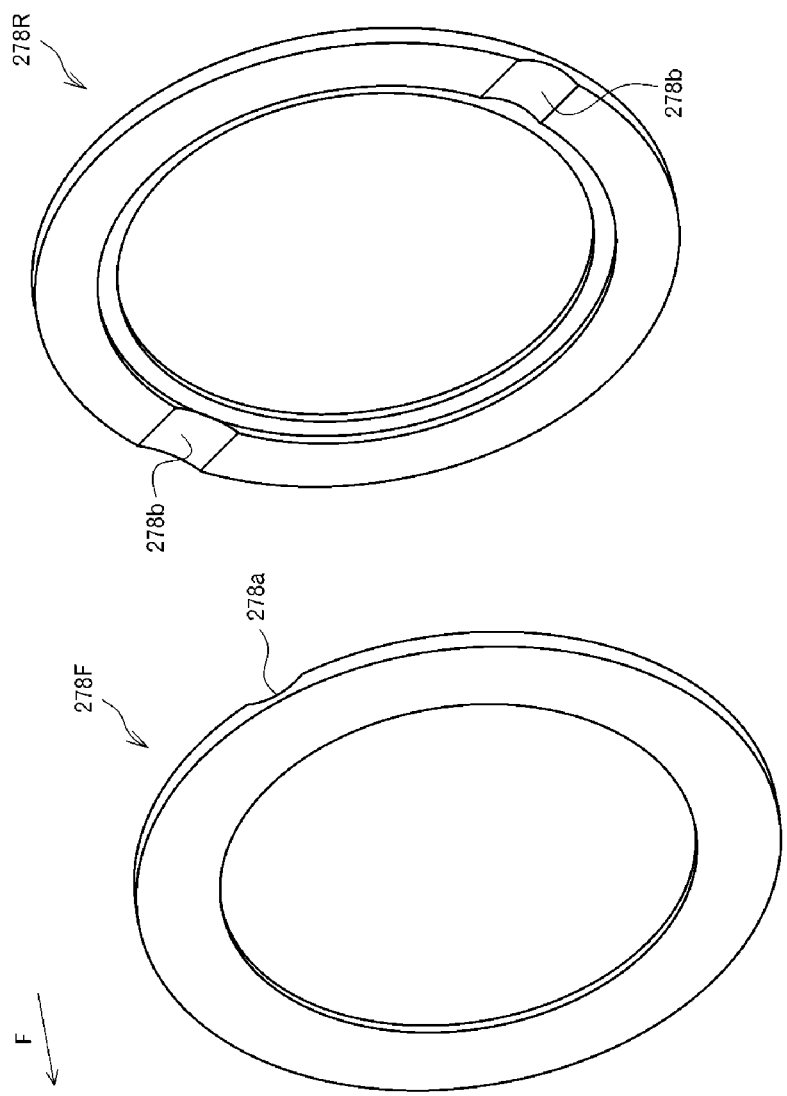
FIG. 19 is a perspective view showing contact members.

As shown in FIG. 17, after the contact member 278F and the contact member 278R are inserted in the movable side cylinder casing 271, inhibiting members 279, 279, ... are fit in the through holes 271d, 271d, ... of the movable side cylinder casing 271 (see FIG. 18). The inhibiting members 279 are fit in the through holes 271d from the outer side of the movable side cylinder casing 271, and the inner side ends of the inhibiting members 279 protrude from the inner peripheral surface of the movable side cylinder casing 271 toward the inner side. With such a configuration, the contact member 278F and the contact member 278R sliding forward contact the inhibiting members 279 at a predetermined position. Thus, the sliding movement of the contact member 278F and the contact member 278R can be inhibited.

The transmission input shaft 50 is inserted in the bearing 53 at a portion right in front of the fixed side cylinder casing 73, and is rotatably supported by the mission casing 8 through the bearing 53.

The locknut 75 is fastened to the transmission input shaft 50 at a portion right in front of the bearing 53. Thus, the bearing 53 can be prevented from sliding forward, and the fixed side cylinder casing 73 can be prevented from sliding forward through the bearing 53. The bearing 53, the fixed side cylinder casing 73, the movable side cylinder casing 71, the input side movable sheave 63, the belt 140, and the input side fixed sheave 61 are disposed between the locknut 62 and the locknut 75. Thus, the torque applied to the members can be confined between the locknut 62 and the locknut 75.

As described above, the hydraulic cylinder 270 is provided to the input side movable sheave 63 of the input pulley 60. In the hydraulic cylinder 70 having the configuration described above, the hydraulic chamber 76 is formed in a space defined by the input side movable sheave 63, the movable side cylinder casing 71, the fixed side cylinder casing 73, and the transmission input shaft 50. A spool position maintaining mechanism according to the present invention is formed of the sliding members 277, 277, ..., the contact member 278F, the contact member 278R, the inhibiting members 279, 279, ..., and the communication holes 271c, 271c, ... of the movable side cylinder casing 271.

Figure 20:
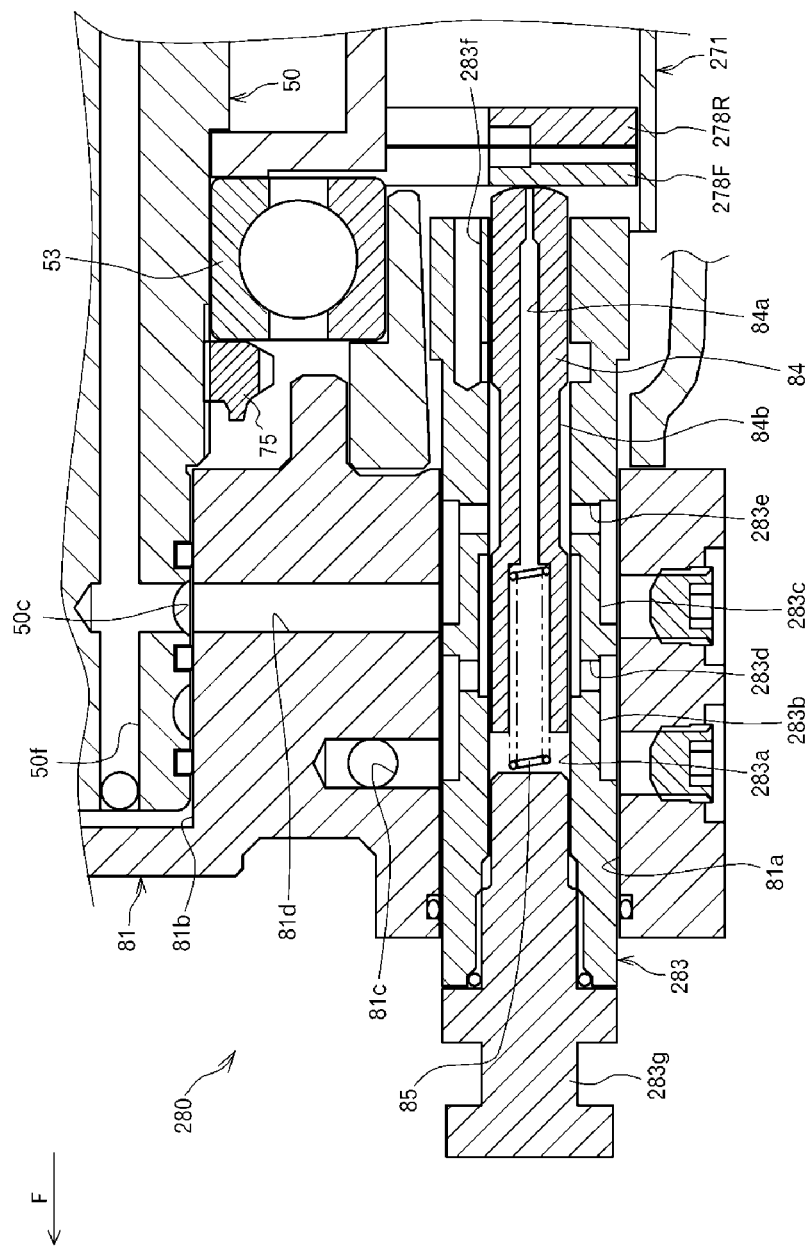
FIG. 20 is a side cross-sectional enlarged view showing a servo spool and the feedback spool.

The hydraulic servo mechanism 280 shown in FIG. 17 and FIG. 20 controls the transmission of the hydraulic oil to the hydraulic cylinder 270 and further controls the operation of the input side movable sheave 63 through the hydraulic cylinder 270. The hydraulic servo mechanism 280 includes the front casing 81, a serve spool 283, the feedback spool 84, the spool spring 85, and the like.

The front casing 81 is a member in which an oil passage through which the hydraulic oil is guided is formed. In the front casing 81, the valve chest 81a, the bearing hole 81b, the hydraulic oil port 81c, the communication oil passage 81d, the lubricant port 81, and the like are formed.

The valve chest 81a is a through hole having a circular cross-sectional shape formed to communicate between the front surface and the rear surface of the front casing 81. The valve chest 81a is formed with the axial direction thereof being the front-rear direction. The valve chest 81a is formed at a position overlapping the input side movable sheave 63 of the input pulley 60 in the front view, that is, the position facing the input side movable sheave 63.

The bearing hole 81b is a hole having a circular cross-sectional shape formed from the rear surface to a portion around the front end of the front casing 81. The bearing hole 81b is formed with the axial direction thereof being the front-rear direction. The front end portion of the transmission input shaft 50 is inserted in the bearing hole 81b from the rear side.

The hydraulic oil port 81c is a through hole that communicates between the side surface of the main body of the front casing 81 and the valve chest 81a. More specifically, the hydraulic oil port 81c communicates between the side surface of the main body of the front casing 81 and a portion of the valve chest 81a slightly more on the front side than the approximately center portion in the axial direction. The hydraulic oil port 81c is coupled to an unillustrated hydraulic oil pump through a pipe and the like.

The hydraulic oil port 81c may have any shape and size as long as the port communicates between the outside of the front casing 81 and the valve chest 81a.

The communication oil passage 81d is an oil passage formed to communicate between the valve chest 81a and the bearing hole 81d, more specifically between a portion of the valve chest 81a slightly more on the rear side than the approximately center portion in the axial direction and an approximately center portion of the bearing hole 81b in the axial direction.

The servo spool 283 switches an oil passage in the hydraulic servo mechanism 280. The servo spool 83 has an approximately column shape with a large diameter portion having a larger diameter than the other portion formed at the rear end portion. The servo spool 83 is disposed with the axial direction being the front-rear direction. In the servo spool 83, a sliding hole 283a, a first groove 283b, a second groove 283c, a first through hole 283d, a second through hole 283e, an exhaust oil passage 283f, and the like are formed.

The sliding hole 283a is a through hole having a circular cross-sectional shape formed through the rear end to the front end of the servo spool 283 on the axis of the servo spool 283. The front end of the sliding hole 283a is closed by a lid member 283g.

The first groove 283b is formed along the outer peripheral surface of the servo spool 283 at a portion slightly more on the front side than the approximately center portion of the servo spool 283 in the axial direction. As will be described later, the first groove 283b is formed to be long in the axial direction of the servo spool 283 so that, even in a case where the servo spool 283 slides along the axial direction relative to the valve chest 281a of the front casing 281, the first groove 283b always faces the hydraulic oil port 81c regardless of the slide position of the servo spool 283.

The second groove 283c is formed along the outer periphery of the servo spool 283 at a portion more on the rear side than the first groove 283b of the servo spool 283. As will be described later, the second groove 283c is formed to be long in the axial direction of the servo spool 283 so that, even in a case where the servo spool 283 slides along the axial direction relative to the valve chest 81a of the front casing 81, the second groove 283c always faces the hydraulic oil port 81c regardless of the slide position of the servo spool 283.

The first through hole 283d has an axial direction orthogonal to the axis of the servo spool 283 and is formed to communicate between the first groove 283b and the sliding hole 283a.

The second through hole 283e has an axial direction orthogonal to the axis of the servo spool 283 and thus is formed to communicate between the second groove 283c and the sliding hole 283a.

The discharge oil passage 283f is an oil passage formed to communicate between the rear end of the servo spool 283 and the sliding hole 283a. More specifically, the discharge oil passage 283f communicates between the rear end of the servo spool 283 and a portion of the sliding hole 283a more on the rear side than the portion facing the second groove 283c.

Figure 21:
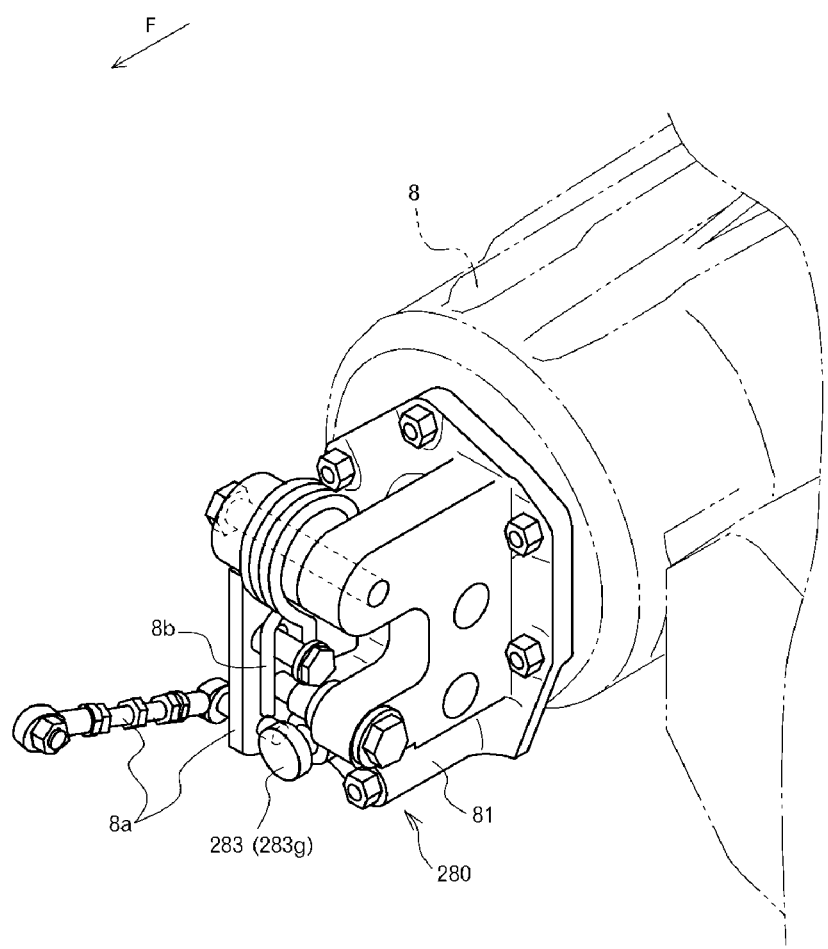
FIG. 21 is a perspective view showing a link mechanism coupled to the servo spool.

The outer diameter of the servo spool 283 is set to be approximately the same with the inner diameter of the valve chest 81*a* of the front casing 81. The servo spool 283 is slidably inserted in the valve chest 81*a* of the front casing 81 from the rear side. The diameter of the large diameter portion of the servo spool 283 is set to be larger than the diameter of the valve chest 81*a* of the front casing 81. When the large diameter portion contacts the front casing 81 forward sliding of the servo spool 283 is inhibited at a predetermined position. As shown in FIG. 21, the front end (the lid member 283*g*) of the servo spool 283 protrudes toward the front side from the front surface of the front casing 81. The front end portion (the lid member 283*g*) of the servo spool 283 is coupled to an unillustrated transmission controller such as a gearshift and a change pedal through a link mechanism 8*a*. The servo spool 283 can be slid in the forward-rear direction through an operation on the transmission controller. A return spring 8*b* is provided in the link mechanism 8*a*. The link mechanism 8*a* is constantly biased to return to an intermediate position by the return spring 8*b* so that the servo spool 283 is constantly biased to return to the intermediate position.

"Intermediate position" of the servo spool 283 is a slid position of the servo spool 283 at the point where no driving force is transmitted to the output shaft 170 (revolution of the output shaft 170 is 0) as a result of changing the driving force from the engine in the belt type continuously variable transmission 40. Overview of the driving force transmission and the transmission in the belt type continuously variable transmission 40 will be described later.

The feedback spool 84 shown in FIG. 17 and FIG. 20 switches oil passage in the hydraulic servo mechanism 280. The configuration of the feedback spool 84 is approximately the same as the that of the feedback spool 84 according to the first embodiment (see FIG. 3 and FIG. 4), and thus the description thereof is omitted.

The feedback spool 84 is constantly biased toward the rear side by the spool spring 85, and thus the rear end of the feedback spool 84 is constantly in contact with the front end of the contact member 278 F inserted in the movable side cylinder casing 271.

How the operation of the hydraulic cylinder 270 is controlled with the hydraulic servo mechanism 280 having the configuration described above and the input side movable sheave 63 is slid is described below.

First of all, a case where the servo spool 283 is at a position (intermediate position) shown in FIG. 17 will be described.

Here, a predetermined pressure applied by the hydraulic oil pumped from the hydraulic oil pump to the oil passage in the hydraulic servo mechanism 280 (the hydraulic oil port 81*c*, the communication oil passage 81*d*, and the like), the oil passage in the transmission input shaft 50 (the hydraulic oil passage 50*f*, the operation groove 50*e*, and the like), the oil passage in the input side movable sheave 63 (through hole 63*d*, and the like), and the hydraulic chamber 76. The pressure of the hydraulic oil is applied to the rear end of the sliding member 277 through the communication hole 271*c* formed in the movable side cylinder casing 271. The pressure makes the sliding member 277 slide forward. The front end of the sliding member 277 comes into contact with the rear surface of the contact member 278R, and the sliding member 277 presses the contact member 278R and the contact member 278F forward. Thus, the contact member 278R and the contact member 278F also slide forward. The contact member 278R and the contact member 278F slide forward to a position to come into contact with the inhibiting members 279 and are maintained thereat.

The feedback spool 84 that comes into contact with the contact member 278*f* from the forward side is maintained at a state of being pressed to a predetermined position relative to the sliding hole 283*a* of the servo spool 283 against biasing force of the spool spring 85.

Here, the "predetermined position" of the feedback spool 84 is a position relative to the servo spool 283. More specifically, the predetermined position is a position where the outer peripheral surface of the feedback spool 84 (more specifically, a portion of the outer peripheral surface more on the front side than the communication groove 84*b*) closes the first through hole 283*d* of the servo spool 283, and the outer peripheral surface of the feedback spool 84 (more specifically, a portion of the outer peripheral surface more on the rear side than the communication groove 84*b*) closes the discharge oil passage 283*f* of the servo spool 283.

The hydraulic oil pumped from the hydraulic oil pump is supplied to the first groove 283*b* of the servo spool 283 through the hydraulic oil port 81*c* of the front casing 81. However, the first through hole 83*d* communicating between the first groove 283*b* and the sliding hole 283*a* is closed by the outer peripheral surface of the feedback spool 84. Thus, the hydraulic oil supplied from the hydraulic oil pump is blocked by the feedback spool 84, and thus is not supplied to the hydraulic chamber 76 of the hydraulic cylinder 270.

The input side movable sheave 63 is biased toward the front side by tensile force of the belt 140 to be described later wound around the input pulley 60. The input side movable sheave 63 and the movable side cylinder casing 71 are held at the state after sliding forward.

Figure 22:
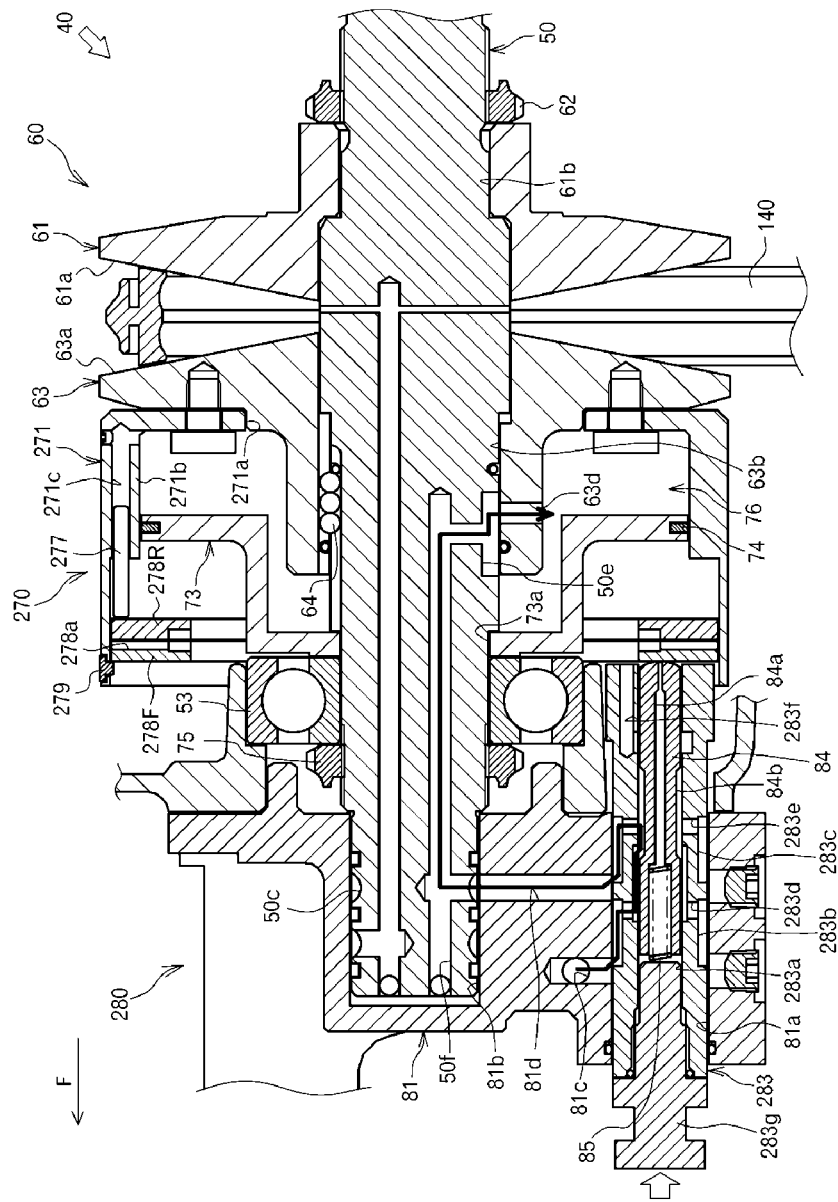
FIG. 22 is a side cross-sectional view showing a case where the servo spool has slid rearward.

Next, a case where the servo spool 83 has slid rearward through an operation on the transmission controller as shown in FIG. 22 will be described.

The operation here is approximately the same with that in the belt type continuously variable transmission 40 according to the first embodiment (FIG. 5 and FIG. 6). When the servo spool 283 slides toward the rear side through an operation on the transmission controller (FIG. 22), the input side movable sheave 63 and the movable side cylinder casing 271 slide rearward against the biasing force toward the front side produced by the tensile force of the belt 140 (see FIG. 23).

Figure 23:
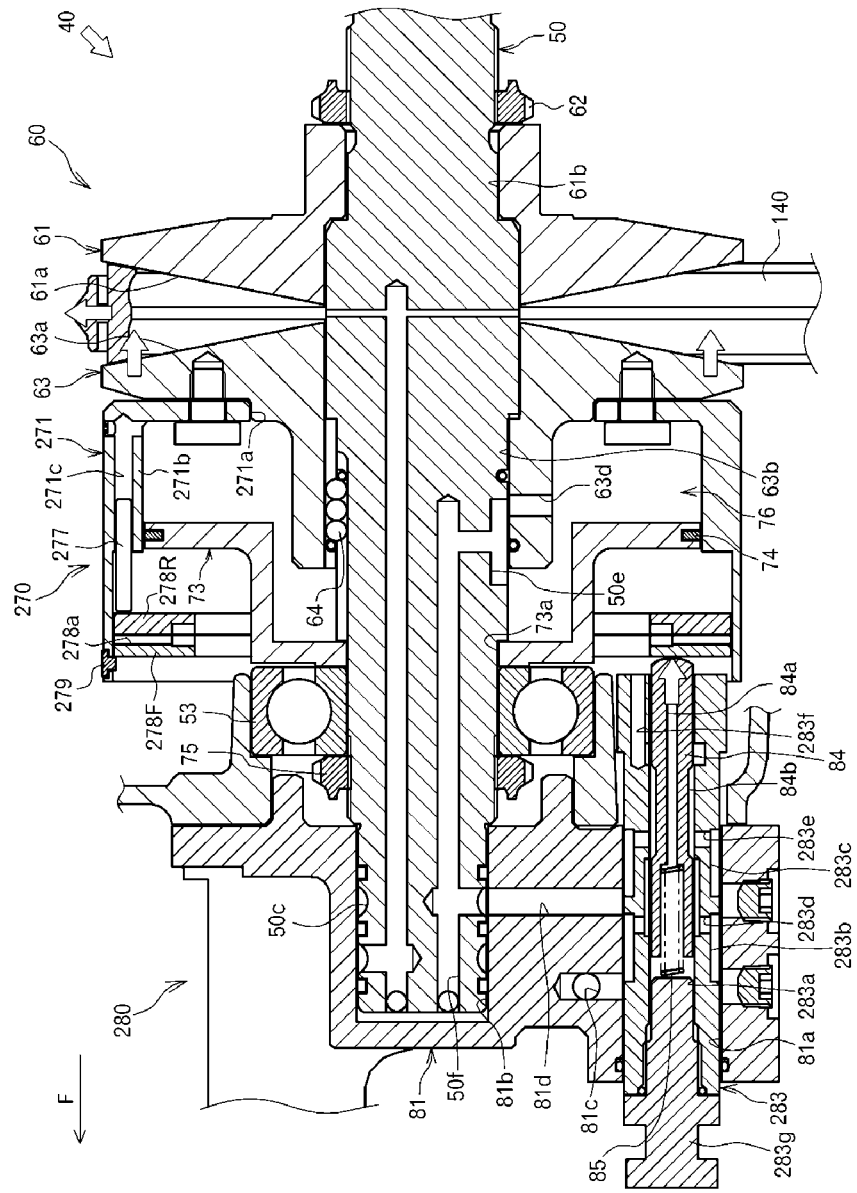
FIG. 23 is a side cross-sectional view showing a case where the input side movable sheave has slid rearward.

Next, a case where the input side movable sheave 63 and the cylinder casing 271 have slid rearward as shown in FIG. 23 is described.

When the input side movable sheave 63 and the cylinder casing 71 slide rearward, the contact member 278F and the contact member 278R slide rearward along with the movable side cylinder casing 271. When the contact member 278F moves rearward, the feedback spool 84 in contact with the contact member 278F while being biased from the front side also slides rearward. Thus, the feedback spool 84 slides rearward relative to the servo spool 283.

As the feedback spool 84 slides to a predetermined position, and thus the first through hole 283*d* of the servo spool 283 is again closed by the outer peripheral surface of the feedback spool 84, the supply of the hydraulic oil to the hydraulic oil chamber 76 of the hydraulic cylinder 270 is terminated. Thus, the input side movable sheave 63 and the movable side cylinder casing 71 are maintained at positions at the point where the supplying of the hydraulic oil to the hydraulic chamber 76 is terminated.

Figure 24:
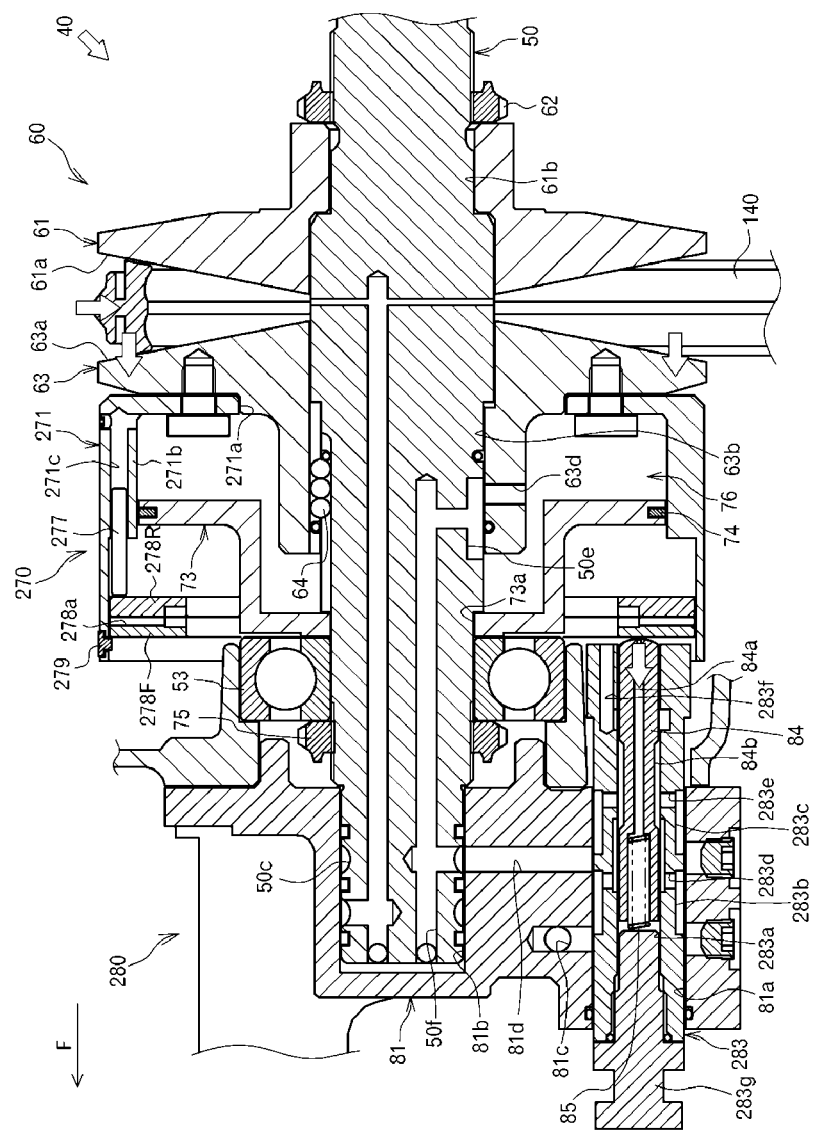
FIG. 24 is a side cross-sectional view showing a case where a hydraulic oil has leaked out and thus, the pressure in the hydraulic chamber has dropped.

Next, a case where the pressure in the hydraulic chamber 76 drops due to the leakage of the hydraulic oil from the hydraulic chamber 76 of the hydraulic cylinder 270 as described in FIG. 24 will be described.

Figure 25:
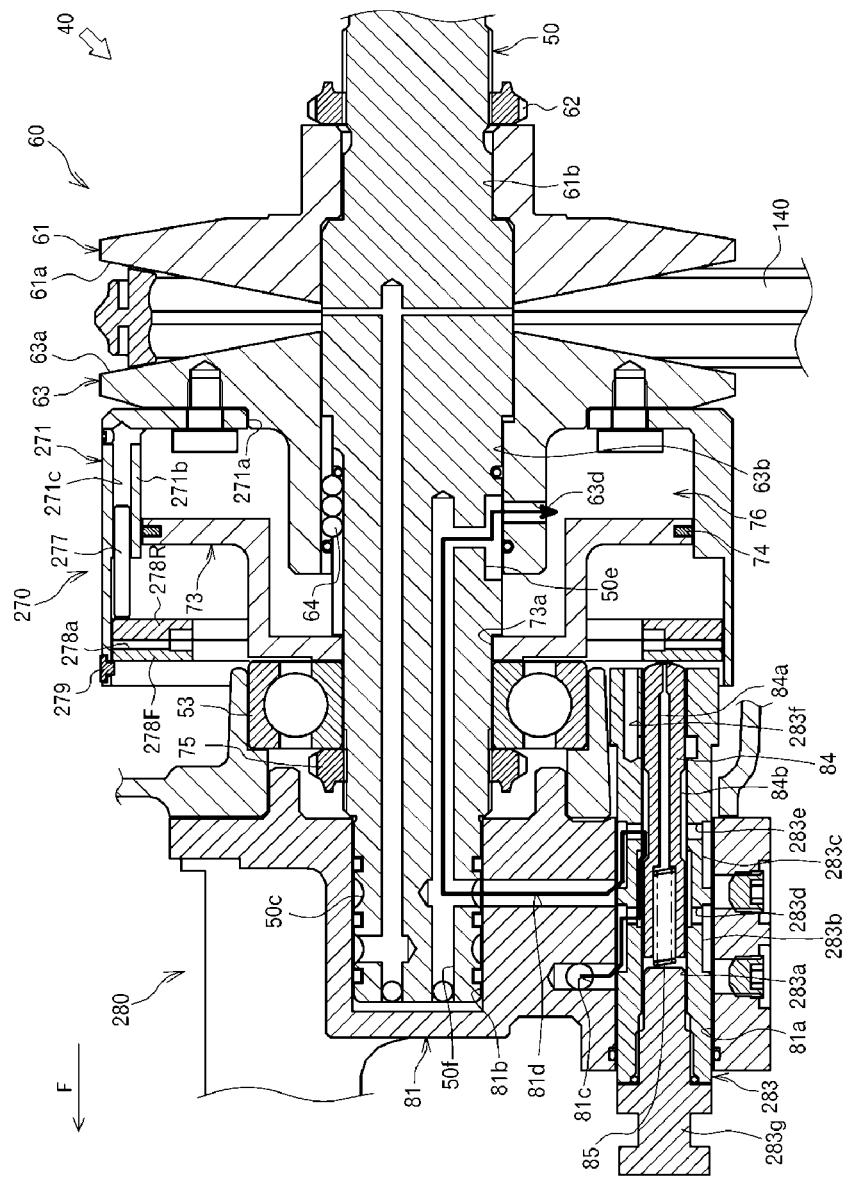
FIG. 25 is a side cross-sectional view showing how the hydraulic oil is again supplied to the hydraulic chamber.

The operation here is approximately the same with that in the belt type continuously variable transmission 40 according to the first embodiment (FIG. 7). Specifically, when the hydraulic oil in the hydraulic chamber 76 gradually leaks out, the hydraulic oil is again supplied to the hydraulic chamber 76 of the hydraulic cylinder 270 as shown in FIG. 25. Thus, the input side movable sheave 63 and the cylinder casing 271 slide rearward (see FIG. 23).

Figure 26:
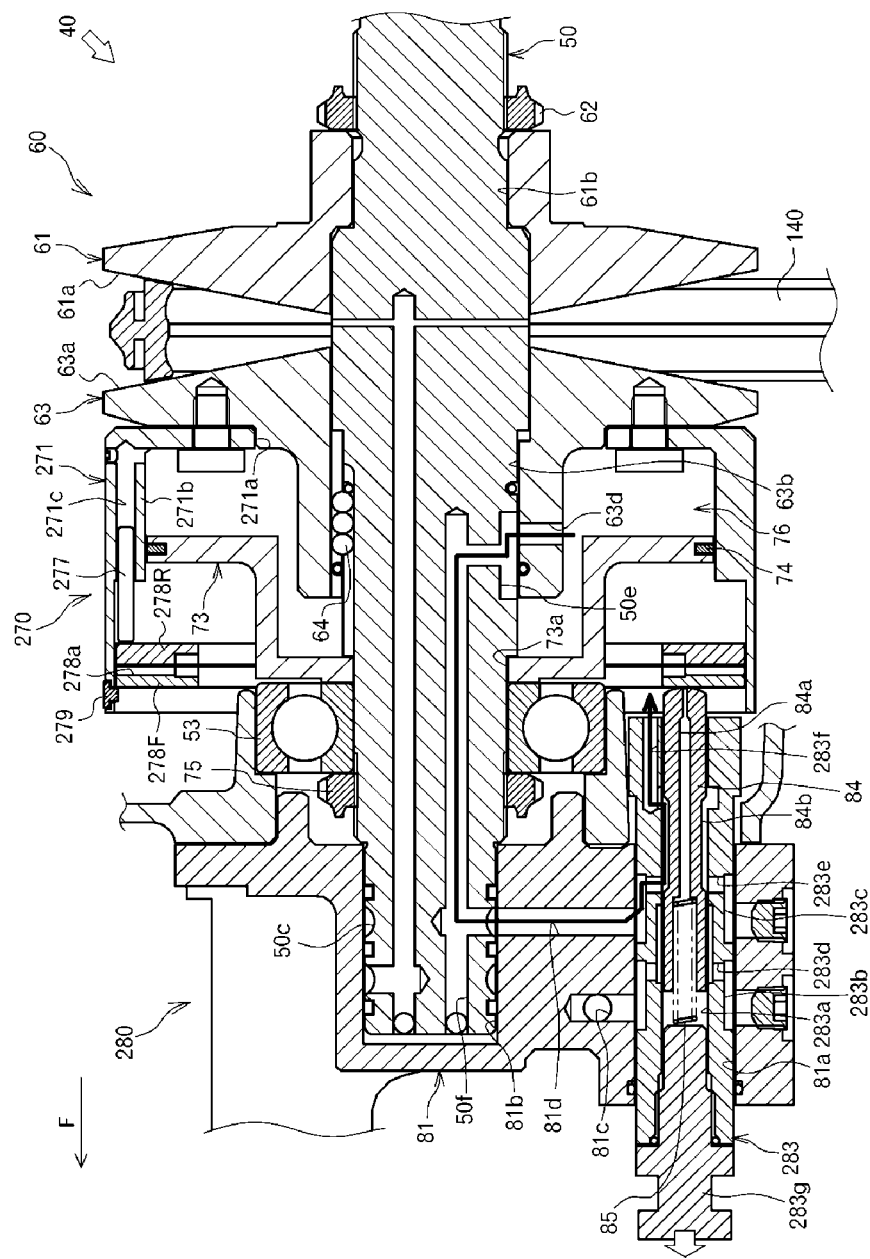
FIG. 26 is a side cross-sectional view showing a case where the servo spool has slid forward.
Figure 27:
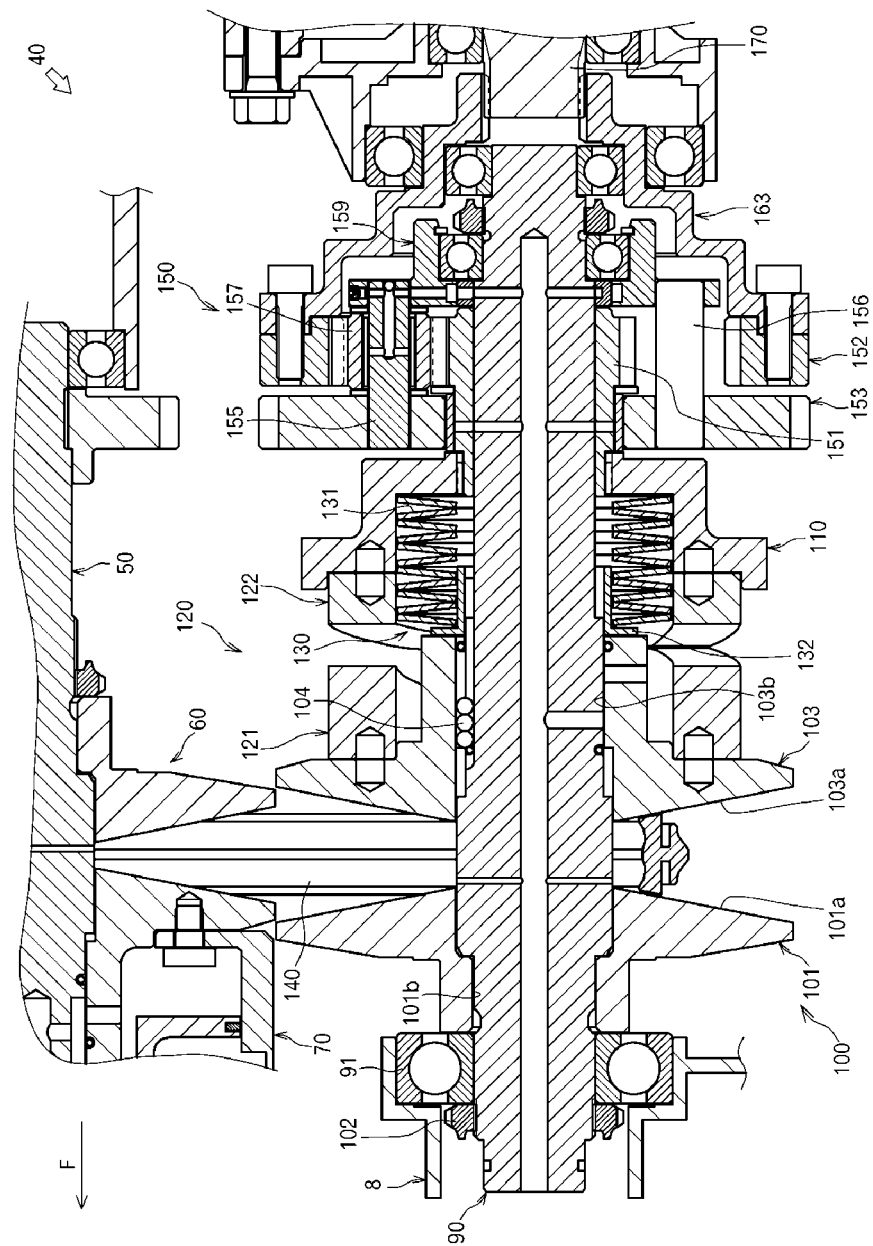
FIG. 27 is a side cross-sectional view showing an output pulley, a cam mechanism, a biasing member, and the like of the belt-type continuously variable transmission.

Next, a case where the servo spool 283 has slid forward through an operation on the transmission controller as shown in FIG. 26 will be described.

The operation here is approximately the same with that in the belt type continuously variable transmission 40 according to the first embodiment (see FIG. 8). Specifically, when the servo spool 283 slides forward through the operation on the transmission controller (see FIG. 26), the input side movable sheave 63 and the movable side cylinder casing 271 slide forward in accordance by the biasing force from the belt 140 (see FIG. 17).

Next, a case where the input side movable sheave 63 and the movable side cylinder casing 71 have slid forward as shown in FIG. 17 will be described.

The operation here is approximately the same with that in the belt type continuously variable transmission 40 according to the first embodiment (see FIG. 3). Specifically, when the input side movable sheave 63 and the movable side cylinder casing 71 slide forward, the discharge of the hydraulic oil from the hydraulic chamber 76 of the hydraulic cylinder 270 is terminated. Thus, the input side movable sheave 63 and the movable side cylinder casing 71 are maintained at positions at the point where the discharge of the hydraulic oil from the hydraulic chamber 76 is terminated.

As described above, by sliding the servo spool 83 to an appropriate position, the input side movable sheave 63 can be slid to a desired position. Moreover, the feedback spool 84 that slides along with the input side movable sheave 63 can maintain the input side movable sheave 63 at a desired slid position.

The configurations of the transmission shaft 90, the output pulley 100, the output member 110, the cam mechanism 120, the biasing member 130, the belt 140, the planetary gear mechanism 150, the output shaft 170 and the front wheel driving force transmitting shaft 180 are the same as those of the components in the belt type continuously variable transmission 40 according to the first embodiment (see FIG. 1 to FIG. 14) and the description thereof will be omitted.

An overview of the driving force transmission and the transmission in the belt type continuously variable transmission 40 having the above described configuration is approximately the same as that in the belt type continuously variable transmission 40 according to the first embodiment, and the description thereof is omitted.

An operation of the spool position maintaining mechanism at the point where the engine stops while the servo spool 283 is at the intermediate position will be described.

When the engine stops while the servo spool 283 is at the intermediate position (see FIG. 17), the hydraulic oil pump that pumps the hydraulic oil to the hydraulic chamber 76 also stops. Thus, the pressure in the hydraulic chamber 76 drops.

Figure 28:
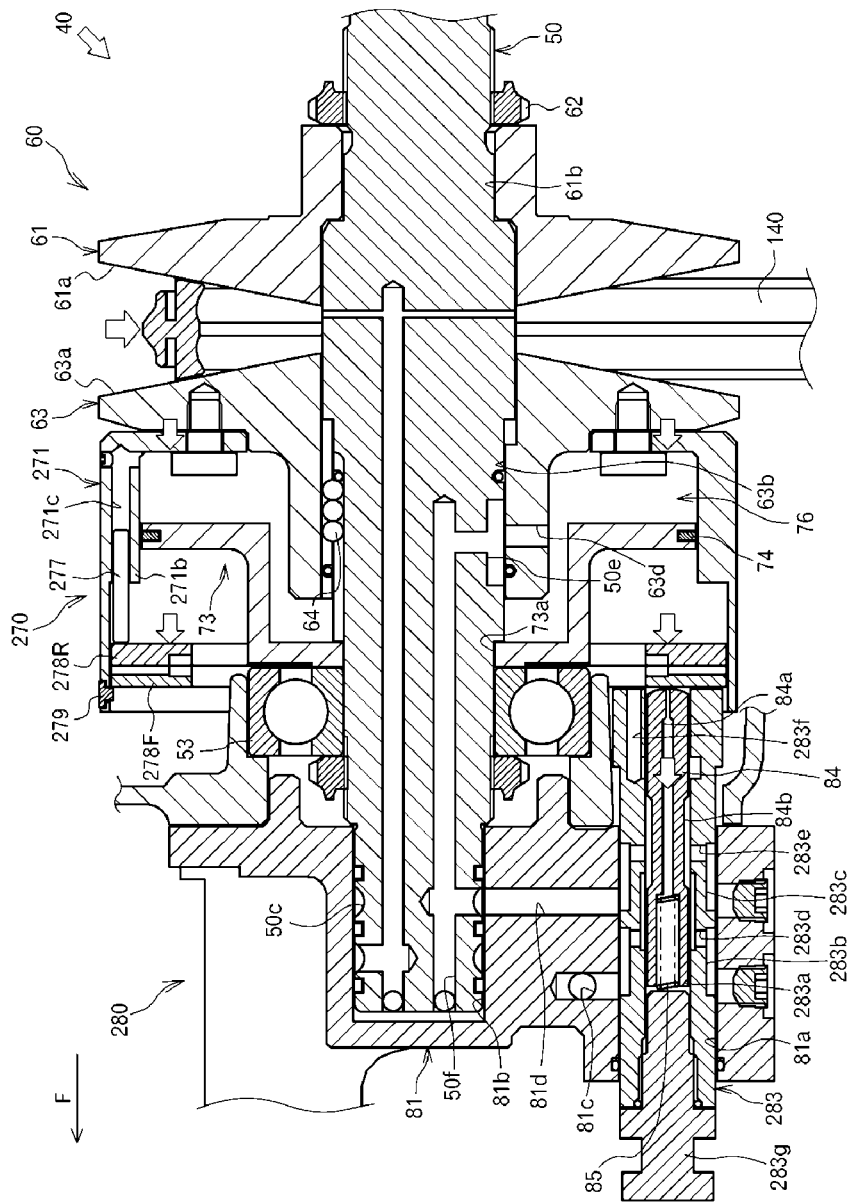
FIG. 28 is a side cross-sectional view showing a case where the pressure in the hydraulic pressure has dropped and the input side movable sheave has slid forward.

When the pressure in the hydraulic chamber drops below a predetermined value, the input side movable sheave 63 slides forward by the tensile force of the belt 140 applied by the biasing member 130 (see FIG. 27) and the like (see FIG. 28). When the input side movable sheave 63 slides forward, the movable side cylinder casing 271, the sliding member 277, the contact member 278R, and the contact member 278F integrally slide forward along with the input side movable sheave 63. When the contact member 278F slides forward, the feedback spool 84 in contact with the contact member 278F from the front side also slides forward relative to the servo spool 283 against the biasing force of the spool spring 85. Here, the servo spool 283 does not slide but is maintained at the intermediate position by the biasing force of the return spring 8b (see FIG. 21). Thus, the feedback spool 84 slides forward until the rear end thereof matches the rear end of the servo spool 283 (until the contact member 278F contacts the rear end of the servo spool 283).

Figure 29:
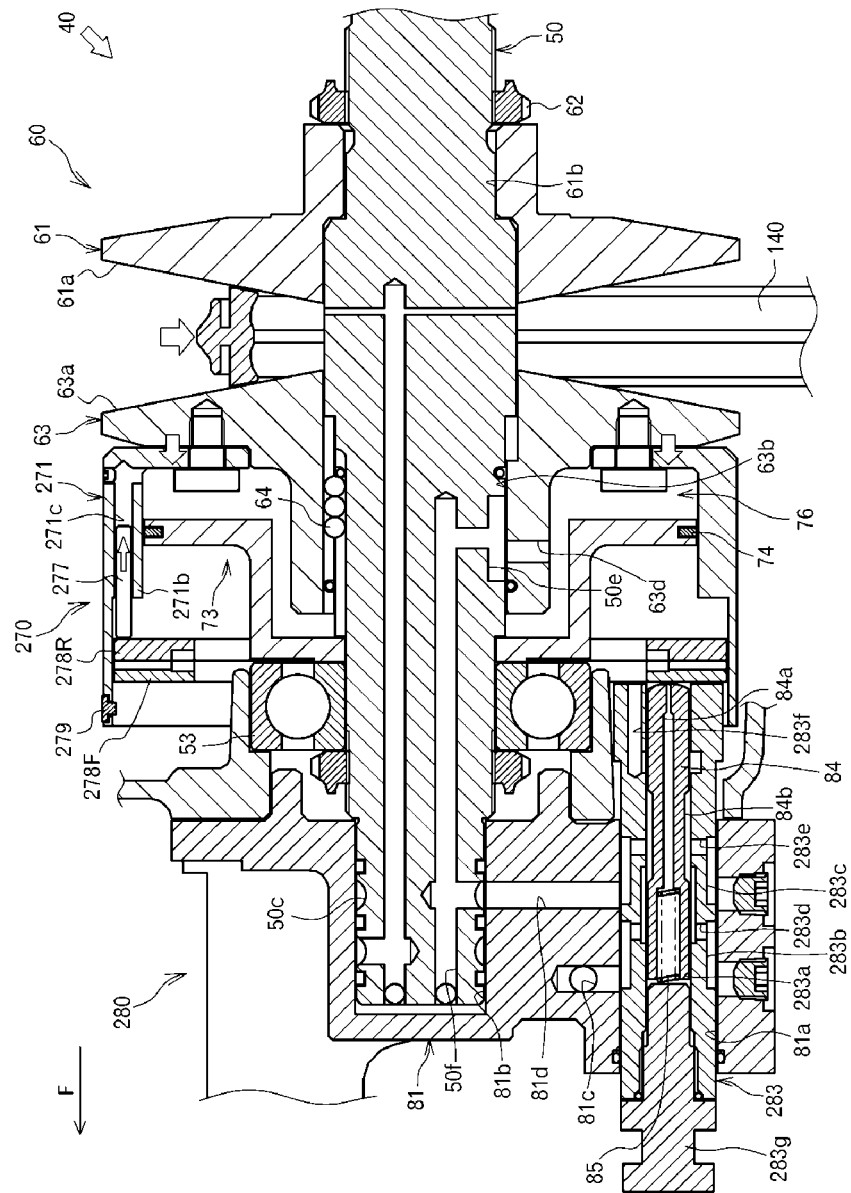
FIG. 29 is a side cross-sectional view showing a case where the contact member has slid relative to the input side movable sheave, from the state of FIG. 28.

As shown in FIG. 29, when the input side movable sheave 63 further slides forward by the tensile force of the belt 140, the movable side cylinder casing 271 also slides forward along with the input side movable sheave 63. Here, the contact member 278F is in contact with the servo spool 283 maintained at the intermediate position by the return spring 8b, and thus cannot slide forward. Thus, while the movable side cylinder casing 271 keeps sliding forward, the contact member 278F and the contact member 278R are maintained at the positions. Specifically, the contact member 278F and the contact member 278R slide rearward relative to the movable side cylinder casing 271. Here, since the pressure in the hydraulic chamber 76 has dropped below the predetermined value, the sliding member 277 is pressed toward rear side by the contact member 278R.

Thus, the "predetermined value" of the pressure in the hydraulic chamber 76 herein is a value low enough that the sliding member 277 cannot stand the biasing force of the return spring 8b and thus is pressed toward the rear side.

Figure 30:
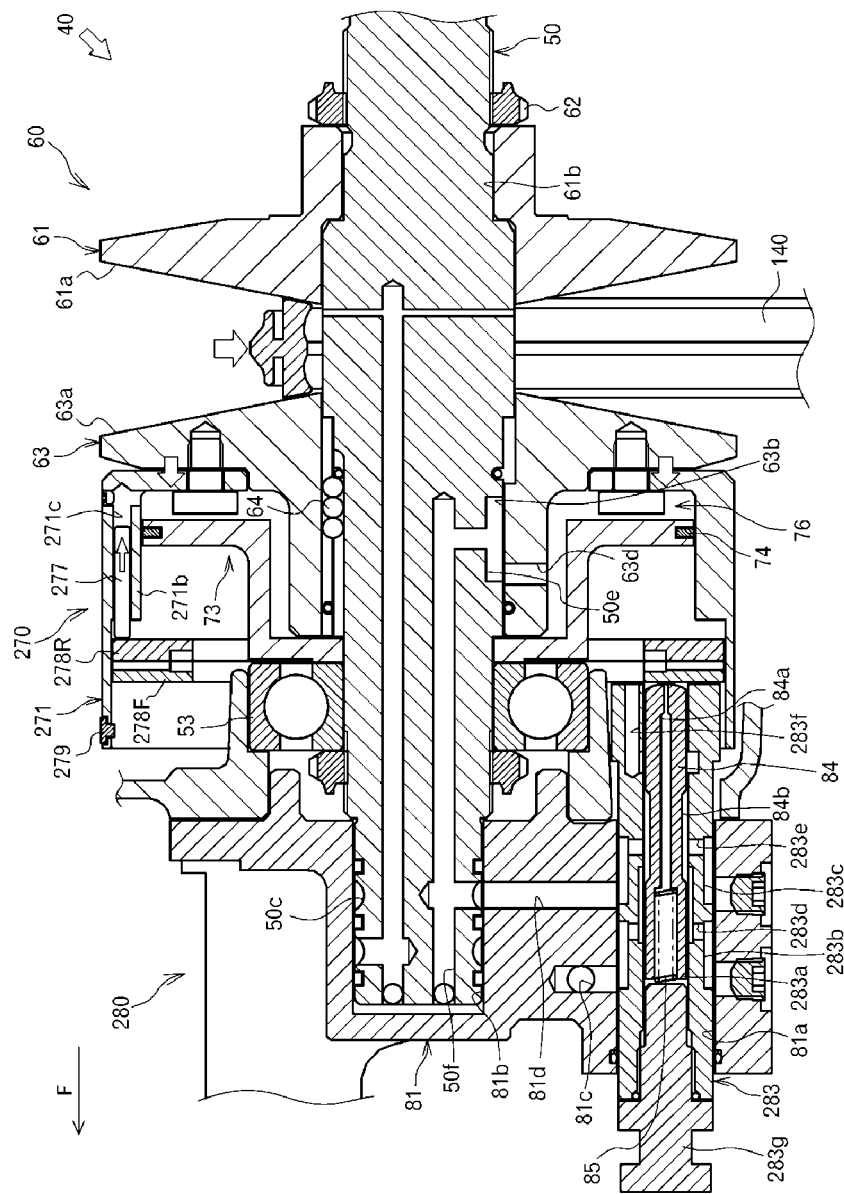
FIG. 30 is a side cross-sectional view showing a case where the input side movable sheave has slid forward to the maximum extent from the state of FIG. 28.

As shown in FIG. 30, when input side movable sheave 63 further slides forward by the tensile force of the belt 140, the front end of the input side movable sheave 63 comes in contact with the fixed side cylinder casing 73. Thus, the forward sliding of the input side movable sheave 63 is inhibited and thus the input side movable sheave 63 is maintained at this position. Also in this case, since the contact member 278F, the contact member 278R, and the movable side cylinder casing 277 have slid rearward relative to the movable side cylinder casing 271, the servo spool 283 is maintained at the intermediate position.

As described above, when the engine stops, the pressure in the hydraulic chamber 76 drops. Thus, the tensile force of the belt 140 makes the input side movable sheave 63 and the movable side cylinder casing 271 slide forward. However, in the state where the pressure in the hydraulic chamber 76 has dropped, the contact member 278F and the contact member 278R can slide rearward relative to the movable side cylinder casing 271. Thus, the servo spool 283 can be maintained at the intermediate position without being pressed toward the front side. Thus, the unillustrated transmission controller coupled to the servo spool 283 is also maintained at the intermediate position. Thus, a case where the transmission controller accidentally moves (against the operator's will) to a position other than the intermediate position to give uncomfortable feeling to the operator can be prevented.

When the engine is restarted, conversely to the above described case, the input side movable sheave 63 slides rearward (in the order of FIG. 30, FIG. 29, FIG. 28, and FIG. 17).

Specifically, when the engine is restarted, the hydraulic oil is pumped by the hydraulic oil pump to the hydraulic chamber 76, and thus the pressure in the hydraulic chamber 76 rises. The resultant pressure makes the sliding member 277 slide forward, and thus the contact member 78R and the contact member 278F also slide forward relative to the movable side cylinder casing 271 along with the sliding member 277 (transition from the state in FIG. 30 to the state in FIG. 29). Here, since the servo spool 283 is maintained at the intermediate position by the biasing force of the return spring 8b, actually, the movable side cylinder casing 271 slides rearward relative to the contact member 278F. Thus, the input side movable sheave 63 also slides rearward along with the movable side cylinder casing 271.

When the movable side cylinder casing 271 further slides rearward relative to the contact member 278F, and the contact member 278F contacts the inhibiting members 279, the movable side cylinder casing 271 and the contact member 278F become unable to slide with respect to each other. Thus, from this state (state shown in FIG. 28), the contact member 278F, the contact member 278R, the movable side cylinder casing 271 and the input side movable pulley 63 integrally slide rearward to the intermediate position shown in FIG. 17. The supplying of the hydraulic oil to the hydraulic chamber 76 is terminated in this state, and thus the input side movable pulley 63 is maintained at this position.

As described above, in the belt type continuously variable transmission 40 according to this embodiment, the hydraulic cylinder 270 is formed in the input side movable sheave 63 (movable sheave), and transmission of a hydraulic oil to the hydraulic cylinder 270 is controlled with the hydraulic servo mechanism 280.

The hydraulic servo mechanism 280 includes:

the servo spool 283 biased to return to the intermediate position, coupled to the transmission controller, and configured to switch an oil passage leading to the hydraulic cylinder 270 in accordance with an operation on the transmission controller; and the feedback spool 84 slidably contained in the servo spool 283, disposed to slide along with the movable side cylinder casing 271 forming the hydraulic cylinder 270, and configured to switch the oil passage to maintain a slid position of the input side movable sheave 63 at a position corresponding to a slid position of the servo spool 283.

The pool position maintaining mechanism is disposed between the hydraulic cylinder 270 and the feedback spool 84, the pool position maintaining mechanism including the contact member 278F and the contact member 278R that comes into contact with the feedback spool 84, and allowing the contact member 278F and the contact member 278R to be slidable relative to the movable side cylinder casing 271 when the pressure in the hydraulic cylinder is lower than the predetermined value.

With such a configuration, when the pressure in the hydraulic cylinder 270 drops because a driving source (the engine) stops or due to other reasons, the input side movable sheave 63 might be slid by the tensile force of the belt 140, but the servo spool 283 can be prevented from sliding along with the sliding of the input side movable sheave 63. Thus, the transmission controller coupled to the servo spool 283 can be prevented from moving.

Furthermore, the servo spool 283 is constantly biased to the intermediate position. Thus, even when the pressure in the hydraulic cylinder 270 drops as described above, the servo spool 283 can be maintained at the intermediate position, and thus the transmission controller can be maintained at the intermediate position.

The spool position maintaining mechanism includes:

the communication holes 271, 271, ... each including a portion (lateral hole) having a longitudinal direction in the sliding direction of the movable side cylinder casing 271, and formed in the movable side cylinder casing 271 to communicate between the inside and the outside of the hydraulic cylinder 270;

the sliding members 277, 277, ... slidably inserted in the communication holes 271c, 271c, ... and disposed in such a manner that an end protruding to the outside the hydraulic cylinder 270 comes into contact with a surface of the contact member 278F and the contact member 278R on the opposite side of the surface in contact with the feedback spool 84; and the inhibiting member configured to inhibit the sliding movement of the contact member 278F and the contact member 278R towards the feedback spool 84, at a predetermined position.

In this embodiment, the contact member 278F and the contact member 278R are used as the contact member according to the present invention. The oil groove 278a and the oil groove 278b are respectively formed on the rear surface of the contact member 278F and the front surface of the contact member 278R. With such a configuration, oil passages (the oil groove 278a and the oil groove 278b) for lubricating the sliding surfaces of the contact member 278F and the contact member 278R can be easily formed.

In this embodiment, a combination of two members (the contact member 278F and the contact member 278R) is used as the contact member according to the present invention. However, the present invention is not limited to this, and a single member or a combination of three or more members may be used as the contact member.

The sliding member 277 is described to have an approximately column shape. However, the present invention is not limited to this. Any shape can be employed as long as the sliding member 277 can slide forward and rearward in the communication hole 271c of the movable side cylinder casing 271 while closing the communication hole 271c.

The inhibiting member 279 fits the through hole 271d of the movable side cylinder casing 271 from the outer side. However, the present invention is not limited to this. Any member can be used as long as it can inhibit the sliding of the contact member 278F and the contact member 278R (for example, a retaining ring fixed on the inner peripheral surface of the movable side cylinder casing 271).

Figure 31:
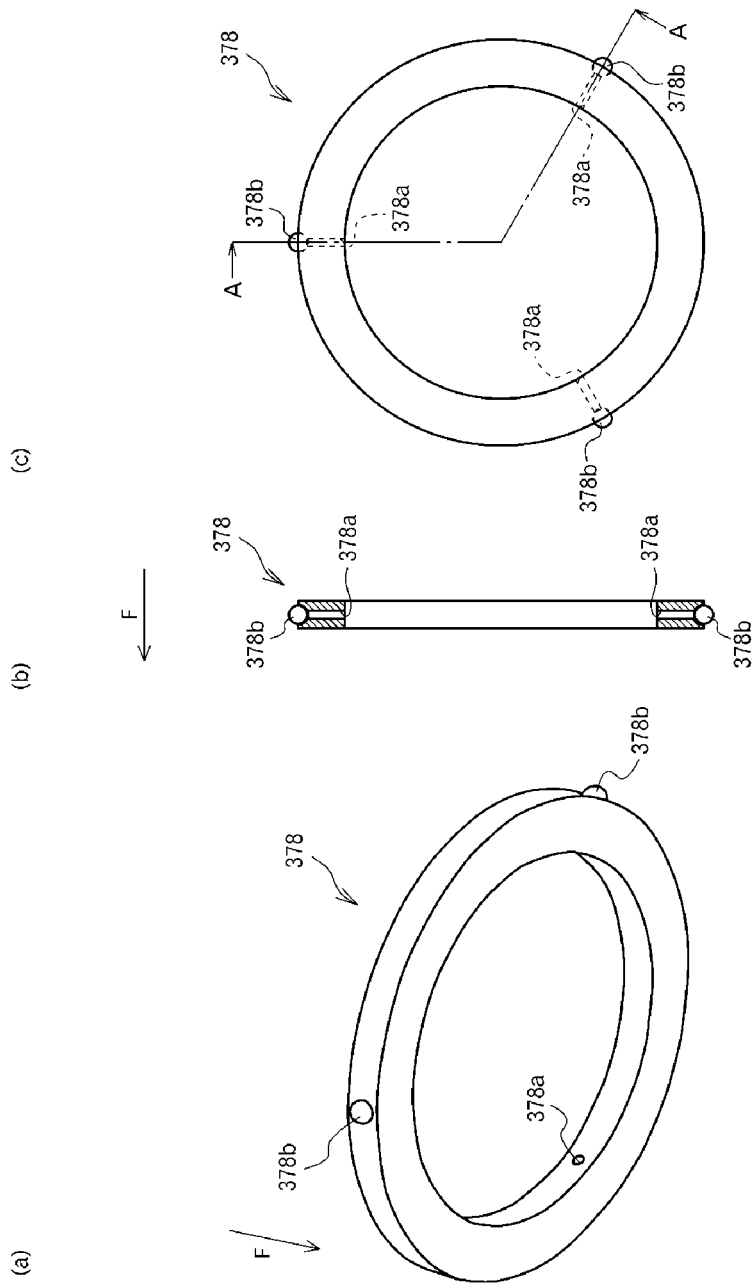
FIG. 31(a) is a perspective view showing a contact member according to another embodiment.
FIG. 31(b) is a cross sectional view showing the same taken along the line A-A.
FIG. 31(c) is a front view showing the same.

As the contact member according to the present invention, a contact member 378 shown in FIG. 31 may be used instead of the contact member 278F and the contact member 278R.

The contact member 378 shown in FIG. 31 is formed to have a shape in which a hole is formed in the center of a disc shaped member (annular shape). The outer diameter of the contact member 378 is set to be approximately the same as the inner diameter of the cylinder portion of the movable side cylinder casing 271 (specifically, slightly smaller than the inner diameter of the cylinder portion of the movable side cylinder casing 271 to secure slidability) (see FIG. 17 and the like). In the contact member 378, three oil holes 378a, 378a, ... are formed to communicate between the inner peripheral surface and the outer peripheral surface of the contact member 378. The oil holes 378a, 378a, ... are separated from each other at an equal interval. On the outer side end portion of each oil hole 378a, a semispherical recess is formed. A steel hole 378b is disposed in the recess. Outer side end portions of the steel balls 378b, 378b, ... protrude outward from the outer peripheral surface of the contact member 378.

When such a contact member 378 is used, grooves extending in the axial direction of the movable side cylinder casing 271 are formed in the inner peripheral surface of the cylinder portion of the movable side cylinder casing 271 at positions corresponding to the steel balls 378b, 378b, ... of the contact member 378. With the steel balls 378b, 378b, ... fit in the grooves, the contact member 378 can be prevented from inclining with respect to the movable side cylinder casing 271 when the contact member 378 slides relative to the movable side cylinder casing 271. Thus, damage on the components due to the misalignment between the contact member 378 and the movable side cylinder casing 271 can be prevented.

A belt type continuously variable transmission 40 according to a third embodiment will be described below.

In the technique (belt type continuously variable transmission 40) according to the first embodiment, when the feedback spool excessively slides relative to the servo spool due to an operation on the transmission controller and the like, an oil passage leading to the hydraulic cylinder might be closed against an operator's will. Thus, the hydraulic cylinder might operate against the operator's will, and thus there is a disadvantage that the operability and the operation feeling might be degraded.

Thus, the present invention provides a belt type continuously variable transmission that can prevent the feedback spool from excessively sliding relative to the servo spool to close the oil passage leading to the hydraulic cylinder.

The belt type continuously variable transmission 40 according to the third embodiment is mainly different from the belt type continuously variable transmission 40 according to the second embodiment in that the hydraulic servo mechanism 280 includes an interlocking member 286. Thus, the difference from the configuration of the belt type continuously variable transmission 40 according to the second embodiment will be described below and the description on the similar configuration will be omitted.

Figure 32:
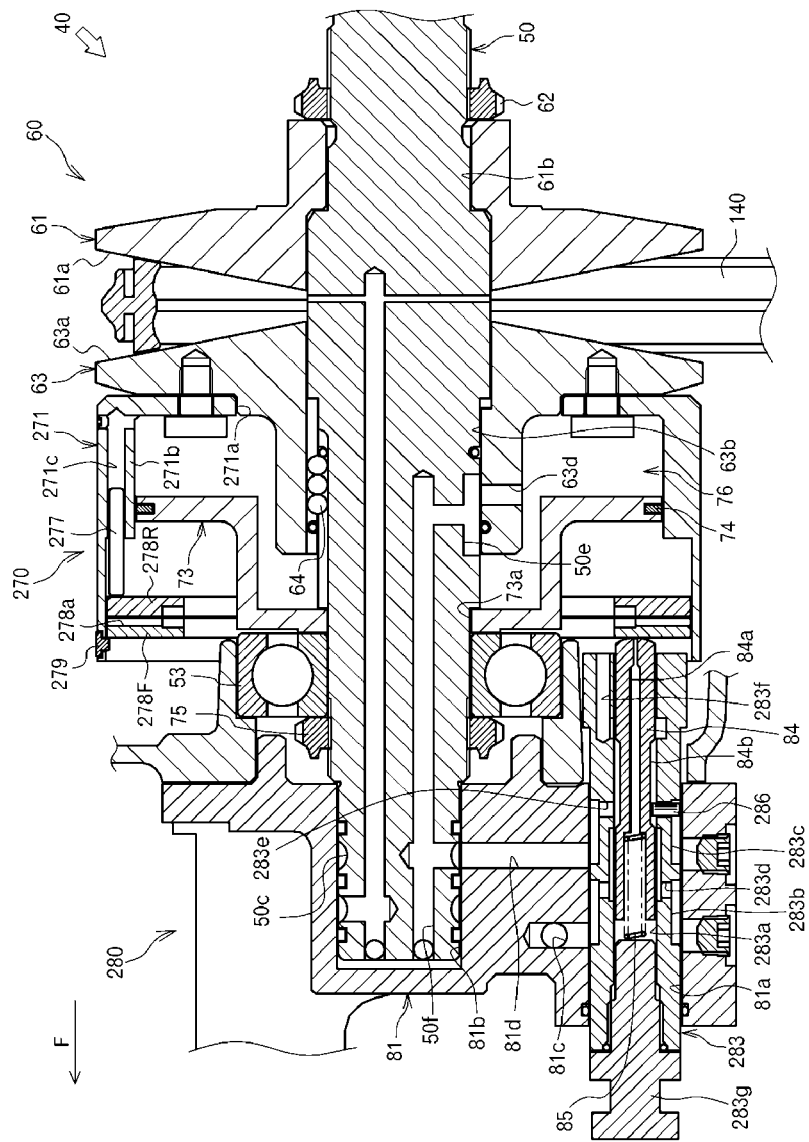
FIG. 32 is a side cross-sectional view showing an input pulley, a hydraulic cylinder, a hydraulic servo mechanism, and the like of a belt-type continuously variable transmission according to a third embodiment.
Figure 33:
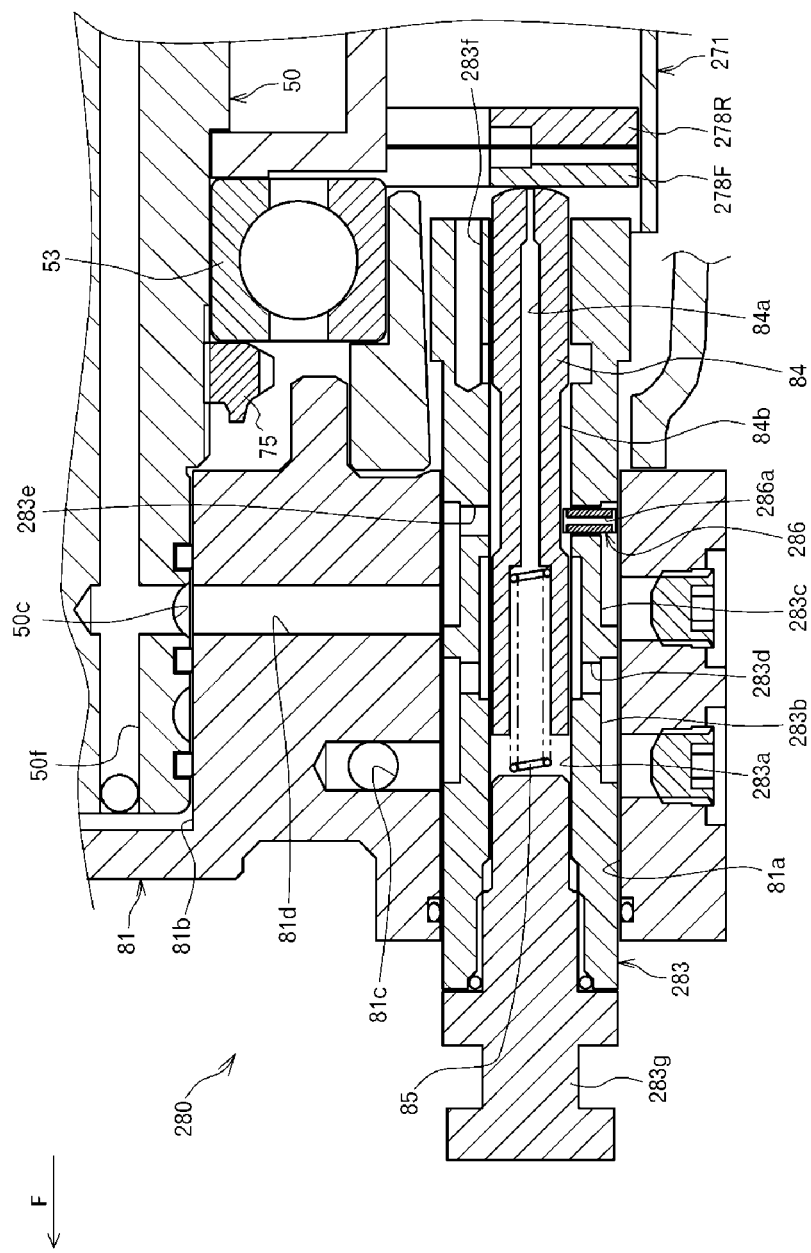
FIG. 33 is a side cross-sectional enlarged view showing the servo spool, the feedback spool, and an interlocking member.

The hydraulic servo mechanism 280 shown in FIG. 32 and FIG. 33 controls the transmission of the hydraulic oil to the hydraulic cylinder 270, and further controls the operation of the input side movable sheave 63 through the hydraulic cylinder 270. The hydraulic servo mechanism 280 includes the front casing 81, the serve spool 283, the feedback spool 84, the spool spring 85, the interlocking member 286, and the like.

Figure 34:
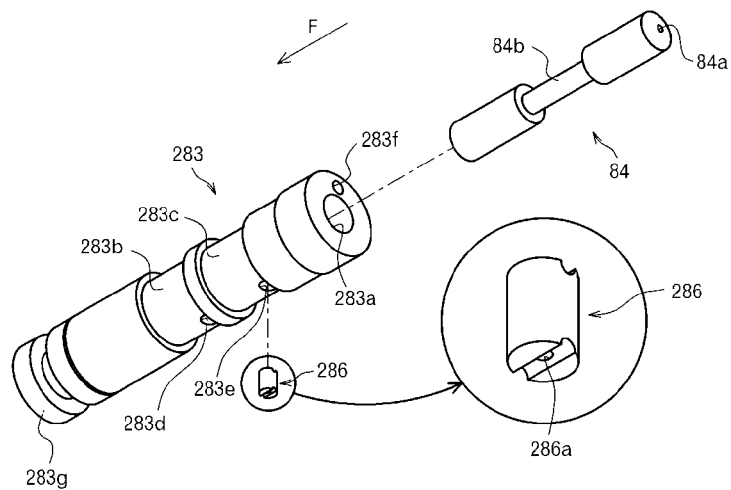
FIG. 34(a) is a perspective view of the servo spool, the feedback spool, and the interlocking member
FIG. 34(b) is a side cross-sectional view of the same.
Figure 34:
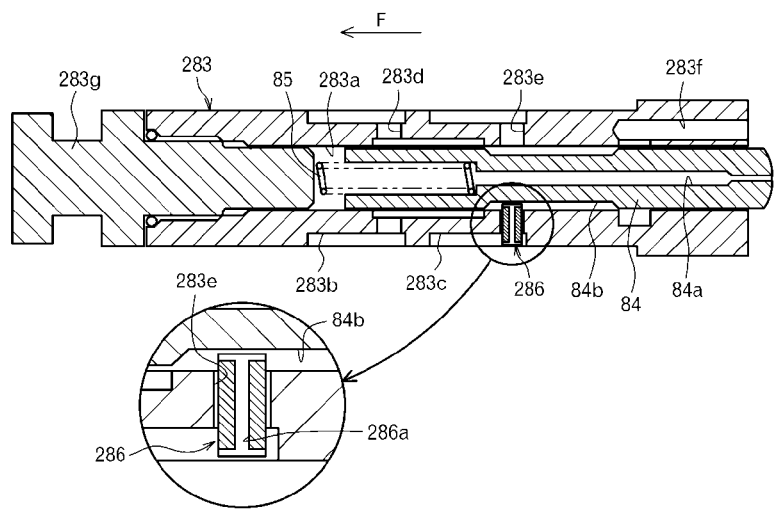

The servo spool 283 shown in FIG. 32, FIG. 33, and FIG. 34 switches an oil passage in the hydraulic servo mechanism 280. In the servo spool 283, the sliding hole 283*a*, the first groove 283*b*, the second groove 283*c*, the first through hole 283*d*, the second through hole 283*e*, the exhaust oil passage 283*f*, and the like are formed.

The second through hole 283*e* has an axial direction in a direction orthogonal to the axis of the servo spool 283 and is formed to communicate between the second groove 283*c* and the sliding hole 283*a*. The second through hole 283*e* has a circular cross sectional shape.

The feedback spool 84 shown in shown in FIG. 32, FIG. 33, and FIG. 34 switches oil passage in the hydraulic servo mechanism 280. In the feedback spool 84, the discharge oil passage 84*a*, the communication groove 84*b*, and the like are formed.

The discharge oil passage 84*a* is an oil passage formed to communicate between the front and rear ends of the feedback spool 84 on the axis of the feedback spool 84.

The communication groove 84*b* is formed along the outer peripheral surface of the feedback spool 84 at an approximately center portion of the feedback spool 84 in the axial direction. More specifically a portion where the communication groove 84*b* is formed has a smaller outer diameter than the other portion.

The outer diameter of the feedback spool 84 (more specifically, the outer diameter of the portion where the communication groove 84*b* is not formed) is set to be approximately the same with the inner diameter of the sliding hole 283*a* of the servo spool 283. The feedback spool 84 is slidably inserted in the sliding hole 283*a* of the servo spool 283. Thus, the feedback spool 84 is slidable in a front-rear direction relative to the servo spool 83.

With the feedback spool 84 being constantly biased toward the rear side by the spool spring 85, the rear end of the feedback spool 84 is constantly in contact with the front surface of the contact member 278F inserted in the movable side cylinder casing 271. Thus, the feedback spool 84 indirectly contacts the movable side cylinder casing 271 with the contact member 278F provided in between.

The interlocking member 286 inhibits the sliding of the feedback spool 84 relative to the servo spool 283 at a predetermined position. The interlocking member 286 has an approximately column shape and has an outer diameter set to be approximately the same as the inner diameter of the second through hole 283*e* of the servo spool 283. An oil grove 286*a* that communicates between one end surface and the other end surface of the interlocking member 286 is formed in the interlocking member 286.

The interlocking member 286 is inserted in the second through hole 283*e* of the servo spool 283 after the feedback spool 84 is inserted in the sliding hole 283*a* of the servo spool 283. Here, one end (upper end in FIG. 34) of the interlocking member 286 protrudes into the sliding hole 283*a* of the servo spool 283. Thus, the one end of the interlocking member 286 is positioned in the communication groove 84*b* of the feedback spool 84. Thus, the interlocking member 286 is disposed over the second through hole 283*e* of the servo spool 283 and the communication groove 84*b* of the feedback spool 84.

Figure 35:
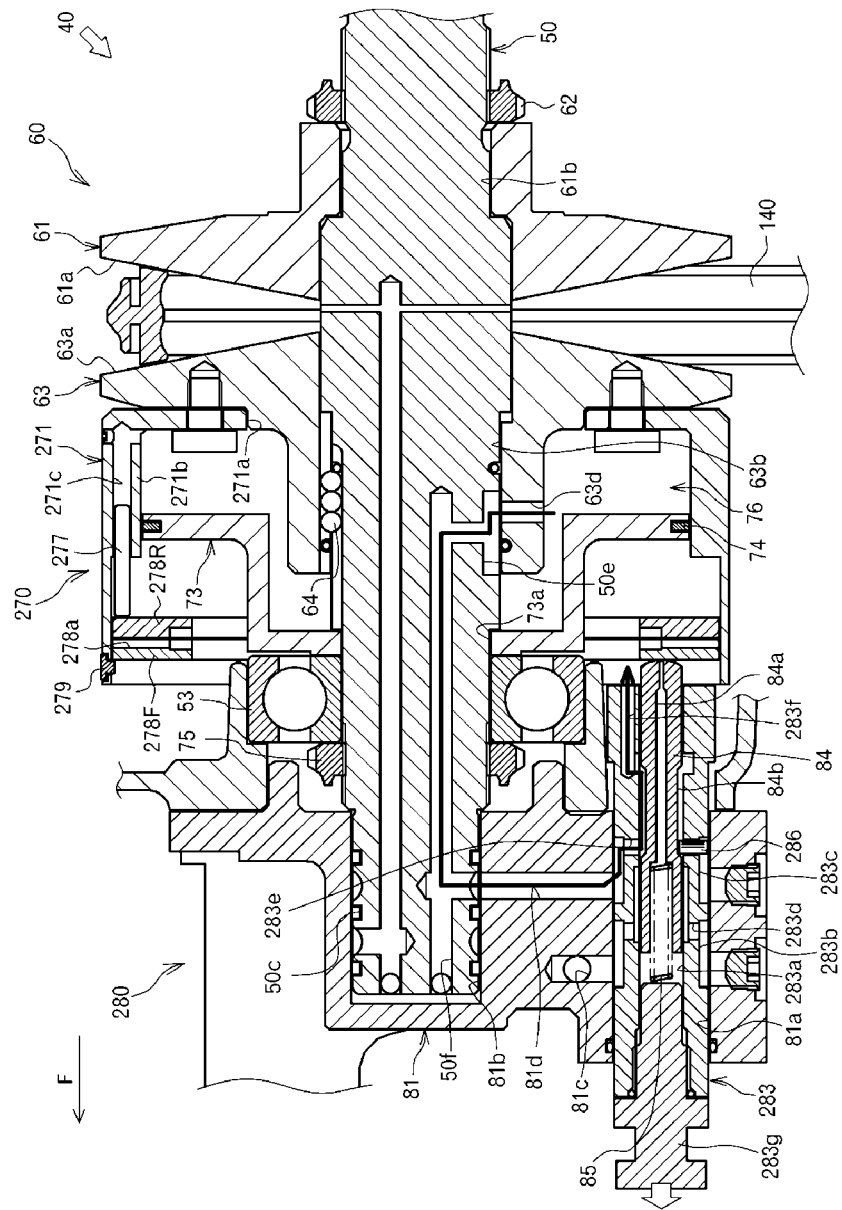
FIG. 35 is a side cross-sectional view showing a case where the servo spool has slid forward.

The servo spool 283 and the feedback spool 84 in a case the feedback spool 283 slides forward by an operation on the transmission controller as shown in FIG. 35 will be described below.

First, for comparison, a case where, unlike in the present invention, the interlocking member 286 is not disposed in the second through hole 283*e* of the servo spool 283 will be considered. Here, when the servo spool 283 slides forward, the feedback spool 84 might excessively slide rearward relative to the servo spool 283, and thus the second through hole 283*e* might be closed by the outer peripheral surface of the feedback spool 84. Here, the case where the feedback spool 84 excessively slides rearward relative to the servo spool 283 is assumed to be caused by a sudden operation on the servo spool 283 for example (that is, a sudden operation on the transmission controller), or the like.

Here, discharging of the hydraulic oil in the hydraulic chamber 76 as shown in FIG. 35 cannot be performed. Specifically, the hydraulic cylinder 270 does not operate as the operator of the transmission controller desired, thereby degrading the operability and the operation feeling.

Furthermore, here, the first through hole 283*d* of the servo spool 283 communicates with the sliding hole 283*a* (more specifically, a space in the sliding hole 283*a* more on the front side than the feedback spool 84). Thus, the hydraulic oil is pumped into the space from the hydraulic pump, whereby the pressure in the space rises. The feedback spool 84 receives the pressure from the front side. Thus, it becomes difficult for the feedback spool 84 to slide forward, thereby further degrading the operability and the operation feeling.

Figure 36:
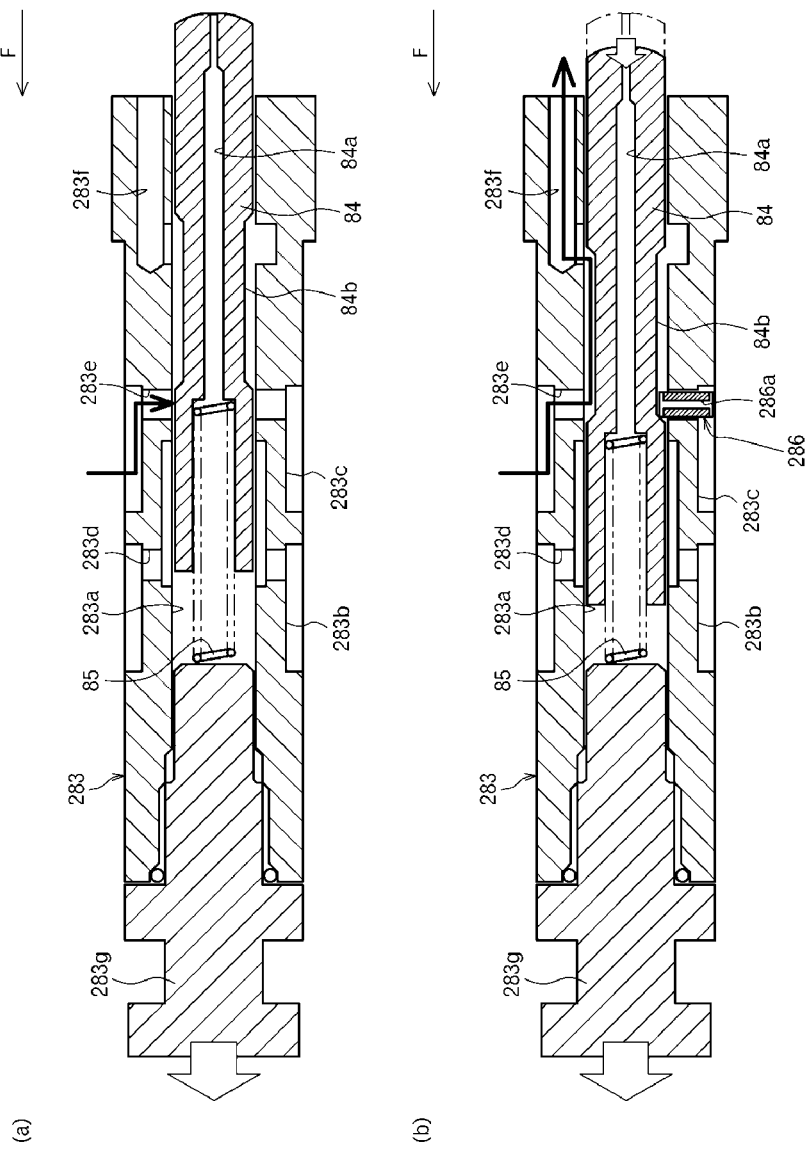
FIG. 36(a) is a side cross-sectional view showing how the hydraulic oil flows in a case where the servo spool has slid forward with the interlocking member not provided.
FIG. 36(b) is a side cross-sectional view showing how the hydraulic oil flows in the same case with the interlocking member provided.

Now, a case where the interlocking member 286 is disposed in the second through hole 283*e* of the servo spool 283 as in this embodiment (see FIG. 36(*b*)) will be described. Here, when the servo spool 283 slides forward, at a position (predetermined position) of the feedback spool 84 that has slid rearward relative to the servo spool 283 for a predetermined distance, one end (upper end) of the interlocking member 286 engage with the front end portion of the communication groove 84*b* of the feedback spool 84. Thus, the feedback spool 84 cannot slide rearward relative to the servo spool 283 any further. Specifically, when the servo spool 283 slides forward in this state, the feedback spool 84 integrally slides forward with the servo spool 283.

Here, the communication groove 84b of the feedback spool 84 faces the second through hole 283e and the discharge oil passage 283f of the servo spool 283, and thus the hydraulic oil can flow into the discharge oil passage 283f through the second groove 283c and the second through hole 283e. Thus, discharging of the hydraulic oil in the hydraulic chamber 76 as shown in FIG. 35 can be performed as the operator of the transmission controller desired.

Moreover, here, the hydraulic oil flowing in the second through hole 283e can also flow into the oil groove 286a formed in the interlocking member 286. Thus, a large are can be secured for the oil passage through which the hydraulic oil flows into the discharge oil passage 283f.

As described above, in the belt type continuously variable transmission 40 according to this embodiment the hydraulic cylinder 270 is formed in the input side movable sheave 63 (movable sheave) and transmission of a hydraulic oil to the hydraulic cylinder 270 is controlled with the hydraulic servo mechanism 280.

The hydraulic servo mechanism 280 includes:

the servo spool 283 coupled to the transmission controller, and configured to switch an oil passage leading to the hydraulic cylinder 270 by sliding in accordance with an operation on the transmission controller;

the feedback spool 84 slidably contained in the servo spool 283, biased in a direction (toward the rear side) to be in contact with the movable side cylinder casing 271 forming the hydraulic cylinder 270, and configured to switch the oil passage to maintain a slid position of the input side movable sheave 63 at a position corresponding to a slid position of the servo spool 283; and the interlocking member 286 configured to inhibit the sliding of the feedback spool in the direction to be contact with the movable side cylinder casing 271, at a predetermined position.

With such a configuration, the feedback spool 84 can be prevented from sliding excessively relative to the servo spool 283 to close the oil passage to the hydraulic cylinder 270. Thus, the operability and the operation feeling can be improved.

Moreover, the oil groove 286a forming the oil passage to the hydraulic cylinder 270 is formed in the interlocking member 286.

With such a configuration, a large area can be secured for the oil passage to the hydraulic cylinder 270.

In this embodiment, the improvement of the operability and the operation feeling as described above can be achieved with the simple configuration of inserting the interlocking member 286 in the second through hole 283e.

As a method for preventing the second through hole 283e described above from being closed (see FIG. 36(*a*)), a method of setting the total length (front-rear direction length) of the communication groove 84b to be long so that a large portion at which the second through hole 238e and the communication groove 84b face each other can be secured can also be employed. However, in such a method, the servo spool 283 and the feedback spool 84 also need to have a long entire length, and thus there is a disadvantage that the components become larger. On the other hand, in the hydraulic servo mechanism 280 according to this embodiment, the entire lengths of the servo spool 283 and the feedback spool 84 need not to be longer, and thus the components do not become larger.

In this embodiment, the interlocking member 286 has the approximately column shape. However, the present invention is not limited to this. Any shape (e.g., rectangular column shape, a plate shape, and the like) can be employed as long as the sliding of the feedback spool 84 rearward can be inhibited at a predetermined position.

The shape of the oil grove 286a formed in the interlocking member 286 is not limited to that in this embodiment, and any shape can be employed as long as the hydraulic oil can flow between one end and the other end of the interlocking member 286.

INDUSTRIAL APPLICABILITY

The present invention is applicable to a technique of a belt type continuously variable transmission, more specifically to a technique of a hydraulic servo mechanism that changes a transmission ration in the belt type continuously variable transmission.

The invention claimed is:

1. A belt type continuously variable transmission in which two shafts disposed in parallel to each other are each provided with one pulley, and a driving force is transmitted from one of the pulleys to the other one of the pulleys through a belt wound across the two pulleys,
    wherein the pulleys each comprise a fixed sheave and a movable sheave slidable in directions toward and away from the fixed sheave,
    wherein the belt type continuously variable transmission comprises:
        a hydraulic cylinder provided to one of the movable sheaves of the two pulleys; and
        a hydraulic servo mechanism configured to control an operation of the hydraulic cylinder,
    wherein a transmission is achievable through changing a distance between the fixed sheave and the movable sheave,
    wherein the hydraulic servo mechanism comprises:
        a valve chest disposed at a position facing the one of the movable sheaves;
        a servo spool slidably contained in the valve chest, coupled to a transmission controller, and configured to switch an oil passage in communication with a hydraulic chamber of the hydraulic cylinder by sliding in accordance with an operation on the transmission controller; and
        a feedback spool slidably contained in the servo spool, disposed with one end in contact with one of the movable sheaves, configured to switch the oil passage in such a manner as to keep a slid position of the movable sheave at a position corresponding to a slid position of the servo spool, slidable in a direction that is the same as a sliding direction of the one of the movable sheaves, and is biased in a direction to be in contact with the one of the movable sheaves,
    wherein the hydraulic cylinder comprises a movable side cylinder casing configured to be integrally slidable with the one of the movable sheaves;
    wherein an outer ring of a bearing for reducing a friction between the feedback spool and the movable side cylinder casing is fixed to the movable side cylinder casing, and
    wherein the feedback spool is biased so as to be disposed to have one end constantly in contact with an inner ring of the bearing and to slide along with the movable side cylinder casing.

2. The belt type continuously variable transmission according to claim 1 further comprising a planetary gear mechanism configured to combine and output a driving force having a speed changed in a stepless manner by the two pulleys and the belt and a driving force transmitted without having the speed changed by the two pulleys and the belt,
wherein, the planetary gear mechanism comprises:
a sun gear supported by a transmission shaft;
a ring gear coaxially disposed with the sun gear;
a plurality of planetary gears that mesh with the sun gear and the ring gear; and
a carrier gear supported by the sun gear, and
wherein, the planetary gears are respectively rotatably supported by a plurality of planetary shafts each having one end rotatably supported by the carrier gear.

3. The belt type continuously variable transmission according to claim 2, wherein an end of each of the plurality of planetary shafts on an opposite side of the carrier gear with respect to the planetary gear is supported by a supporting member supported by the transmission shaft.

4. The belt type continuously variable transmission according to claim 3, wherein the support member is formed with an oil passage to supply the planetary shafts with a lubricant flowing in an oil passage formed in the transmission shaft.

5. The belt type continuously variable transmission according to claim 2, wherein the carrier gear is rotatably supported by the sun gear.

6. The belt type continuously variable transmission according to claim 1,
wherein each of the fixed sheaves of the two pulleys is fixed to a corresponding one of the shafts in such a manner as to be not relatively rotatable by fitting a through hole formed in the fixed sheave with the shaft, and
wherein an axial direction position on the shaft is determined by bringing a small diameter portion formed in the through hole of the fixed sheave in contact with a large diameter portion formed in the corresponding one of the shafts.

7. The belt type continuously variable transmission according to claim 1, wherein the fixed sheaves of the two pulleys are made of the same material.

8. The belt type continuously variable transmission according to claim 1, wherein the movable sheaves of the two pulleys are made of the same material.

9. The belt type continuously variable transmission according to claim 1 further comprising a coupling member disposed in a groove formed in the one of the movable sheaves to which the hydraulic cylinder is provided and one of the shafts to which the one of the movable sheaves is provided, and configured to couple the one of the movable sheaves to the one of the shafts in such a manner as to be not relatively rotatable,
wherein contact surfaces among the coupling member, the one of the movable sheaves, and the one of the shafts, and between the one of the movable sheaves and the belt are lubricated by leakage of a hydraulic oil to be sent to the hydraulic chamber of the hydraulic cylinder through an oil passage formed in the one of the shafts.

10. The belt type continuously variable transmission according to claim 9, wherein an oil passage through which the hydraulic oil is supplied to a contact surface between the fixed sheave corresponding to the one of the movable sheaves and the belt is formed in the one of the shafts.

11. The belt type continuously variable transmission according to claim 1 further comprising:
an output member coaxially disposed with the other one of the shafts;
a cam mechanism disposed between the other one of the movable sheaves provided to the other one of the shafts and the output member and configured to allow a torque to be transmitted between the other one of the movable sheaves and the output member and to apply a pressing force in an axial direction in accordance with the torque to the other one of the movable sheaves; and
a biasing member configured to bias the other one of the movable sheaves toward the fixed sheave corresponding to the other one of the movable sheaves,
wherein the biasing member comprises a plurality of disc springs disposed between the other one of the movable sheaves and the output member and arranged in an axial direction of the other one of the shafts.

12. The belt type continuously variable transmission according to claim 11 further comprising a guide member configured to prevent misalignment of axes of the plurality of disc springs.

13. The belt type continuously variable transmission according to claim 12, wherein the guide member comprises:
a cylindrical outer guide member formed in the output member and configured to guide the plurality of disc springs from an outer side of the plurality of disc springs; and
an inner guide member comprising a spring bearing member disposed between one of the plurality of disc springs disposed closest to the other one of the movable sheaves and the other one of the movable sheaves, and a cylinder member configured to guide the plurality of disc springs from an inner side of the plurality of disc springs.

14. The belt type continuously variable transmission according to claim 11,
wherein a spring chamber configured to contain the plurality of disc springs is formed, wherein an orifice in communication with an outside of the spring chamber is formed in the spring chamber, and
wherein the lubricant is contained in the spring chamber.

* * * * *